(12) United States Patent
Watanabe et al.

(10) Patent No.: US 6,262,840 B1
(45) Date of Patent: *Jul. 17, 2001

(54) PLANO LENS, REAR-PROJECTION TYPE PROJECTOR SCREEN EMPLOYING THE SAME, AND REAR-PROJECTION TYPE VIDEO DISPLAY APPARATUS

(75) Inventors: Hidetoshi Watanabe, Ibaragi; Hirotsugu Suzuki, Chiba; Koji Ashizaki, Kanagawa; Takeshi Matsui, Tokyo; Tomotaka Ito; Shunichi Hashimoto, both of Kanagawa, all of (JP)

(73) Assignee: Sony Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/864,824

(22) Filed: May 29, 1997

(30) Foreign Application Priority Data

| May 30, 1996 | (JP) | .................................................... 8-136731 |
| May 30, 1996 | (JP) | .................................................... 8-136732 |
| Apr. 17, 1997 | (JP) | .................................................... 9-100589 |
| Apr. 17, 1997 | (JP) | .................................................... 9-100590 |

(51) Int. Cl.$^7$ .................................................... G03B 21/60
(52) U.S. Cl. .................................................... 359/453
(58) Field of Search .................................................... 359/452, 453, 359/456, 457, 460, 237, 290, 619, 620

(56) References Cited

U.S. PATENT DOCUMENTS

| Re. 28,274 | * | 12/1974 | Altman ..................................... 353/44 |
| 1,998,054 | * | 4/1935 | McBurney ................................ 88/24 |
| 2,372,173 | * | 3/1945 | Bodde, Jr. ............................ 88/28.93 |
| 3,383,153 | * | 5/1968 | Vetter ..................................... 350/126 |
| 3,552,822 | * | 1/1971 | Altman ................................... 350/126 |
| 5,066,099 | * | 11/1991 | Yoshida et al. ....................... 359/457 |
| 5,241,416 | * | 8/1993 | Mitsutake et al. .................... 359/456 |
| 5,563,738 | * | 10/1996 | Vance .................................... 359/614 |
| 5,815,313 | * | 9/1998 | Mitani et al. ......................... 359/448 |

FOREIGN PATENT DOCUMENTS

| 0 294 122 | 12/1988 | (EP) . |
| 0 457 280 A2 | 11/1991 | (EP) . |
| 0 484 073 A2 | 5/1992 | (EP) . |

\* cited by examiner

*Primary Examiner*—Christopher E Mahoney
(74) *Attorney, Agent, or Firm*—Sonnenschein, Nath & Rosenthal

(57) ABSTRACT

A plano lens according to the present invention includes a transparent base member disposed on a light emission side thereof or light incidence side thereof and a minute-transparent-ball disposing layer having at least minute transparent balls two-dimensionally in a single grain layer on the transparent base member so that the minute transparent balls disposed adjacent to each other should be disposed in contact with or close to each other, and a colored layer disposed so as to expose the minute transparent balls to outside on the light incidence side. The minute-transparent-ball disposing layer has an improved light transmission at a light emission side end portion of the minute transparent ball.

49 Claims, 44 Drawing Sheets

PICTURE PROJECTING UNIT SIDE

VIEWER SIDE $a ≒ 30°$

HORIZONTAL DIRECTION $a ≒ 20°$

VERTICAL DIRECTION

Region C (n=1.7)

Region B (n=1.8)

Region A (n=1.9)

PLANO LENS, REAR-PROJECTION TYPE PROJECTOR SCREEN EMPLOYING THE SAME, AND REAR-PROJECTION TYPE VIDEO DISPLAY APPARATUS

BACKGROUND OF THE INVENTION

1. Field of the Invention

The present invention relates to a plano lens, i.e., a plano lens for use in a rear-projection type projector, a viewing-angle increasing plate of a liquid crystal display device, a plasma display device, an electro-luminescent display device or the like, a light diffusion plate for diffusing a back light for a liquid crystal display, lights of various illumination light sources or the like, and further to a screen for a rear projection type projector.

The present invention relates to a rear-projection type video display apparatus, i.e, a so-called rear-projection type projector.

2. Description of the Related Art

Recently, a projection-type display apparatus for emitting a luminous flux having a polarization characteristic, e.g., one employing a light valve such as a liquid crystal panel or the like has been developed. The projection type display apparatus employing a liquid crystal panel is arranged such that an image light spatially modulated by the liquid crystal panel is enlarged by a projection lens and then projected on a screen. The projection type display apparatus includes a front projection-type and a rear-projection type.

FIG. 1 is a perspective view showing a schematic arrangement of a rear-projection type video display apparatus by which a user watches, from a front side of a screen 2, an image projected on the screen 2 from a rear side of the screen 2. The rear-projection type video display apparatus has a video projector unit 1 for emitting projection video light L, a transmission type screen 2, and a reflection mirror 3 for reflecting the projection video light L from the video projector unit 1 to lead it to the transmission type screen 2.

This transmission type screen 2, i.e., a rear-projection type projector screen is usually formed of a Fresnel lens and a lenticular lens 5 extended in the height direction of the screen 2.

In the rear-projection type video display apparatus having the above arrangement, the Fresnel lens 4 converts the incident projection video light L from the video projector unit 1 into substantially parallel light, and the lenticular lens 5 diffuses the substantially parallel light in the left and right direction (i.e., a width direction of the screen 2).

Thus, the rear-projection type video display apparatus usually enlarges and projects the projection video light L from the video projector unit 1. Specifically, a viewer watches an image obtained from the projected light transmitted through the transmission type screen 2.

However, it is frequently observed that the rear-projection type video display apparatus is generally used in a bright room. In this case, external light such as room illumination light or the like is reflected on a surface of the lenticular lens 5, and a viewer sees the reflected light together with the video light emitted from the screen 2, which lowers the contrast of the image. In order to prevent the contrast of the image from being lowered, the rear-projection type video display apparatus employs a smoke plate (not shown) in front of the lenticular lens 5 to absorb a part of the disturbance light, thereby suppressing the lowering of the contrast.

When the smoke plate is provided as described above, the smoke plate also absorbs a part of the video light transmitted through the smoke plate similarly to the disturbance light, which lowers brightness of the image. In order to increase the brightness, a light source having a larger consumed power is required. This becomes a bar to achieving more efficient power consumption and requires a countermeasure for elimination of heat resulting from the increased consumed power, which leads to a new problem of increasing the manufacturing costs.

A plano lens employing the lenticular lens, a transmission type screen employing such plano lens, i.e., the rear-projection type projector screen, and a rear-projection type video apparatus employing such plano lens and such rear-projection type projector screen have many problems. The problems are as follows.

(1) In the lenticular lens formed by extending a lens element in the upper and lower direction (vertical direction), light is diffused in the horizontal direction, which allows a user to watch an image even from a diagonal direction. However, since light is seldom diffused in the vertical direction perpendicular to the horizontal direction, if the user moves his viewpoint in the vertical direction, the user encounters the disadvantages that a range within which the user can observe a sharp image is extremely narrow.

Specifically, as shown in FIG. 3A, for example, in the rear-projection type video display apparatus employing the lenticular lens, as shown by a line a of FIG. 3A, an area within which of light vertically incident on a plate surface of the lenticular lens is 50% or larger has a shape of an elliptic cone which is flat in the vertical direction. Specifically, if an area within which at its center of light diffused in the horizontal direction is 50% or larger of that obtained at its center is an area having an angle of about 30°, then an area within which of light diffused in the vertical direction is 50% or larger of that obtained at its center is an area having an angle of about 20° as shown in FIG. 3C.

(2) Moreover, since the lenticular lens has a precise lens shape on the whole surface, even if a slight defect lies in a part thereof, the whole of the lens can not be used. Therefore, it is necessary to handle the screen with a considerable case. Moreover, recent increase of a picture projected area requires more careful handling of the screen, which inevitably leads to the increased costs.

(3) Since the screen formed by combining the Fresnel lens and the lenticular lens spreads the projected light mainly in the horizontal direction, the screen provides a wide angle view in the horizontal direction. On the other hand, the screen provides only a narrow angle of view in the vertical direction. Therefore, some viewer recognize unevenness of luminance distribution of an image and a partial unevenness thereof and sometimes recognize such uneven luminance as a horizontal light band.

(4) When a black stripe is provided between lens elements of the lenticular lens, the black stripes cannot be formed at an interval narrower than a predetermined one in order to achieve a sufficient effect of the lens, which lowers the contrast of the image and provides a low resolution.

(5) Moreover, since the projected light emitted from the video projector unit 1 or the front-projection type video display apparatus or the like generally presents an illumination distribution in which illumination at a center portion corresponding to a picture angle is bright and illumination gradually becomes dark in the direction toward a periphery side. Therefore, an illumination distribution of an picture presents a sharp curve.

(6) In the screen formed by combining the above Fresnel lens and the lenticular lens, multiple reflection of light is produced between the Fresnel lens and the lenticular lens, which shows a viewer observed images which are overlapped one another.

(7) Moreover, it is sometimes observed that optical interference is produced between the black stripe of the lenticular lens and the projected image and hence a pattern resulting from the interference, i.e., a so-called moire occur in the observed image.

Use of the screen which diffuses light widely, i.e., the screen having a so-called wide diffusion provides only a low gain (luminance in a direction at a certain angle of emission/ amount of incident light), i.e., a low luminance but can provide a flat gain curve having less fluctuation with respect to an angle of view. On the other hand, the screen having a strong directivity provides a high gain but the gain is drastically lowered as the angle of view becomes larger. This drastic change of the gain shows that movement of an observation position easily changes brightness of a picture displayed on the screen when a user observes a screen with the naked eyes.

As described in "Characteristics of rear projection screen and measurement method thereof" by Emori, "Optical technology contact" vol. 11, No. 5 (1973, p17 to p23, especially p18, since a human eye has a logarithmic sensitivity with respect to luminance, even if the gain is fluctuated within a substantial range of a peak value which is twice as high as a lowest value, a user recognize only even brightness.

However, it is said that, if the gain is fluctuated beyond a range in which a peak value is three times as high as the lowest gain, then there occurs a so-called hot spot, i.e., hot band phenomenon that a portion corresponding to a peak gain (which is usually located at the center of the screen) appears to be brighter.

According to the above letter, the most suitable screen has a peak gain of 3.5 and a gain obtained at a bend angle (angle of view) of 30° which is higher than 25% of the peak gain.

A significance of measurement of screen performance with a gain at a certain bend angle will be described with reference to FIGS. 4 and 5.

It is assumed that a rear projector is attached to a screen having an aspect ratio of 16:9 and a user observes an image displayed on the screen with the naked eyes being located at a position away from the screen by a distance 3H which is three times as long as a height H of the displayed picture and being in front of a center position of the display picture on the screen. The above distance 3H is considered as a standard observation distance for an NTSC television receiver and a high-definition television (HDTV) receiver.

In this case, when a viewer observes a wide-screen picture having an aspect ratio of 9:16 such as that of the HDTV, as shown in FIG. 4, bend angles in the vertical, horizontal, diagonal directions are 9.5°, 16.5° and 18.8° at most, respectively.

Further, when a plurality of viewers watch the screen, as shown in FIG. 5, they watch the screen in front of the screen with being positioned in parallel to the screen, some viewer is positioned at a position which corresponds to a width-direction edge of the screen and is positioned away from the screen by the distance 3H, and watches the screen with the naked eyes being located at the same level as that of the center point of the displayed picture. As a result, as shown in FIG. 5, bend angles in the horizontal and diagonal directions are 30.7° and 31.6° at most, respectively.

Even in the above case, it is necessary to avoid a shading, i.e., a so-called uneven brightness on the screen. In general, even if the shading of 15% to 50% occurs, it is not so problematic when a viewer watches the screen with the naked eyes. However, if the shading of 70% or larger occurs, it is not permissible. An area having the shading of 50% or smaller caused when a viewer watches an image displayed on the screen is called a favorable impression area. If this favorable impression area is enlarged, then a screen area suitable for observation can be enlarged.

In a practical projector, the shading is estimated in consideration of an incident angle of a video light projected on a screen and evenness thereof. However, when the shading resulting only from a screen is estimated, it is possible to such shading in the form of values based on a relationship between a peak gain and a gain obtained at a certain bend angle.

However, recently, as a light projector unit employing an optical space modulation device (i.e., a light valve) such as a thin-film-transistor liquid crystal display or the like has been developed more, a projector increasingly obtains higher optical output year by year. Therefore, there is demanded a screen not only having a first effect of achieving a high peak gain but also having an effect in which some diffusion at the screen enlarges an area suitable for observation.

SUMMARY OF THE INVENTION

It is an object of the present invention to solve the problems of a plano lens employing a lenticular lens and a rear-projection projector screen employing the plano lens.

It is another object of the present invention to secure both of a screen brightness and some diffusion and to reduce manufacturing costs.

The above objects are achieved in accordance with the principles of the present invention in a rear-projection type projector screen, and in a rear-projection type projector having such a screen, wherein the screen includes a plano lens having a light incident side and a light emission side and having a transparent base member disposed at one of the light incident side and the light emission side and minute transparent balls disposed two-dimensionally in a single ball layer on the transparent layer, with the minute transparent balls being substantially adjacent each other, and a color layer on the transparent layer having the minute transparent balls respectively partially buried therein so that each of the minute transparent balls has an exposed surface portion projecting from the color layer toward the light incident side. Each of the minute transparent balls has an optical characteristic, such as absorbence, spectral absorbence and refractive index, and this optical characteristic of some of the minute transparent balls differs in value from others of the minute transparent balls. The minute transparent balls are respectively disposed in the single ball layer with a non-uniform distribution of the differing values of this optical characteristic.

DESCRIPTION OF THE PREFERRED EMBODIMENTS

Figure 2:
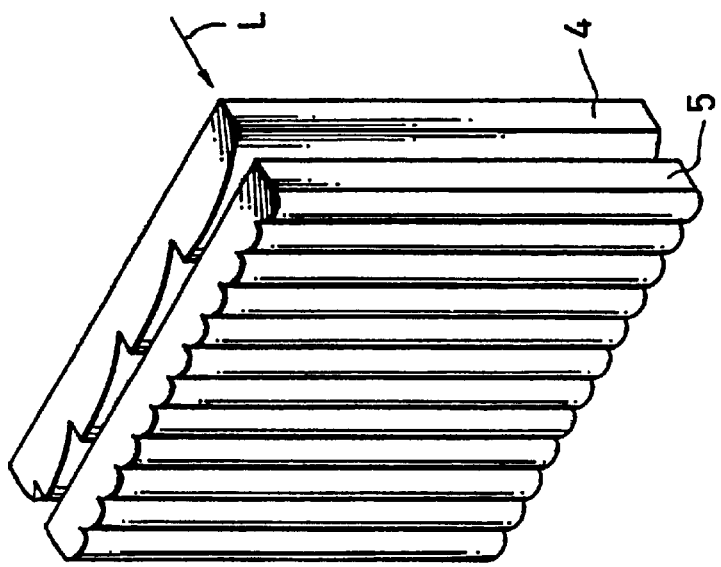
FIG. 2 is a perspective view of a screen of the known rear-projection type video display apparatus shown in FIG. 1.
Figure 1:
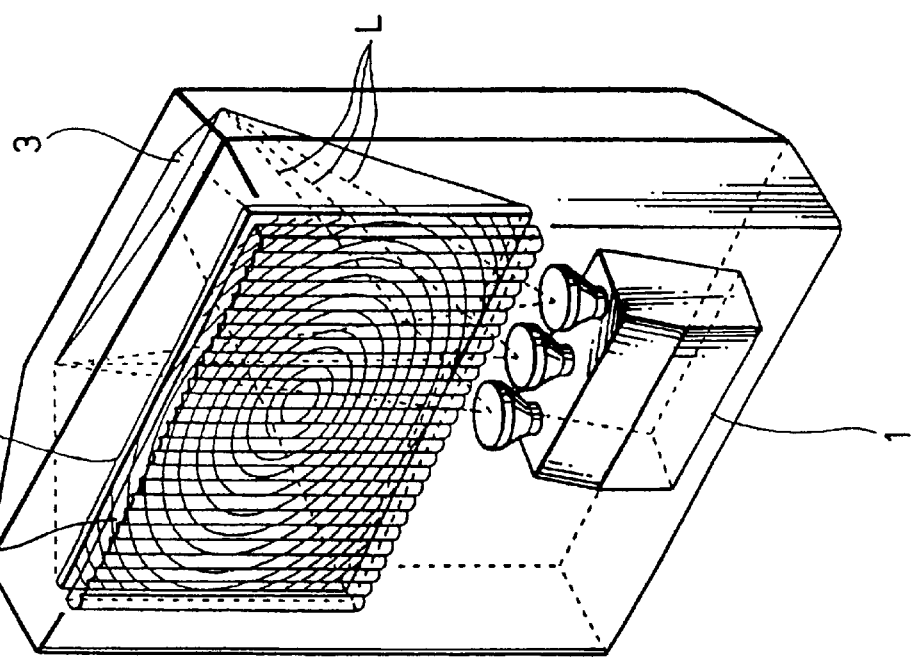
FIG. 1 is a structural diagram showing a known rear-projection type video display apparatus.
Figure 3A:
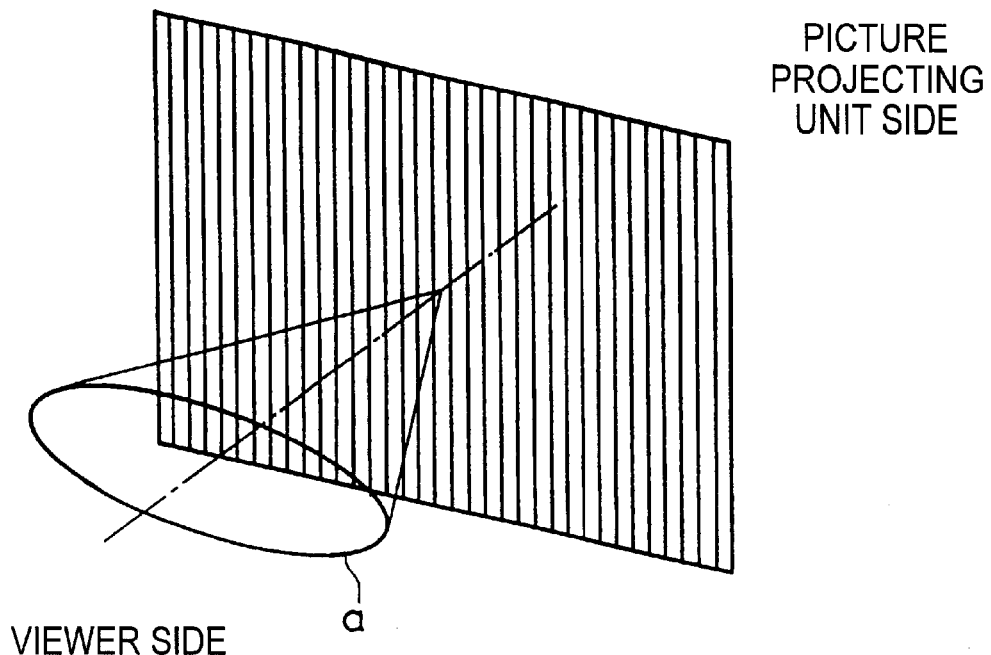
FIG. 3A is a diagram showing a distribution of illumination at a certain level or higher of light projected on a plano lens or a screen of the known rear-projection type video display apparatus shown in FIG. 1.
Figure 3B:
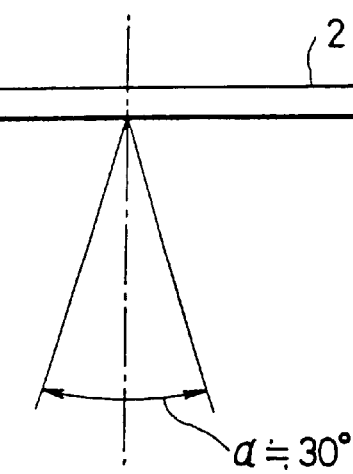
FIGS. 3B and 3C are diagrams used to explain the distribution shown in FIG. 3A.
Figure 3C:
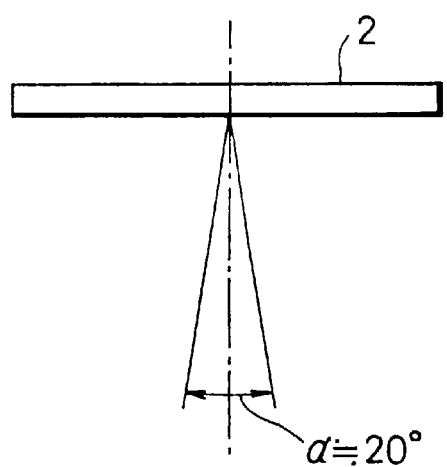
Figure 5:
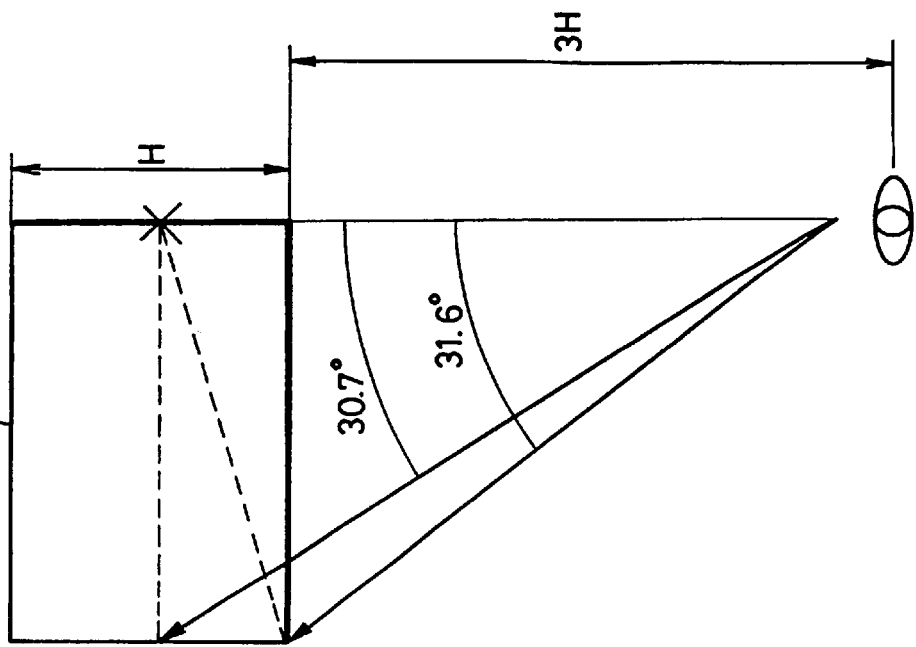
FIG. 5 is a diagram used to explain a bend angle obtained when a user observes a screen.
Figure 4:
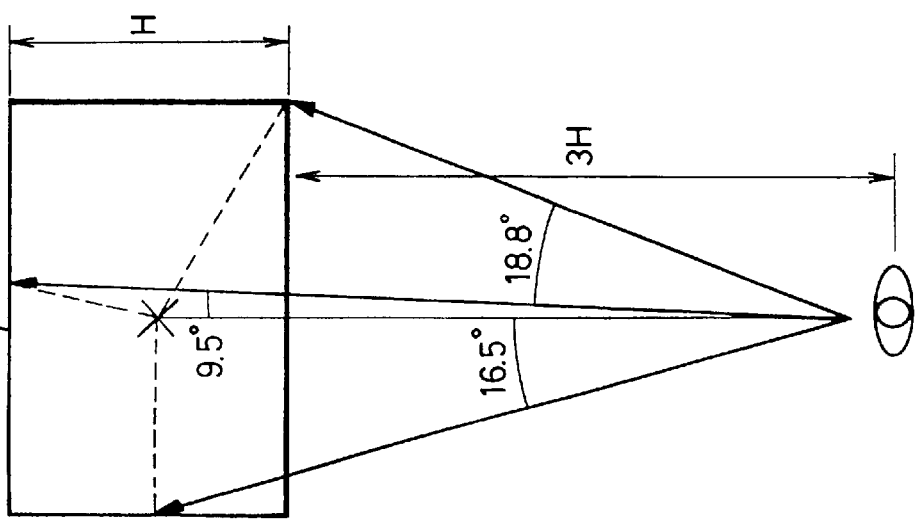
FIG. 4 is a diagram used to explain a bend angle obtained when a user observes a screen.

Initially, plano lenses and rear-projection type projector screens employing the plano lenses according to embodiments of the present invention will be described.

Each plano lens according to the embodiments of the present invention has, as shown in FIGS. 9 to 32 which are cross-sectional views thereof, a transparent base member 11 provided on at least one of a light emission side or a light incidence side, and a minute-transparent-ball disposing layer 14 having minute transparent balls 12 disposed two-dimensionally on the transparent base member 11 so as to form a single grain layer and to be in contact with or close to one another, and having a colored layer 13 used for exposing a part of each of the minute transparent balls 12 on the light incidence side. The minute-transparent-ball disposing layer 14 is designed so as to enhance transmittance of the minute transparent ball 12 at the light emission side end portion. As will be described later on, since each minute transparent ball 12 converges the incident light, it is sufficient for each minute transparent ball 12 to have a small area where light is emitted, and hence the minute-transparent-ball disposing layer 14 may have a small area having high transmittance.

Each of rear-projection type video display apparatus according to first and second embodiment of the present invention will be described.

Figure 6:
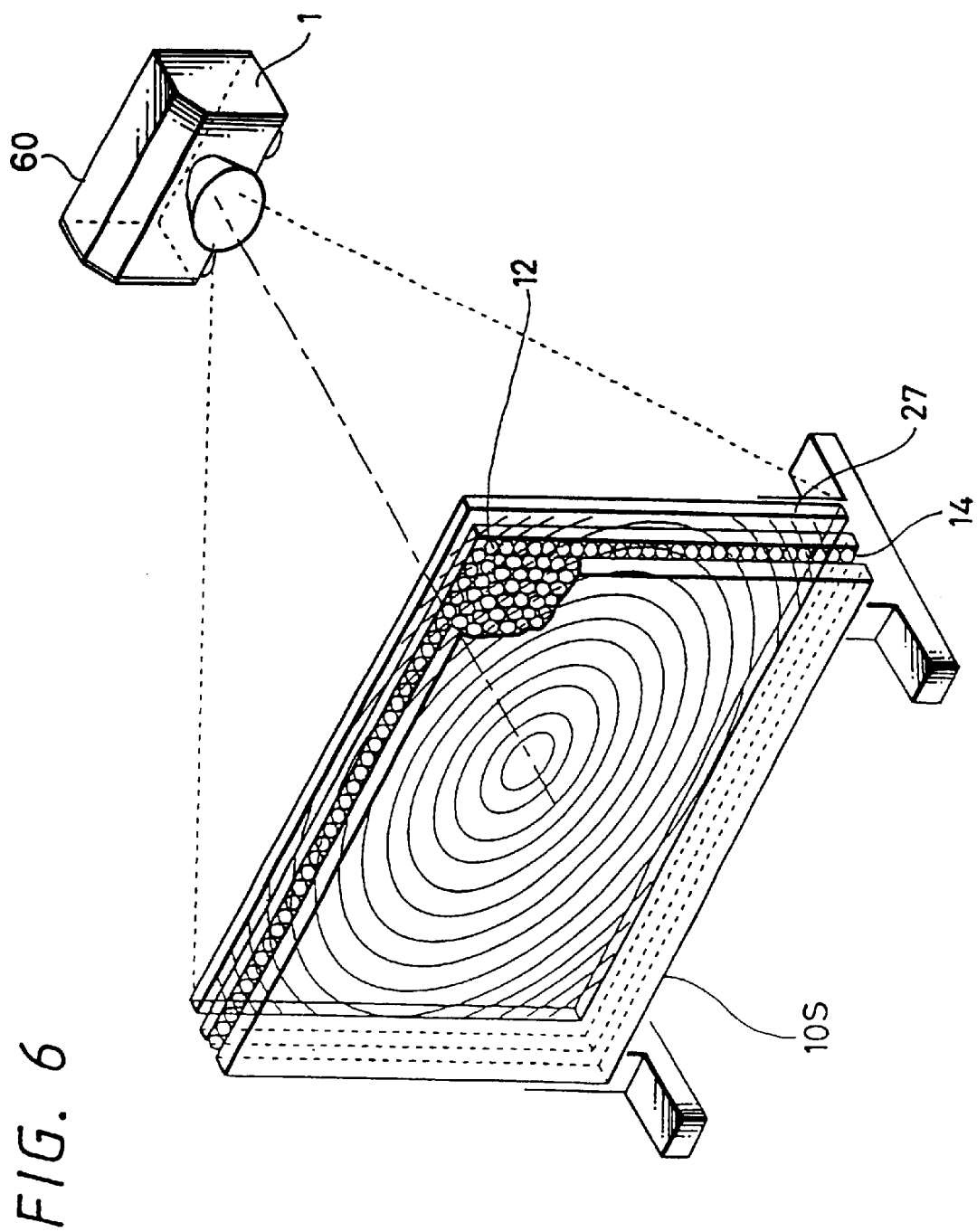
FIG. 6 is a diagram showing an example of a rear-projection type video display apparatus employing a screen according to the present invention.
Figure 7:
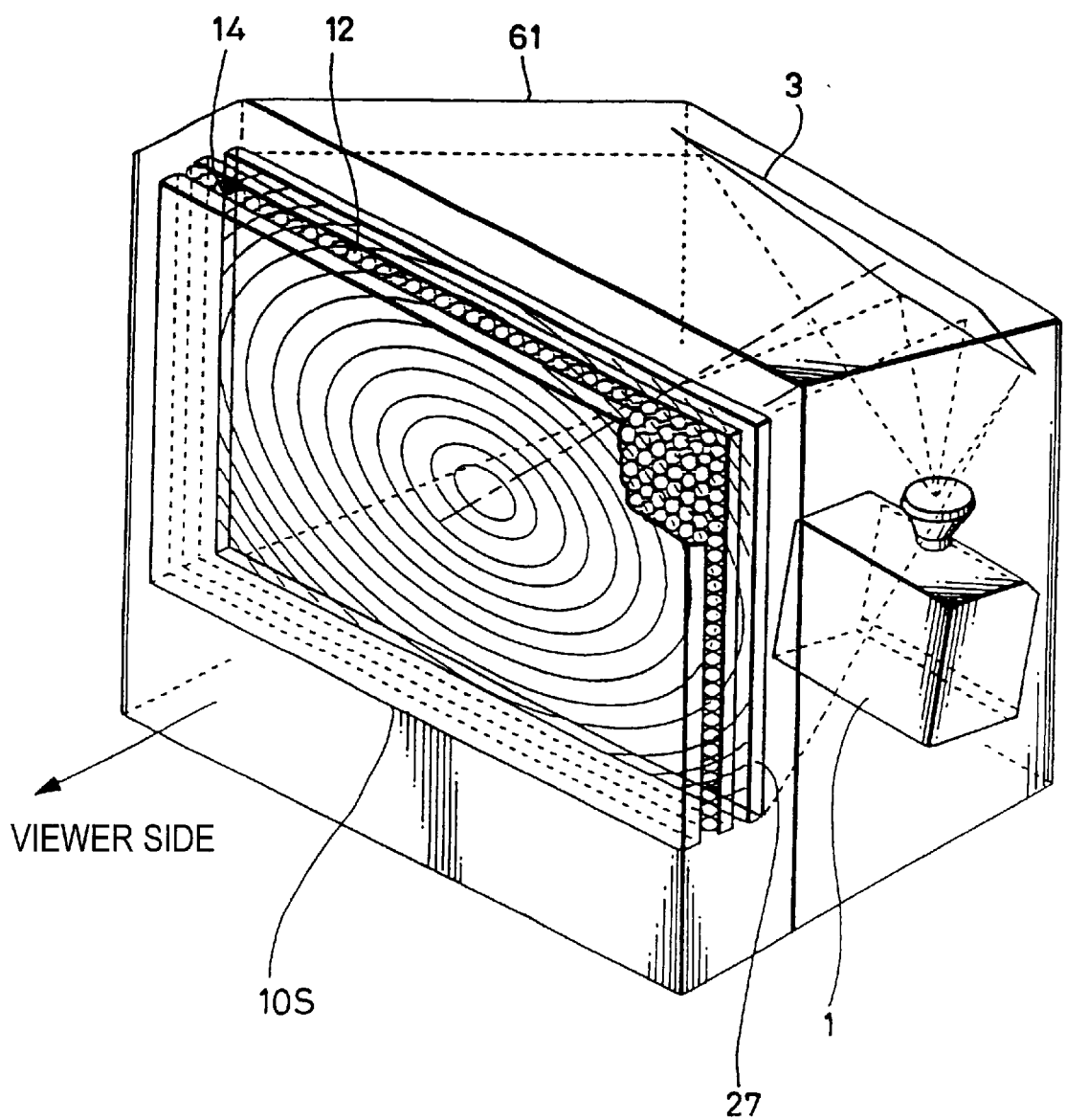
FIG. 7 is a diagram showing another example of a rear-projection type video display apparatus employing a screen according to the present invention.

The rear-projection type video display apparatus has, as shown in FIGS. 6 and 7 which are schematic diagrams showing examples of an arrangement thereof, a video projector unit 1 and a transmission type screen 10S.

The rear-projection type video display apparatus shown in FIG. 6 has a projecting apparatus 60 having the video projector unit 1 on a back side of the transmission type screen 10S. Projected light emitted from the projecting apparatus 60 is projected on the screen 10S, and a viewer watches an image obtained from the projected light transmitted through the screen 10S and diffused thereby in the vertical and horizontal directions, from the front of the screen 10S.

The rear-projection type video display apparatus shown in FIG. 7 has the transmission type screen 10S at the front face of a case body 61. An image obtained from light from the video projector unit 1 provided in the case body 61 is reflected by a reflection mirror 3, and a viewer watches an image obtained from the projected light transmitted through the screen 10S and diffused thereby in the vertical and horizontal directions, from the front of the screen 10S.

Figure 8:
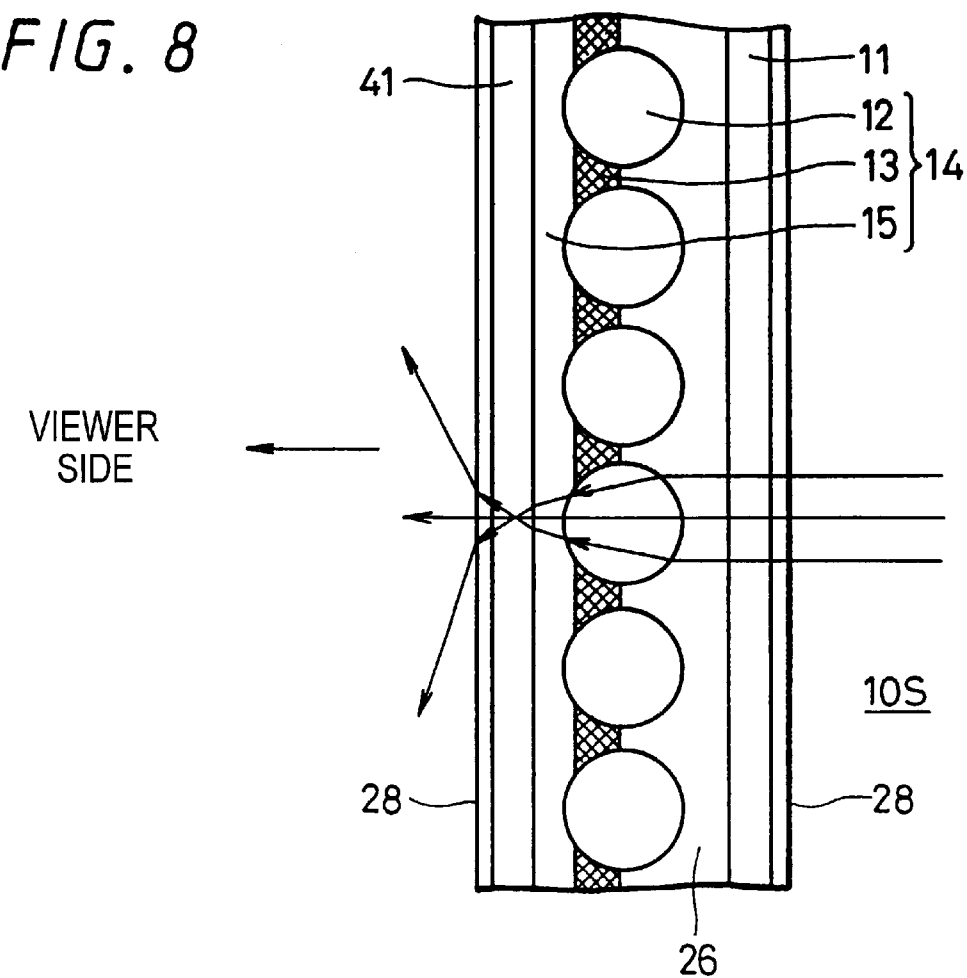
FIG. 8 is a cross-sectional view of a screen of the rear-projection type video display apparatus according to the present invention.

The transmission type screen 10S employed by these rear-projection type video display apparatus shown in FIGS. 6 and 7 employs a plano lens having a special arrangement described later on. Specifically, as shown in FIG. 8 which is a schematic, cross-sectional view of the plano lens, the plano lens has transparent base members 11 and 41 are disposed on both of the light emission side and the light incidence side of the screen 10S, and the minute transparent ball disposing layer 14 disposed between the transparent base members 11 and 41. The minute transparent ball disposing layer 14 has the minute transparent balls 12 disposed two-dimensionally on the transparent base member 11 so as to form a single grain layer and to be in contact with or close to one another. The minute-transparent-ball disposing layer 14 has at least the colored layer 13 used for exposing a part of each of the minute transparent balls 12 to the outside on the light incidence side. In FIG. 8, anti-reflection layers 28 are formed on both of outer side surfaces of the screen 10S.

The transmission type screen 10S forming the plano lens, the rear-projection type projector screen, and the rear-projection type video display apparatus according to the present invention will be described. Hereinafter, the transmission type screens forming the plano lens, the rear-projection type projector screen, and the rear-projection type video display apparatus according to the embodiments are all referred to as the plano lens according to the present invention.

Figure 9:
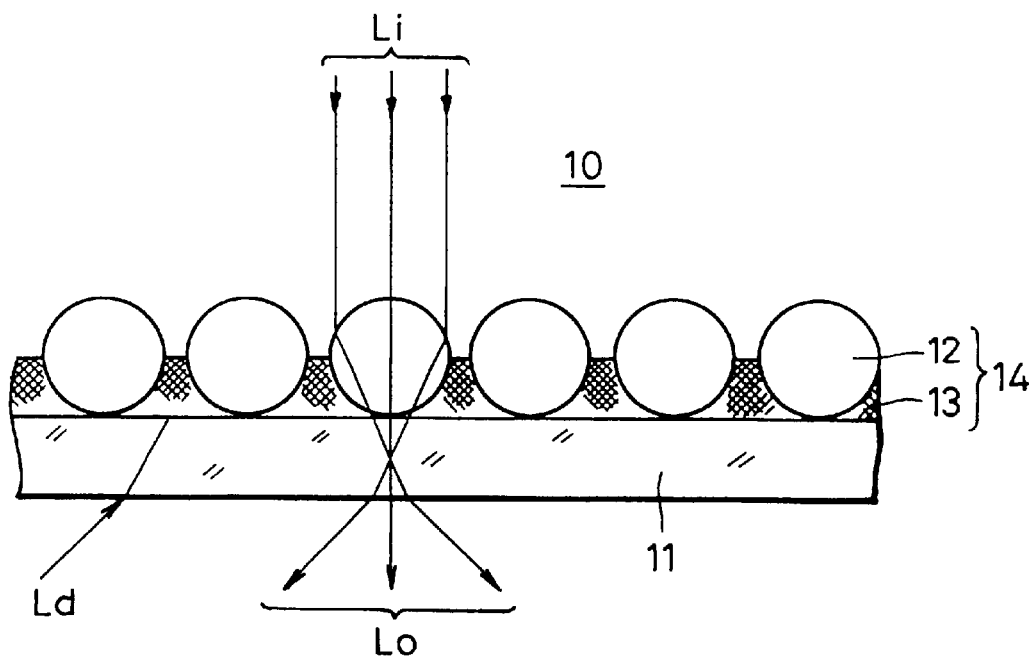
FIG. 9 is a schematic, cross-sectional view of a plano lens or a screen according to a first embodiment of the present invention.

A plano lens 10 according to a first embodiment of the present invention shown in FIG. 9 has a transparent base member 11 formed of a glass substrate having rigidity or a plastic substrate or a flexible substrate and disposed on the light emission side of the lens 10. Specifically, in this case, a minute-transparent-ball disposing layer 14 is formed on the light incidence side of the transparent base member 11. In the first embodiment, the minute-transparent-ball disposing layer 14 is formed such that minute transparent balls 12 are disposed densely in a single grain layer with the adjacent minute transparent balls 12 being sufficiently close to each other or in contact with each other and that each of the minute transparent balls 12 is partially buried in a colored layer 13 having adhesion or cohesion and fixed therein. Specifically, each of the minute transparent balls 12 is disposed to have a light incident surface portion corresponding to 30% or larger of a diameter of the minute transparent ball 12 this surface portion projecting thereof; from the colored layer 13, and each ball is having a light emission portion buried in the colored layer 13. Each of the minute transparent balls 12 is in contact with the transparent base member 11 directly or through a sufficiently thin portion of the color layer 13 at the light emission end side of the minute transparent ball 12. Therefore, at the light emission end side, light transmittance is increased with almost no light being absorbed by the colored layer 13. Thus, of an amount of light emitted from the minute transparent ball 12, the light amount absorbed by the colored layer 13 is reduced. A area where the amount of light absorbed by the colored layer 13 is reduced can be set as a minute area on the light emission end side of the minute transparent ball 12.

In the plano lens 10 according to the first embodiment, when incident light Li in the form of parallel light representing a projected image or the like, is made incident on the exposed surface portion of the minute transparent balls 12 of the minute-transparent-ball disposing layer 14 from the opposite side thereof with respect to the transparent base member 11, the incident light Li is converged and then diverged due to a lens effect by the minute transparent ball 12 and hence emitted light Lo is diffused. Thus, a diffusion plano lens or view angle enlarging plano lens is formed.

As described above, the area where the amount of light absorbed by the colored layer 13 is reduced is formed at the emission end of each of the minute transparent balls 12, thereby the emission light being allowed to be efficiently emitted in the front direction of the plano lens 10. Since light is converged by each of the minute transparent balls 12 and then emitted, it is possible that the above area of each of the minute transparent balls 12 has a minute area. Since the colored layer 13, i.e., a light absorbing layer lies around the above area, external light Ld is effectively absorbed by the colored layer 13 and hence can be effectively prevented from travelling in undesired directions. Therefore, it is possible to effectively prevent the contrast of a picture displayed on a screen from being lowered due to the external light Ld.

Plano lenses 10 according to the second to eighth embodiments will hereinafter be described with reference to FIGS. 10 to 16. In FIGS. 10 to 16, like parts corresponding to those shown in FIG. 9 are marked with the same reference numerals and need not to be described in detail.

Figure 10:
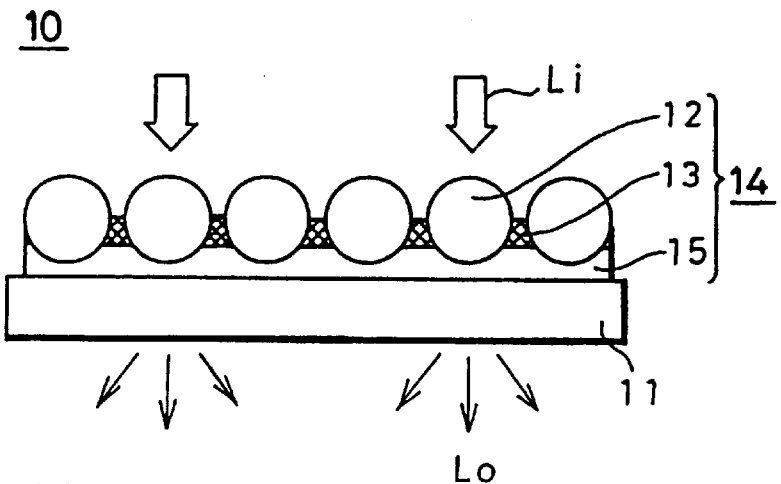
FIG. 10 is a schematic, cross-sectional view of a plano lens or a screen according to a second embodiment of the present invention.

FIG. 10 is a diagram showing a plano lens 10 according to a second embodiment of the present invention. In the second embodiment, the plano lens 10 has an arrangement similar to that described with reference to FIG. 9. However, in the second embodiment, as shown in FIG. 10, a minute-transparent-ball disposing layer 14 has a bi-layer structure formed of a colored layer 13 and a transparent layer each of which has adhesion or cohesion. In this case, since the transparent layer 15 is disposed on the light emission end side thereof, light transmittance at the light emission end side is increased and hence it is possible to obtain a larger amount of light emitted from the minute transparent balls 12. In this embodiment, since the minute transparent balls 12 are buried in both of the colored layer 13 and the transparent layer 15, the minute transparent balls 12 can be held more tightly.

Figure 11:
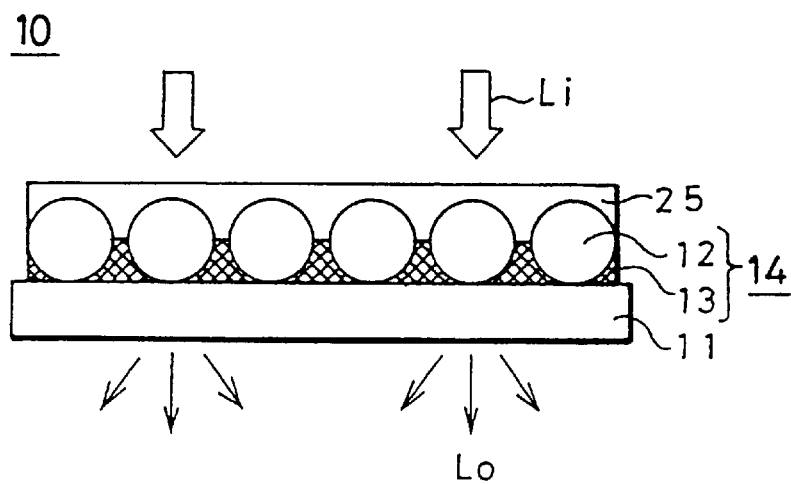
FIG. 11 is a schematic, cross-sectional view of a plano lens or a screen according to a third embodiment of the present invention.
Figure 12:
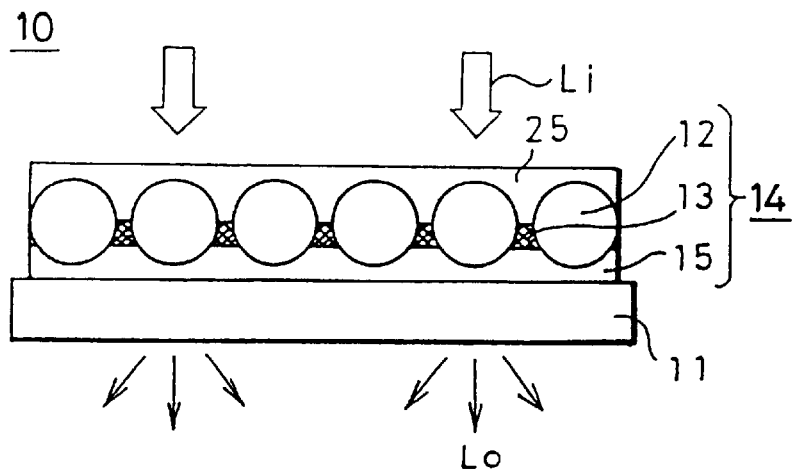
FIG. 12 is a schematic, cross-sectional view of a plano lens or a screen according to a fourth embodiment of the present invention.

Plano lenses 10 according to third and fourth embodiments shown in FIGS. 11 and 12 respectively have the same arrangements as those according to the first and second embodiments shown in FIGS. 9 and 10 and are respectively arranged such that each has a transparent protective layer 25 having adhesion or cohesion relative to the minute transparent ball disposing layer 14 is disposed on the opposite side of the minute transparent ball disposing layer 14 relative to the transparent base member 11. The minute transparent balls 12 thus are protected on their sides opposite the sides in contact with the transparent base member 11.

Figure 13:
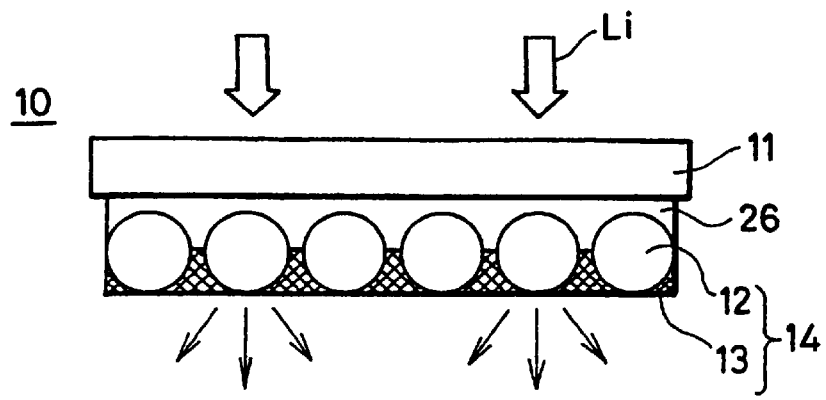
FIG. 13 is a schematic, cross-sectional view of a plano lens or a screen according to a fifth embodiment of the present invention.
Figure 14:
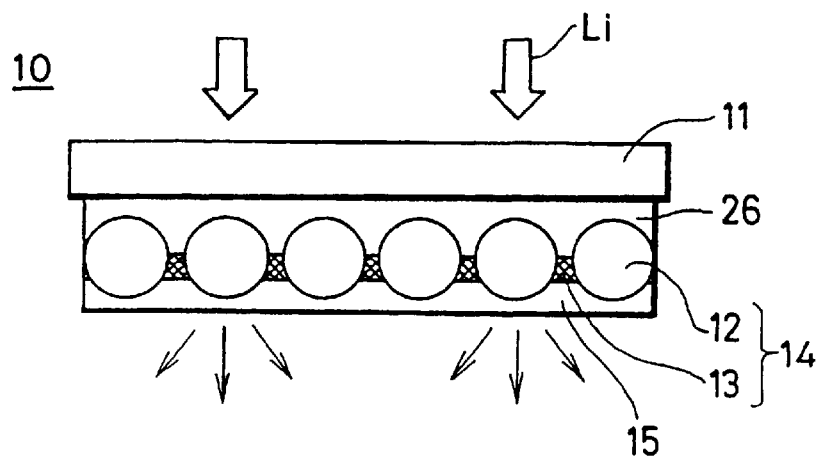
FIG. 14 is a schematic, cross-sectional view of a plano lens or a screen according to a sixth embodiment of the present invention.

Plano lenses 10 according to fifth and sixth embodiments shown in FIGS. 13 and 14 respectively have arrangements similar to those according to the first and second embodiments shown in FIGS. 9 and 10 except that in each the transparent base member 11 is disposed on the light incidence sides of the minute transparent ball disposing layer 14. The minute transparent ball disposing layer 14 is bonded to the transparent base member 11 by a transparent layer 26 having adhesion or cohesion.

Figure 15:
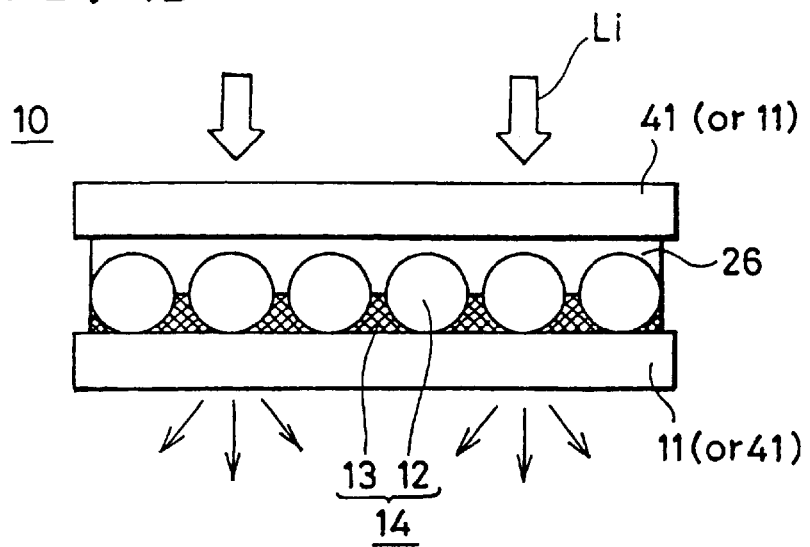
FIG. 15 is a schematic, cross-sectional view of a plano lens or a screen according to a seventh embodiment of the present invention.
Figure 16:
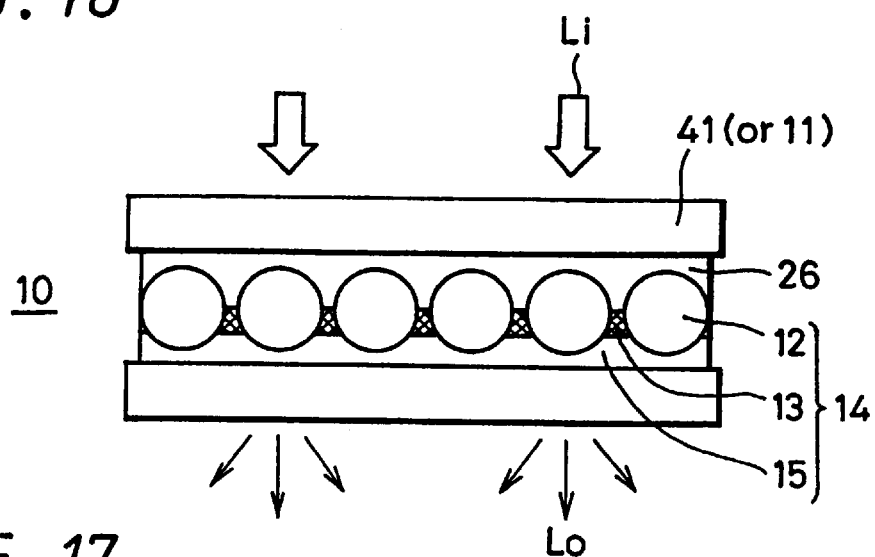
FIG. 16 is a schematic, cross-sectional view of a plano lens or a screen according to an eighth embodiment of the present invention.

Plano lenses 10 according to seventh and eighth embodiments shown in FIGS. 15 and 16 respectively have arrangements similar to those according to the first or fifth embodiment shown in FIG. 9 or 13 and the second or sixth embodiment shown in FIG. 10 or 14 except that in each the transparent base member 11 and the protective transparent base member 41 are disposed so as to sandwich the minute-transparent-ball disposing layer 14. This arrangement can maintain strength of the plano lens 10 and can prevent the minute transparent balls 12 in the minute-transparent-ball disposing layer 14 and the colored layer 13 from being damaged and soiled. The protective transparent base member 41 may be made of the same material as that used for the transparent base member 11. Alternatively, one of the transparent base member 11 and the protective transparent base member 41 may be formed of a rigid substrate, the other thereof being formed of a flexible base member.

While the plano lens 10 according to the present invention can form the rear-projection type projector screen by itself, as shown in FIGS. 17 to 20, the rear-projection type projector screen 10S can be formed by integrally bonding the plano lens 10 with a Fresnel lens 27 used for making projected video light incident on the plano lens 10 as parallel light.

FIGS. 17 to 20 are diagrams showing rear-projection type projector screens 10S in each of which a Fresnel lens 27 is formed on a transparent base member 31. In FIGS. 17 to 20, like parts corresponding to those shown in FIGS. 9 to 16 are marked with the same reference numerals and need not to be described in detail.

Figure 17:
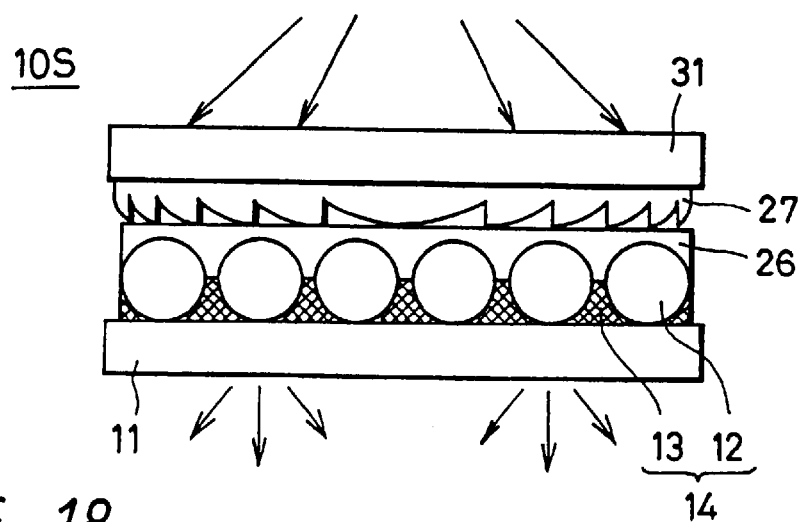
FIG. 17 is a schematic, cross-sectional view of a plano lens or a screen according to a ninth embodiment of the present invention.

In the rear-projection type projector screen 10S according to a ninth embodiment shown in FIG. 17, a Fresnel lens 27 is bonded by a transparent layer 26 having adhesion or cohesion to the plano lens 10 according to the first embodiment shown in FIG. 9 (i.e., to the light incidence side of the minute transparent ball 12 shown in FIG. 9).

Figure 18:
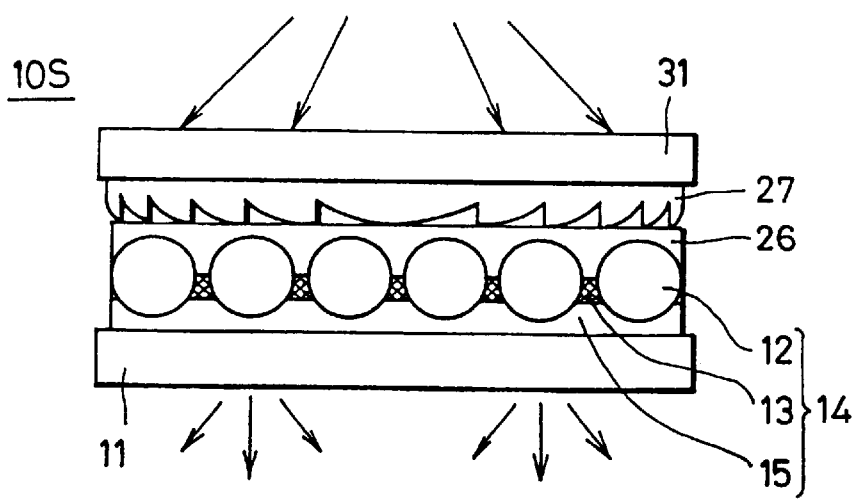
FIG. 18 is a schematic, cross-sectional view of a plano lens or a screen according to a tenth embodiment of the present invention.

In the rear-projection type projector screen 10S according to a tenth embodiment shown in FIG. 18, a Fresnel lens 27 is bonded by a transparent layer 26 having adhesion or cohesion to the plano lens 10 according to the second embodiment shown in FIG. 10 (i.e., to the light incidence side of the minute transparent ball 12 shown in FIG. 10).

Figure 19:
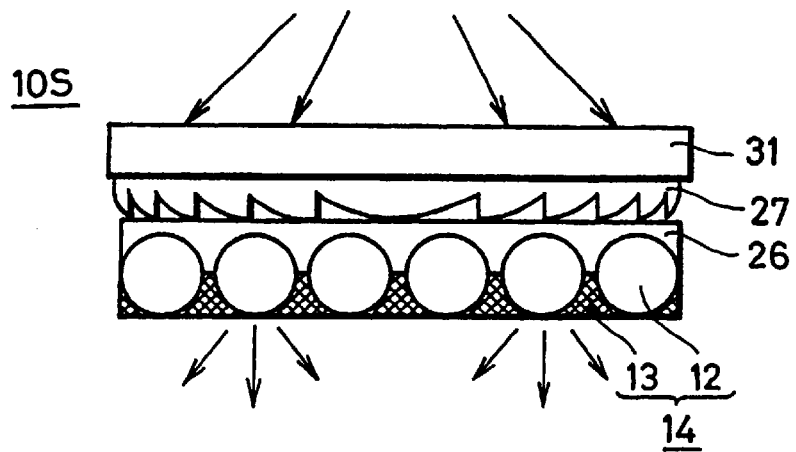
FIG. 19 is a schematic, cross-sectional view of a plano lens or a screen according to an eleventh embodiment of the present invention.

In the rear-projection type projector screen 10S according to an eleventh embodiment shown in FIG. 19, in stead of the transparent base member 11 shown in FIG. 13, a Fresnel lens 27 is bonded by a transparent layer 26 having adhesion or cohesion to the plano lens 10 according to the fifth embodiment shown in FIG. 13 (i.e., to the light incidence side of the minute transparent ball 12 shown in FIG. 13).

Figure 20:
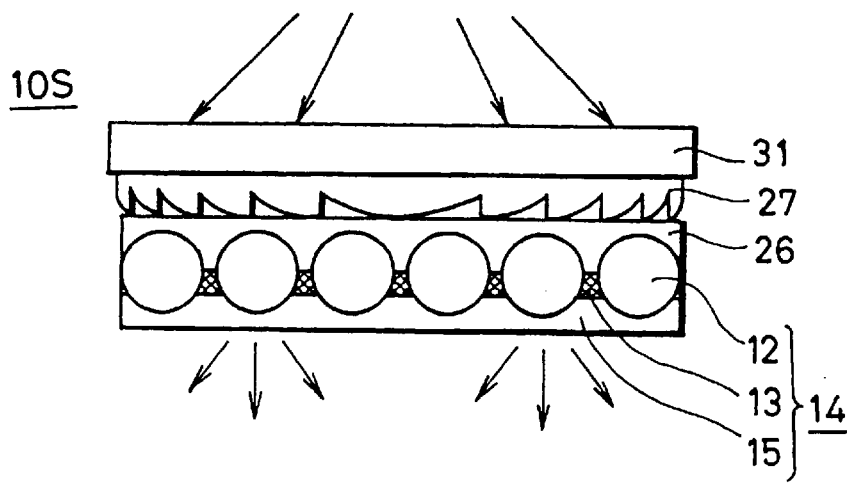
FIG. 20 is a schematic, cross-sectional view of a plano lens or a screen according to a twelfth embodiment of the present invention.
Figure 21:
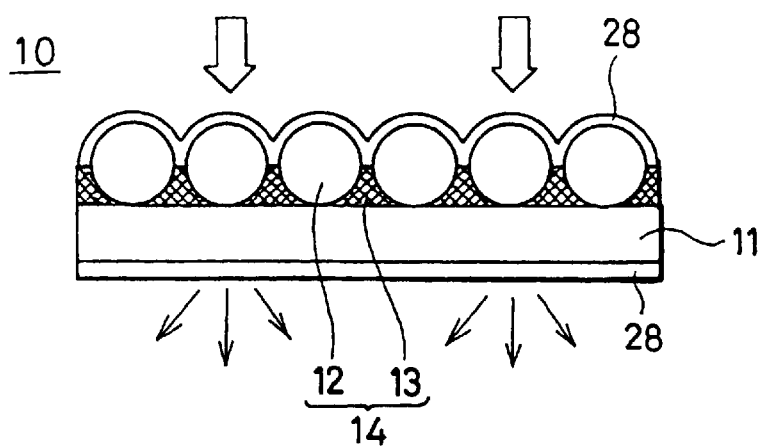
FIG. 21 is a schematic, cross-sectional view of a plano lens or a screen according to the present invention with an anti-reflection layer.
Figure 22:
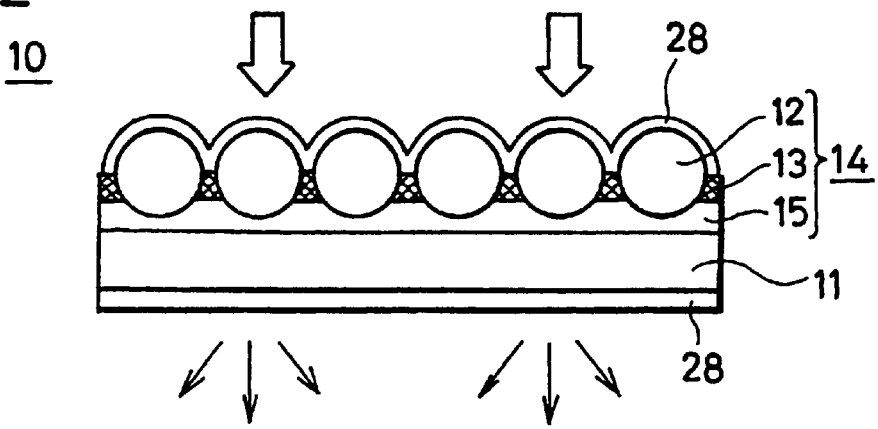
FIG. 22 is a schematic, cross-sectional view of a plano lens or a screen according to the present invention with an anti-reflection layer.
Figure 23:
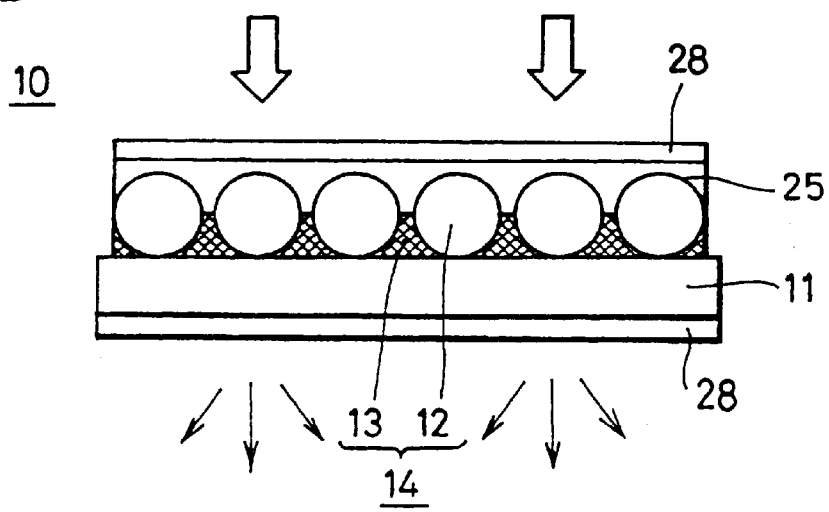
FIG. 23 is a schematic, cross-sectional view of a plano lens or a screen according to the present invention with an anti-reflection layer.
Figure 24:
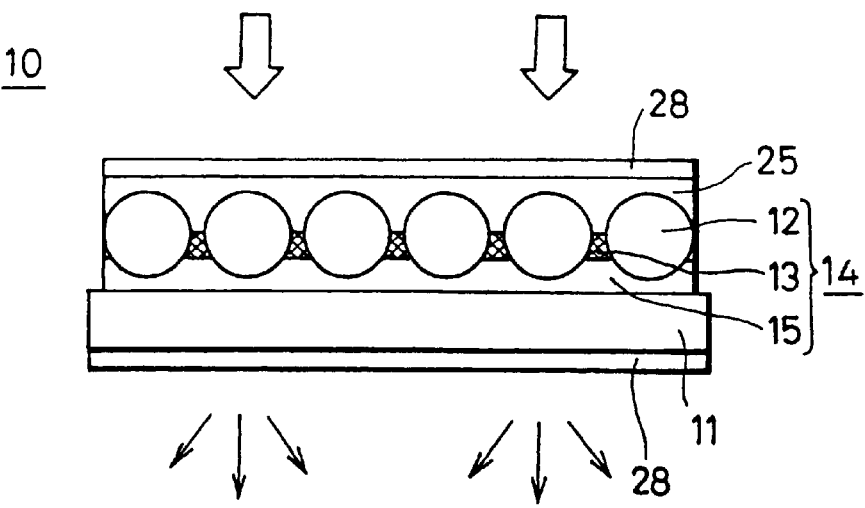
FIG. 24 is a schematic, cross-sectional view of a plano lens or a screen according to the present invention with an anti-reflection layer.
Figure 25:
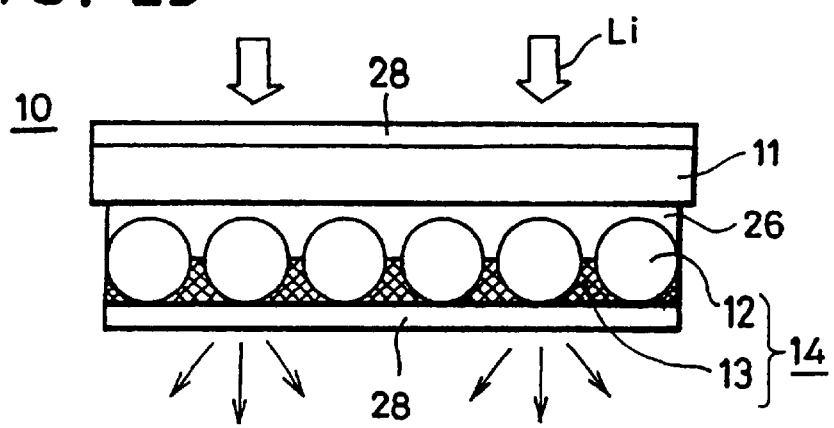
FIG. 25 is a schematic, cross-sectional view of a plano lens or a screen according to the present invention with an anti-reflection layer.
Figure 26:
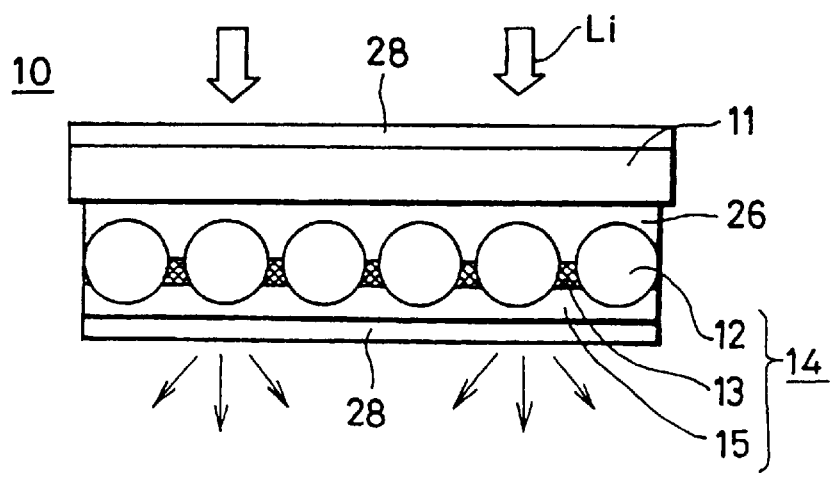
FIG. 26 is a schematic, cross-sectional view of a plano lens or a screen according to the present invention with an anti-reflection layer.
Figure 27:
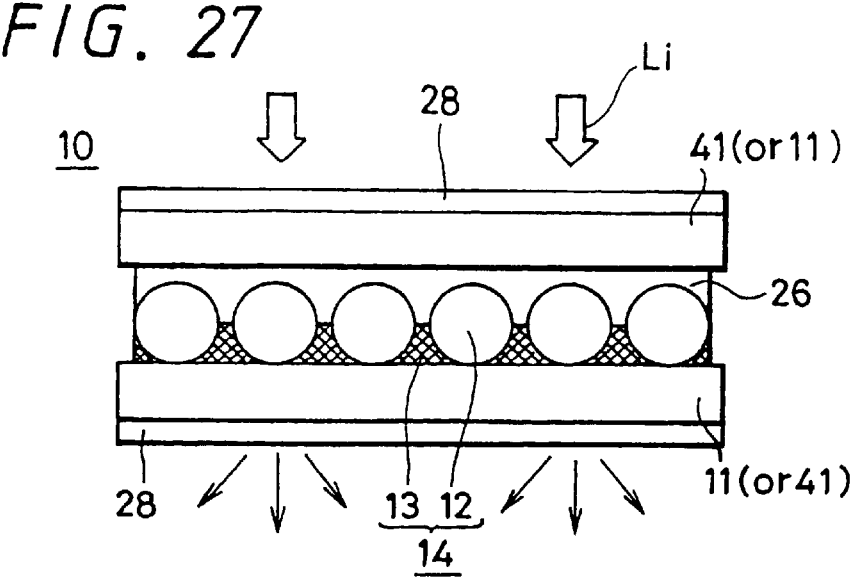
FIG. 27 is a schematic, cross-sectional view of a plano lens or a screen according to the present invention with an anti-reflection layer.
Figure 28:
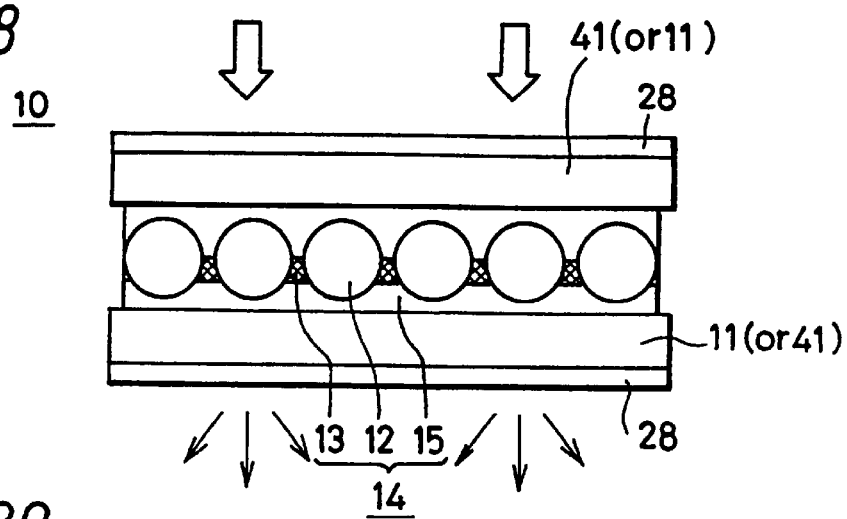
FIG. 28 is a schematic, cross-sectional view of a plano lens or a screen according to the present invention with an anti-reflection layer.
Figure 29:
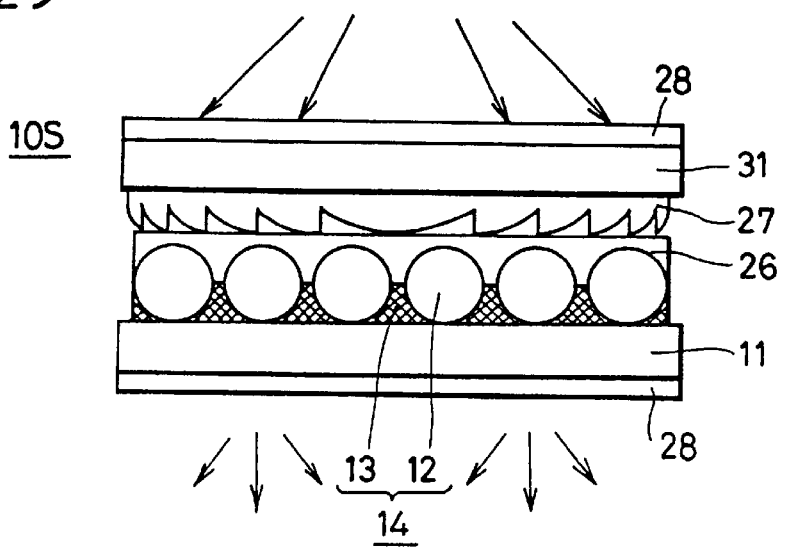
FIG. 29 is a schematic, cross-sectional view of a plano lens or a screen according to the present invention with an anti-reflection layer.
Figure 30:
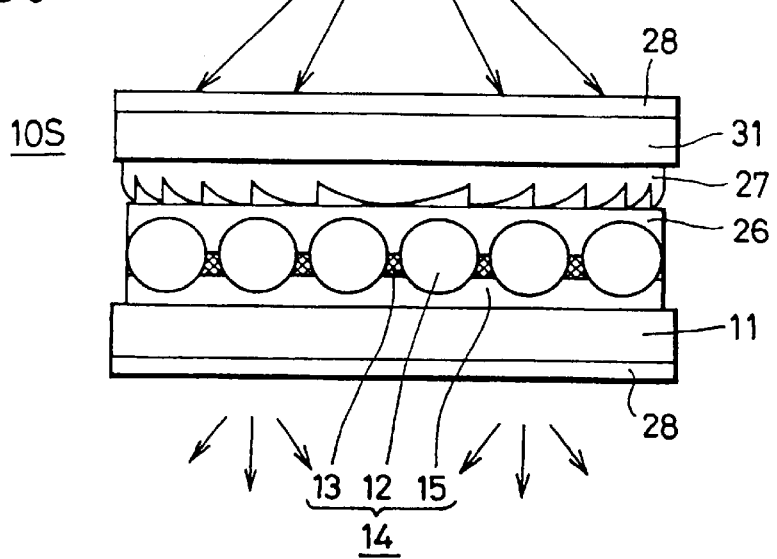
FIG. 30 is a schematic, cross-sectional view of a plano lens or a screen according to the present invention with an anti-reflection layer.
Figure 31:
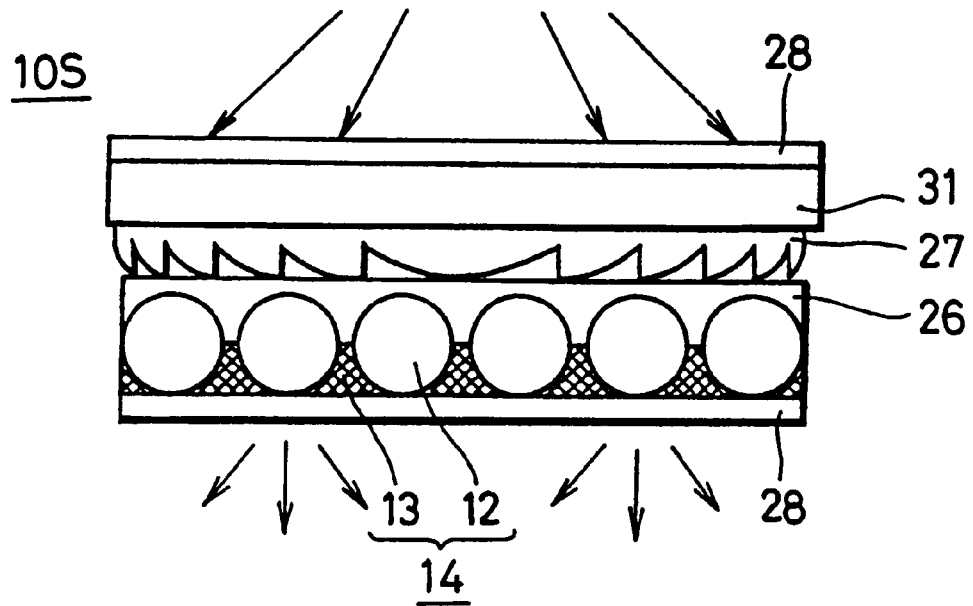
FIG. 31 is a schematic, cross-sectional view of a plano lens or a screen according to the present invention with an anti-reflection layer.
Figure 32:
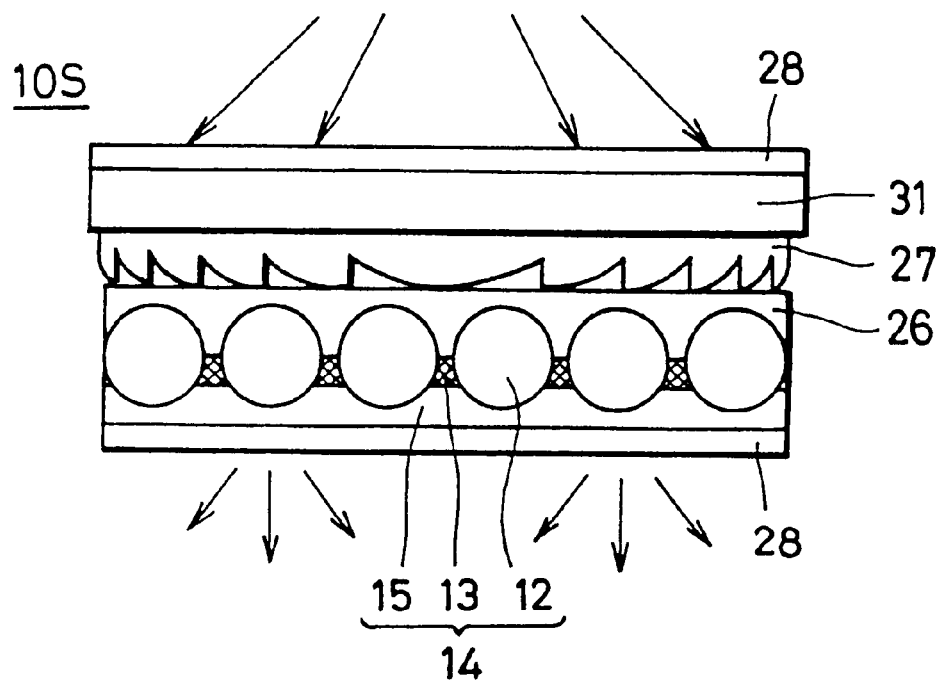
FIG. 32 is a schematic, cross-sectional view of a plano lens or a screen according to the present invention with an anti-reflection layer.

In the rear-projection type projector screen 10S according to a twelfth embodiment shown in FIG. 20, in stead of the transparent base member 11 shown in FIG. 14, a Fresnel lens 27 is bonded by a transparent layer 26 having adhesion or cohesion to the plano lens 10 according to the sixth embodiment shown in FIG. 14 (i.e., to the light incidence side of the minute transparent ball 12 shown in FIG. 14).

As described above, when the Fresnel lens 27 is bonded instead of the transparent member 11 in the arrangement according to the eleventh and twelfth embodiments, it is possible to simplify the arrangement of the screen 10S.

In each of the arrangements according to the first to twelfth embodiments shown in FIGS. 9 to 20, as shown in FIGS. 21 to 32, an anti-reflection layer 28 is deposited on both of outermost surfaces on the light incidence side and the light emission side of each of the plano lenses 10 and the screens 10S according to the first to twelfth embodiments. Such arrangement can allow the incident light to be effectively made incident on the plano lens 10 or the screen 10S and also allows the emission light to be effectively emitted therefrom. In FIGS. 21 to 32, like parts corresponding to those shown in FIGS. 9 to 20 are marked with the same reference numerals and need not to be described in detail. While in each of the arrangements shown in FIGS. 21 to 32 the anti-reflection layer 28 is deposited on both of the outermost surfaces on the light incidence side and the light emission side of the plano lens 10 or the screen 10S, the anti-reflection layer 28 may be deposited on only one surface thereof. Glare preventing layers (not shown) can be further deposited on each of the plane lenses 10 and the screens 10S shown in FIGS. 21 to 32. Moreover, a protective transparent layer such as a scratch preventing layer for protecting the transparent base member, the minute-transparent-ball disposing layer 14 or the like disposed on the outermost side can be formed instead of or on the anti-reflection layers 28 or instead of one of the anti-reflection layers 28. When the anti-reflection layers 28 or the protective transparent layers such as the scratch preventing layer are formed as described above, it is possible to increase the light transmittance of the plano lens 10 or the screen 10S, to reduce reflectivity thereof, and to avoid damage, which improves an optical performance of the plano lens 10 and the screen 10S.

In the plano lens 10 and the screen 10S according to the present invention, each of the transparent base members 11, 41 and 31 can be formed of a transparent or semitransparent and comparatively thick substrate or a comparatively thin flexible sheet each of which has light transmission capable of providing an action as a lens.

Each of the transparent base members 11, 41 and 31 is formed of some suitable material such as, for example, glass, acrylic resin, polycarbonate resin, polyolefin resin, vinyl chloride resin, polystyrene resin, polyethylene resin, epoxy resin, polyarylate resin, polyether sulfone resin, silicone resin, poly(ethhylene terephthalate) resin or the like.

Each minute transparent ball 12 can be formed of a glass bead or a plastic bead made of acrylic resin, polystyrene resin or the like. The minute transparent ball 12 is formed of a material having a refractive index of 1.4 or larger and having a refractive index larger than that of a material in contact therewith, e.g., the protective transparent layer 25 or the transparent layer 26 used for bonding, thereby the incident light being effectively introduced into the minute transparent ball 12 for providing an action as a lens.

A diameter of the minute transparent ball 12 is set equal to or smaller than 100 $\mu$m, e.g, about 50 $\mu$m. If the size of the minute transparent balls 12 were larger, when the rear-projection type projector screen is normally used, a viewer can more easily recognize gaps between the minute transparent balls 12 with the naked eyes, which results in a lowered resolution and a deteriorated picture quality of a projected picture. If the diameter of the minute transparent ball 12 is set equal to or smaller than 100 $\mu$m, the resolution is 5 lines/mm, and if the diameter of the minute transparent ball 12 is set equal to or smaller than 50 $\mu$m, the resolution is 10 lines/mm. On the other hand, a resolution of the conventional lenticular lens is 1 line/mm.

While a lower limit of the size of the minute transparent ball 12 is not set, if the size of the minute transparent ball 12 is too small, then it becomes difficult to dispose the minute transparent balls 12 in a single grain layer and it becomes difficult to form the bonding layer and to make a thickness of the bonding layer uniform.

Fluctuation of the sizes of the minute transparent balls 12 are set within the range of 10% or less of a mean diameter. The reason for this is that it is confirmed if the fluctuation of the diameters of the minute transparent balls 12 is increased, then a process of densely filling the minute transparent balls 12 in the minute-transparent-ball disposing layer 14 cannot be carried out satisfactorily and uniformly.

The refractive index of the minute transparent ball 12 is set larger than those of the surrounding portions and particularly the surrounding portions on the light incidence end side. In order to obtain a sufficient effect of a converging lens, the refractive index of the minute transparent ball 12 is set equal to or larger than 1.4.

As will be described later on, a light converging effect is determined in response to a value of the refractive index of the surrounding portions on the light incidence end side of the minute transparent ball and a value of the refractive index of the minute transparent ball, and hence a diffusion angle on the light emission side of the minute transparent ball is determined. Therefore, since diffusion angles of the plano lens and the screen according to the present invention are determined in accordance with the law of refraction in optics (i.e., Snell's law of refraction), it is possible to obtain a desired diffusion angle by selecting refractive indexes of the respective parts and members of the plano lens or the screen.

The surface of the minute transparent ball 12 may be subjected both of or either of an anti-reflection processing and a water-repellency processing.

While the surface of the minute transparent ball 12 can be set as an optically smooth surface, the surface of the minute transparent ball 12 can be set as a surface having minute concaves and convexes to an extent that the minute transparent balls 12 can be filled densely, thereby an effect of scattering being controlled and adjusted. Alternatively, if it is desired to avoid unnecessary reflection and scattering at the surface of the minute transparent ball 12, the surface of the minute transparent ball 12 can be subjected to the anti-reflection processing or can be subjected to the water-repellency processing in the manufacturing processes if necessary. For example, if the water-soluble colored layer 13 is formed, then the surface of the minute transparent ball 12 can be previously subjected to the water-repellency processing in order to prevent the colored layer from covering the light incidence end side of the minute transparent ball 12.

The colored layer 13 in the minute-transparent-ball disposing layer 14 can be formed of a block pigment such as carbon or the like, a block pigment such as a so-called toner obtained by mixing a binder with carbon or the like and a block dye of aniline system or the like, can be formed by dispersing a black pigment in a transparent resin such as acrylic resin, polycarbonate resin, polyolefin resin, vinyl chloride resin, polystyrene resin, polyethylene resin, epoxy resin, polyarylate resin, polyether sulfone resin, silicone resin, poly(ethhylene terephthalate) resin or the like, can be formed of a layer made of a black material dyed with a black dye. The colored layer 13 can be formed of a material layer having functions such as adhesion, cohesion or the like in necessity in fabrication is caused.

The colored layer 13 is not limited to the black layer and may be a layer having spectral distribution of red, green, blue or the like. The colored layer can be formed of a material obtained by mixing a plurality of pigments or dyes having different color distributions.

In the minute-transparent-ball disposing layer 14, the minute transparent ball 12 is projected i.e., exposed from the colored layer 13 on the light incidence side by an amount corresponding to 30% or longer of the diameter of the minute transparent ball 12 and more preferably 50% or longer thereof. If the projected amount is smaller than 30% of the diameter, then an amount of incident light entering the minute transparent ball 12 is reduced, which may prevent the effective minute transparent ball 12 from presenting an effect of diffusing the incident light. If on the other hand the exposed amount of the minute transparent ball 12 relative to the colored layer 13 is increased, then the amount of the light incident on the minute transparent ball 12 is increased, which increases the luminance. However, an upper limit of the exposed amount is subject to the thickness of the colored layer 13. Specifically, the thickness of the colored layer 13 corresponds to 70% of the diameter of the minute transparent ball 12, while a lower limit of the thickness of the colored layer 13 is determined depending upon absorbance or spectral absorbance of the colored layer 13. Specifically, if the absorbance or the spectral absorbance is small and the thickness of the colored layer 13 is thin in consideration of the incident light, then the incident light is transmitted through the colored layer 13, which increases an amount of light which is not diffused by the minute transparent ball 12. As a result, the inherent characteristics of the plano lens are deteriorated, and an amount of absorbed external light from the emission side is lowered, which lowers the contrast of the image.

The above protective transparent layer, e.g., the transparent layer 25, the transparent layer formed at the outermost side, the transparent layer 26 and further the transparent layer 15 of the minute transparent ball disposing layer 14 can be formed of transparent resin such as acrylic resin, polycarbonate resin, polyolefin resin, vinyl chloride resin, polystyrene resin, polyethylene resin, epoxy resin, polyarylate resin, polyether sulfone resin, silicone resin, poly(ethhylene terephthalate) resin or the like. Even if the above protective transparent layers are employed in the same plano lens, it is not necessary to form the protective transparent layers of the same material, and proper materials can be selected for the respective protective transparent layers depending upon the method of manufacturing the plano lens. For example, the transparent layer 15 of the minute-transparent-ball disposing layer 14 may be formed of a material having cohesion for holding the light emission side end portion of the minute-transparent-ball disposing layer 14 with the light emission side end portion being buried therein, and the transparent layer 26 may be formed of a material having adhesion or cohesion.

While each of the protective transparent layer 25, transparent layer 26, the transparent layer 15 of the minute-transparent-ball disposing layer 14 and so on can be formed of a single layer, each of them may be formed by laminating a plurality of layers made of different materials selected from the above transparent materials and so on.

Other than acrylic resin, polycarbonate resin, polyolefin resin, vinyl chloride resin, polystyrene resin, polyethylene resin, epoxy resin, polyarylate resin, polyether sulfone resin, silicone resin, poly(ethhylene terephthalate) resin or the like, the anti-reflection layer 28 and the protective transparent layer such as the scratch prevention layer or the like can by formed of tetraethyl orthosilicate by chemical vapor deposition or formed by depositing $SiO_2$ or metal thin film by vacuum evaporation, sputtering, sol-gel process or the like.

The above respective transparent layers, the colored layer and so on can be coated by knife coating, e.g., roll coating, gravure coating, kiss coating, spray coating, blade coating rod coating or the like.

As shown in FIG. 6, the projector apparatus 60 is disposed at the back of the screen employing the plano lens 10 according to the present invention, e.g., one of the screens 10S shown in FIGS. 14 to 17 and FIGS. 26 to 29, the projector apparatus 60 projects a projected picture on the screen 10S. The viewer watches a transmitted picture diffused in the vertical and horizontal directions by the screen 10S from the front of the screen 10S.

As shown in FIG. 7, the screen 10S is disposed at the front side of the case body 61, and the light from the video projector unit 1 disposed in the case body 61 is reflected by the reflection mirror 3, thus a viewer watching the transmission image diffused by the screen 10S in the vertical and horizontal directions from the front of the screen 10S.

In the plano lens 10 and the screen 10S employing the plano lens 10 according to the present invention, the minute transparent balls 12 of the minute-transparent-ball disposing layer 14 can be formed of minute transparent balls of two kinds or more having different refractive indexes.

Figure 33:
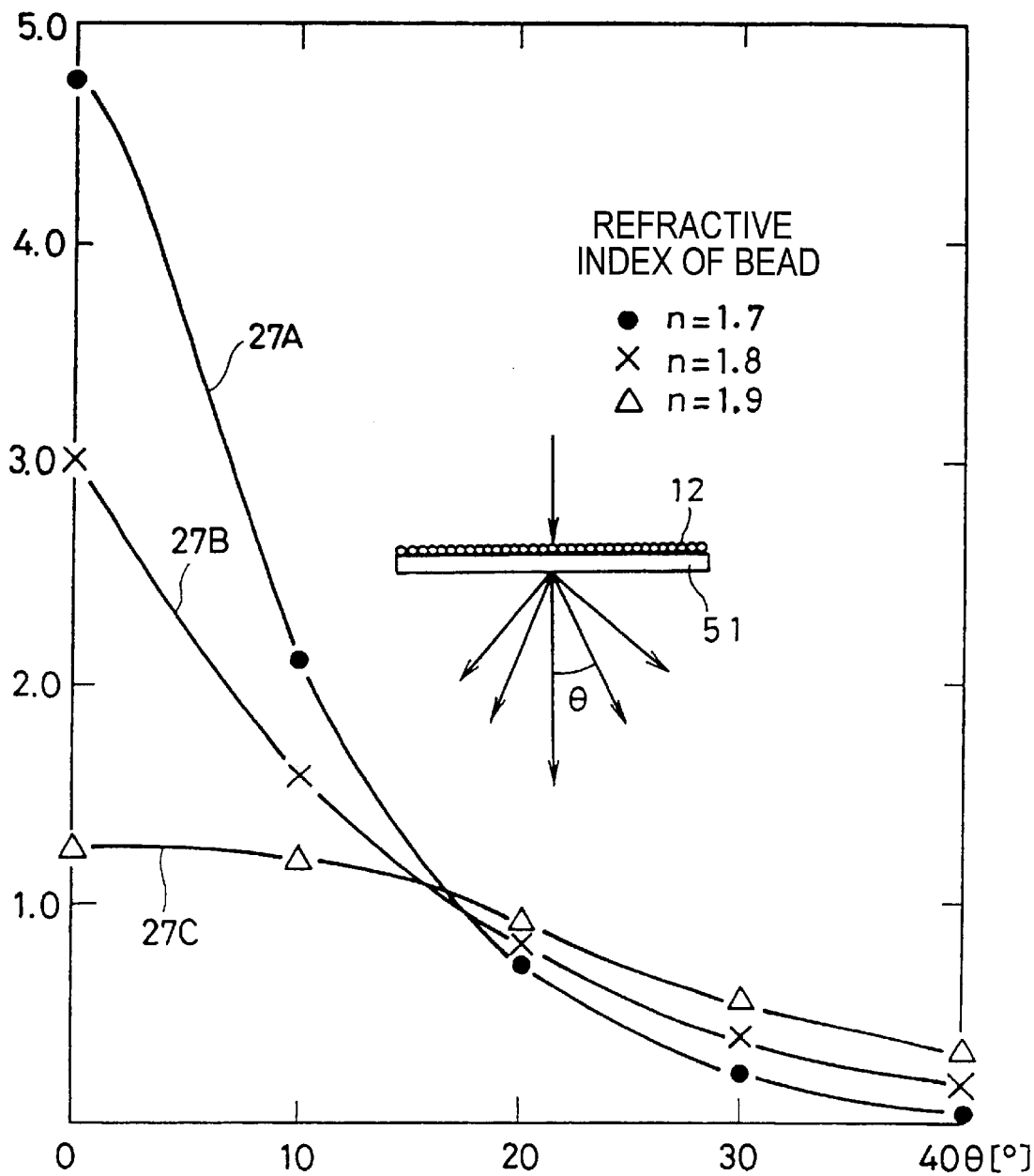
FIG. 33 is a graph used to explain dependence of a refractive index of a minute transparent ball on an angle of view.

Specifically, in the above arrangements, as the minute transparent ball 12 of the minute-transparent-ball disposing layer 14 has a larger refractive index, its action as the lens, i.e., the convergence effect is improved and hence the diffusion angle becomes larger. In FIG. 33, curves 27A, 27B and 27C represent dependence of gains upon an angle view obtained when the angle is an angle of view (angle relative to an incident angle) θ on the emission side obtained when light is made vertically incident on a transparent substrate 51 in which the minute transparent balls 12 are disposed in a single grain layer and the refractive index n of the minute transparent ball 12 is set to n=1.7, n=1.8 and n=1.9. Study of FIG. 33 reveals that as a value of θ is increased, each of the gains is lowered, but when an picture displayed on a screen is observed from a range of a small value of θ, i.e., from a substantial just front position, as the refractive index is larger, the gain is smaller.

The present invention is made in consideration of this phenomenon. According to the present invention, it is an object of the present invention that one lens or one screen is formed by mixing the minute transparent balls of two kinds or larger having different refractive indexs or by disposing them in a predetermined distribution and hence the lens or the screen is arranged such that the refractive index is changed stepwise or gradually from the center portion to the periphery portion, thereby desired brightness being obtained in each of the portions of one lens or one screen.

Figure 34A:
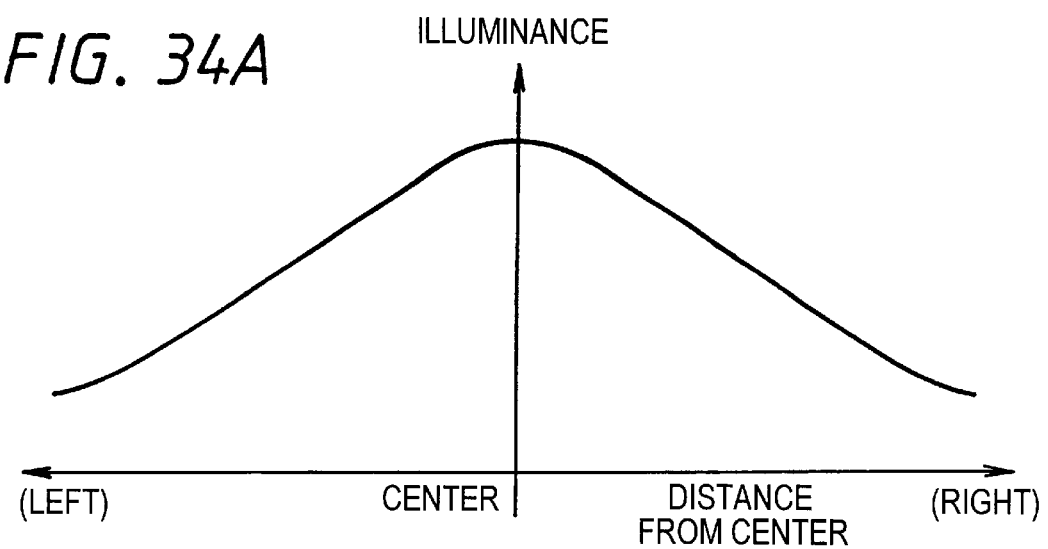
FIGS. 34A, 34B and 34C are distributions of illumination, gain and brightness, respectively.

Specifically, illumination light from a normal light source or light representing a picture in a predetermined picture angle from the video projector unit, as shown in FIG. 34A which is a graph showing an illumination distribution thereof, is the largest at the center of the picture and becomes smaller as the position is away from the center. Therefore, when the illumination light or the light representing a picture is made incident on the plano lens or the screen, brightness of the screen on the emission side is large at the center and becomes darker in the direction toward the periphery.

Figure 35:
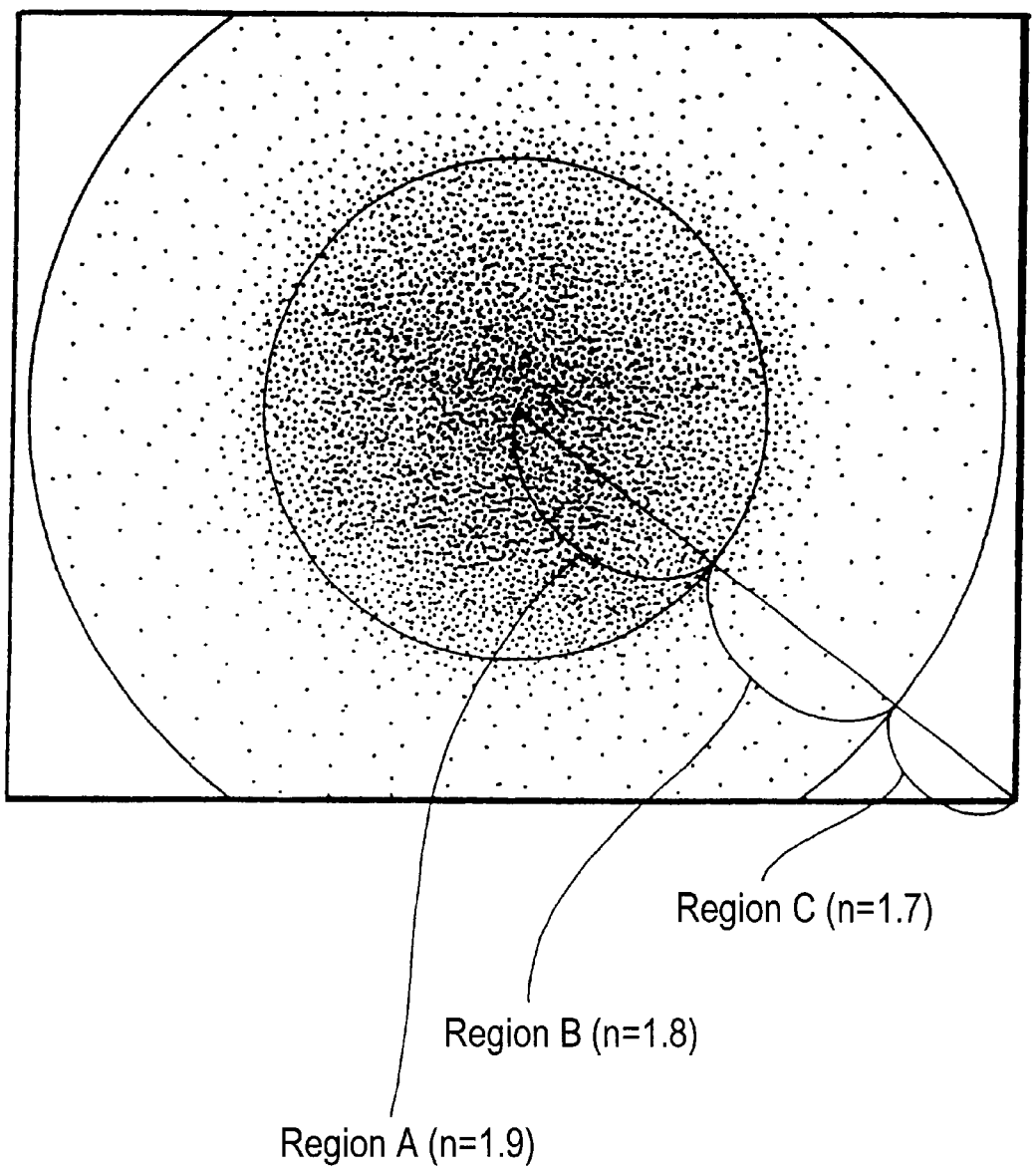
FIG. 35 is a diagram showing distribution of a refractive index of the plano lens or the screen according to the present invention.
Figure 36:
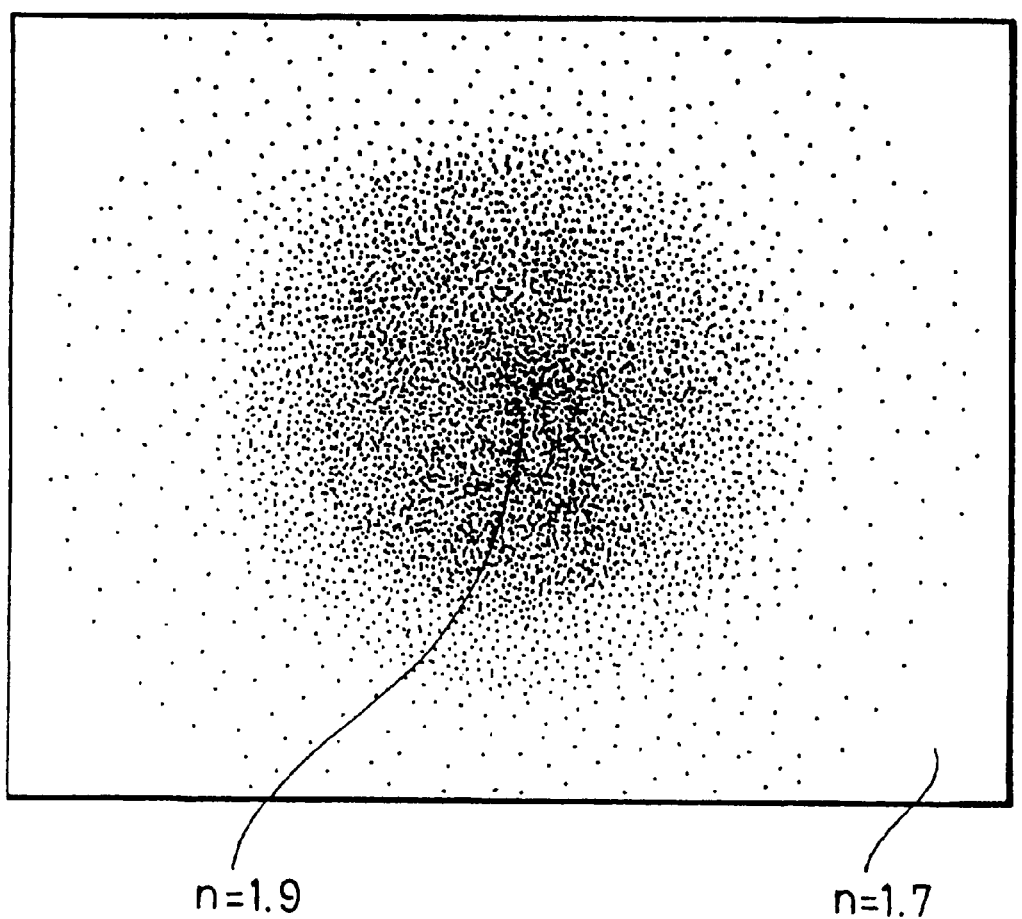
FIG. 36 is a diagram showing distribution of a refractive index of the plano lens or the screen according to the present invention.

As shown in FIG. 35, in the plano lens 10 or the screen 10S according to the present invention, the minute transparent balls 12 having a refractive index of n=1.9 are disposed in a region A at its center, the minute transparent balls 12 having a refractive index of n=1.8 are disposed in a region B located at its outer side of the region A, and the minute transparent balls 12 having a refractive index of n=1.7 are disposed in a region C at its outermost periphery.

Alternatively, the plano lens 10 or the screen 10S is arranged such that the refractive index is gradually changed from n=1.9 to n=1.7 from the center to the outermost periphery. In this case, such arrangement is achieved by concentrically disposing the minute transparent balls 12 of plural kinds having different refractive indexes so as to successively change the refractive index from n=1.9 to n=1.7, and also achieved by changing a mixing ratio of the minute transparent balls having different refractive indexes so that the refractive index should be successively changed from n=1.9 to n=1.7 from the center to the outermost periphery.

Figure 37A:
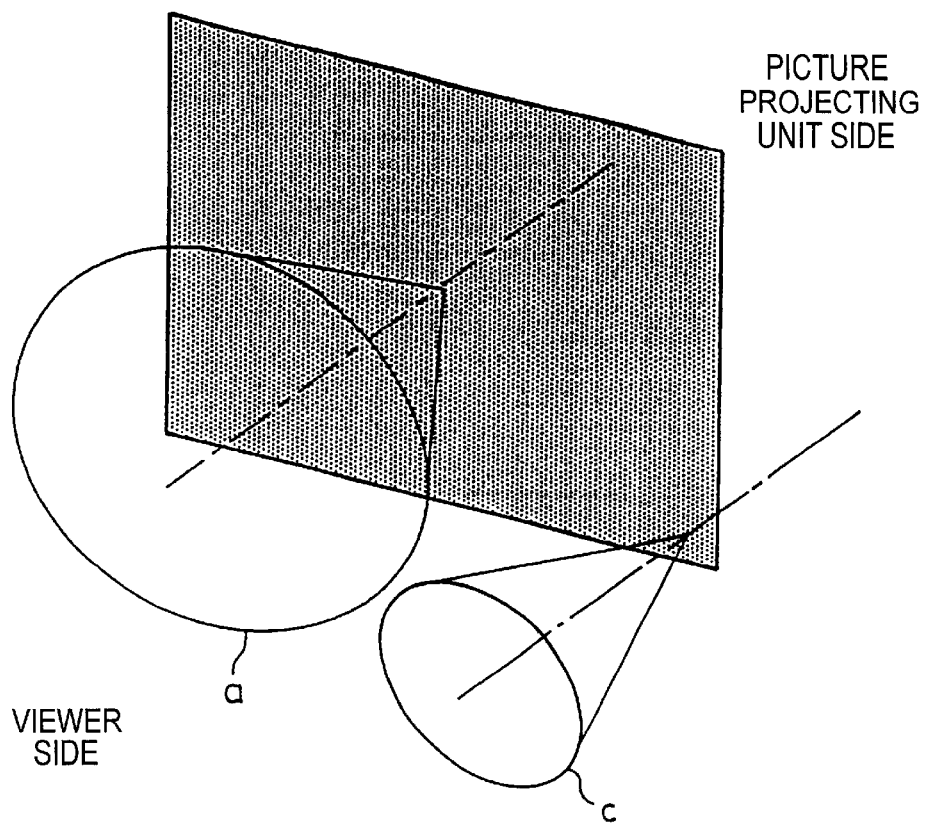
FIG. 37A is a diagram showing a distribution of illumination at a certain level or higher of light projected on a plano lens or a screen of the rear-projection type video display apparatus according to the present invention.
Figure 37B:
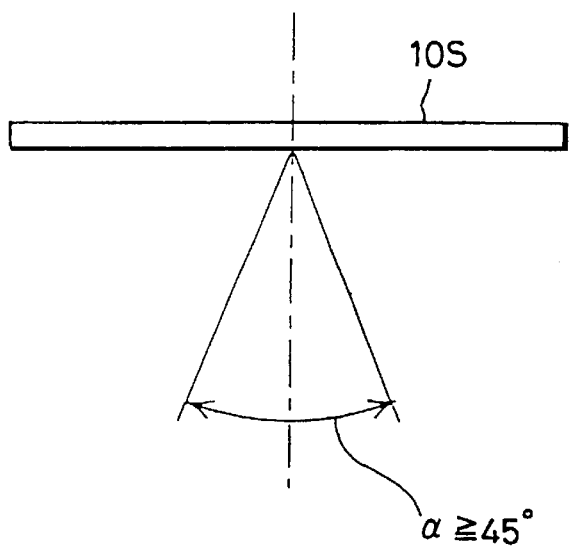
FIGS. 37B and 37C are diagrams used to explain the distribution according to the present invention.
Figure 37C:
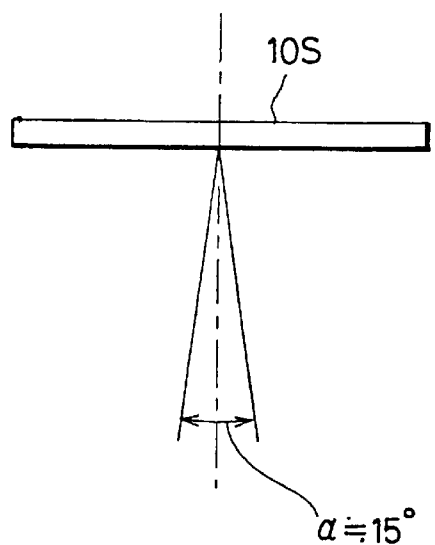

When the refractive index of the plano lens 10 and the screen 10S is changed from the center to the periphery as described above, as schematically shown in FIGS. 37A to 37C, a diffusion-angle region indicative of 50% of the center luminance in the vertical and horizontal directions is large at the center of the screen and small at the periphery thereof as indicated by cones a and c shown in FIG. 37A. For example, the region with the refractive index of n=1.9 has horizontal and vertical enlargement angles $\alpha \geq 45°$ as shown in FIG. 37B, and the region with the refractive index of n=1.7 has horizontal and vertical enlargement angles $\alpha$ of about 15° as shown in FIG. 37C.

Figure 34B:
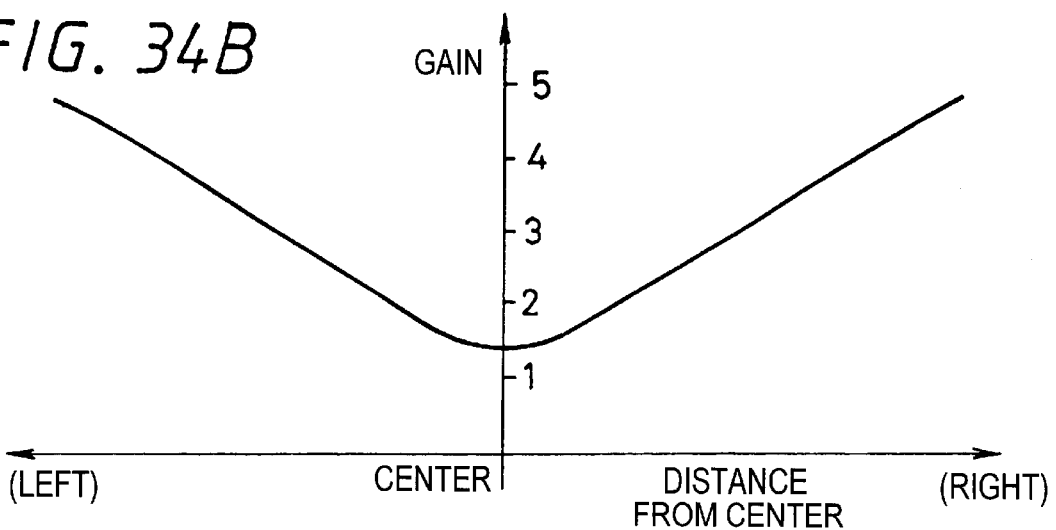
Figure 34C:
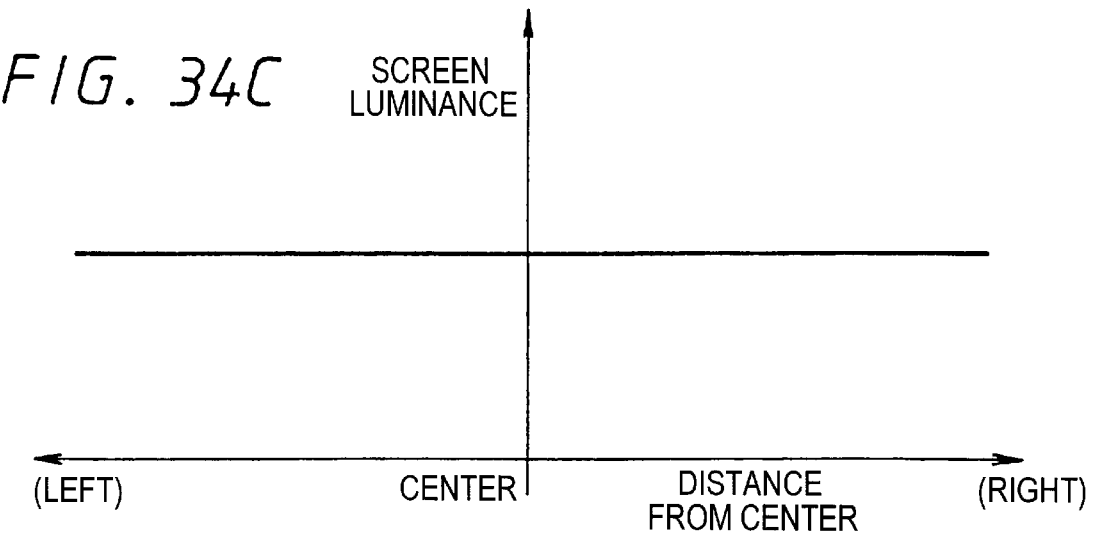

Specifically, the gain distribution of the plano lens 10 or the screen 10S is small at the center thereof and large at the periphery thereof as shown in FIG. 34B, which can compensate the illumination distribution shown in FIG. 34A to thereby flattening the brightness of light transmitted through the plano lens 10 or the screen 10S as shown in FIG. 34C.

Figure 38A:
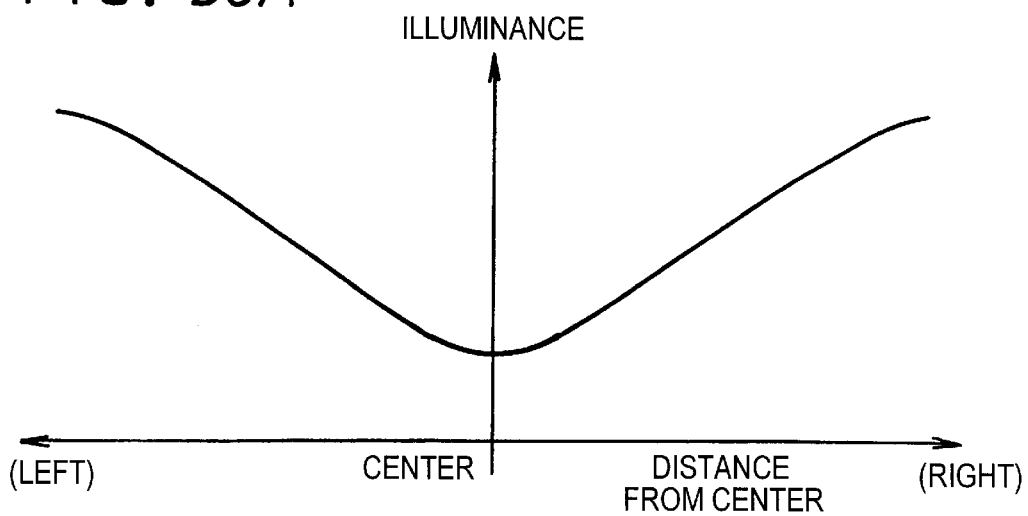
FIGS. 38A to 38C are graphs used to distributions of illuminance, gain and screen luminance of the plano lens or the screen according to the present invention.
Figure 38B:
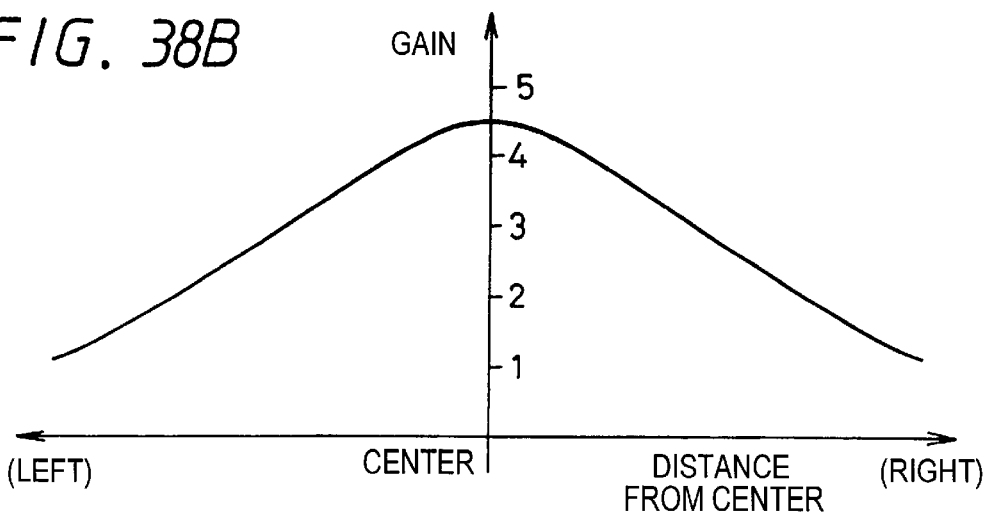
Figure 38C:
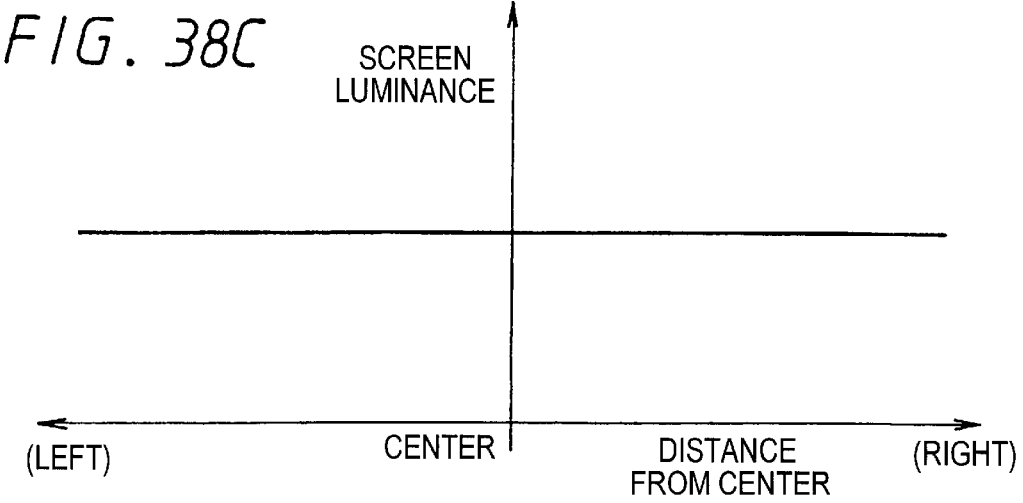

In this case, when the illumination distribution is the largest at the center of the screen and becomes smaller in the direction toward the periphery, the brightness is made even. Contrary, as shown in FIG. 38A which is a graph showing illumination, when illumination of the light irradiated on the plano lens 10 or the screen 10S is the smallest at the center thereof and becomes larger in the direction toward the periphery thereof, the brightness can be made even by the same method as described above. Specifically, contrary to the above method, the plano lens 10 or the screen 10S is arranged such that the refractive index n of the minute transparent balls 12 is set small at the center thereof and larger in the direction toward the peripheral portion. Then, as shown in FIG. 38B, the gain is set the largest at the center and becomes smaller in the direction toward the periphery. Thus, as shown in FIG. 38C, it is possible to make the brightness of the light transmitted through the plano lens 10 or the screen 10S flat, i.e., even.

While in this embodiment the brightness of the light transmitted through the plano lens 10 or the screen 10S is made even (flat) at each of the positions thereof, the present invention is not limited thereto and the refractive index of the minute transparent balls 12 can be changed in order to positively change the brightness distribution to a desired distribution.

As described above, when the minute transparent balls of two kinds or more having different refractive indexes are employed in one lens or one screen, the refractive indexes of the minute transparent balls 12 having different refractive indexes and the mixing ratio thereof are set to desired values, it is possible to realize the rear-projection type video display apparatus employing the plano lens and the rear-projection type projector screen having the peak gain of 2.4 or greater and a gain obtained at the bend angle of 30° which is larger than 1/3 or greater of the peak gain.

Figure 39:
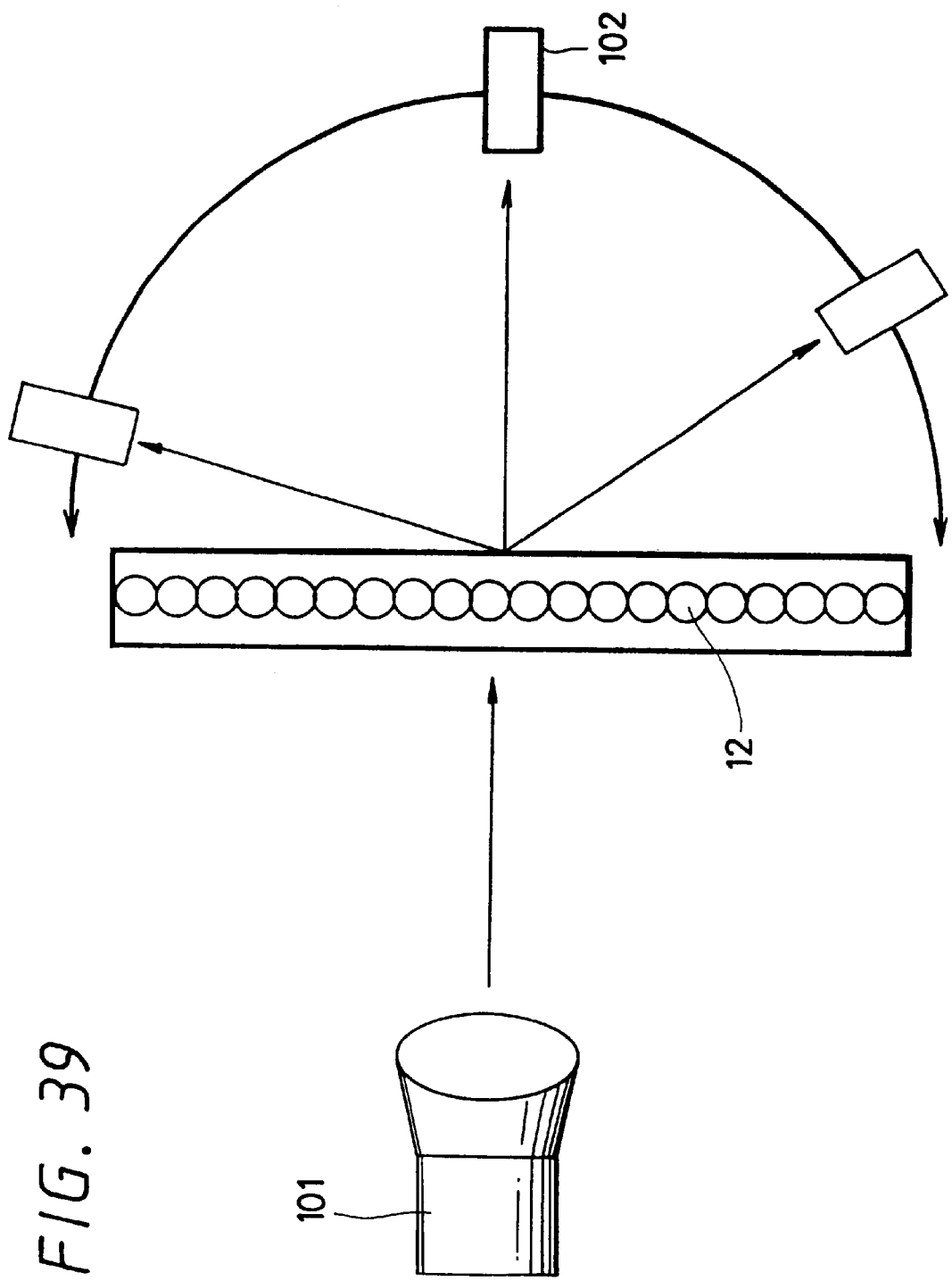
FIG. 39 is a diagram used to explain measurement of luminance of the screen according to the present invention.

FIG. 39 is a diagram showing a method of measuring luminance obtained when the bend angle with respect to the screen forming the rear-projection type video display apparatus according to the present invention is changed.

Specifically, as shown in FIG. 39, light emitted from a light source 101 is made incident of a rear surface of a screen, and luminance of light emitted from a portion in the vicinity of the front center of the screen is measured by a luminancemeter located away from the screen by a predetermined distance with respect to every 5° of the bend angle.

Figure 40:
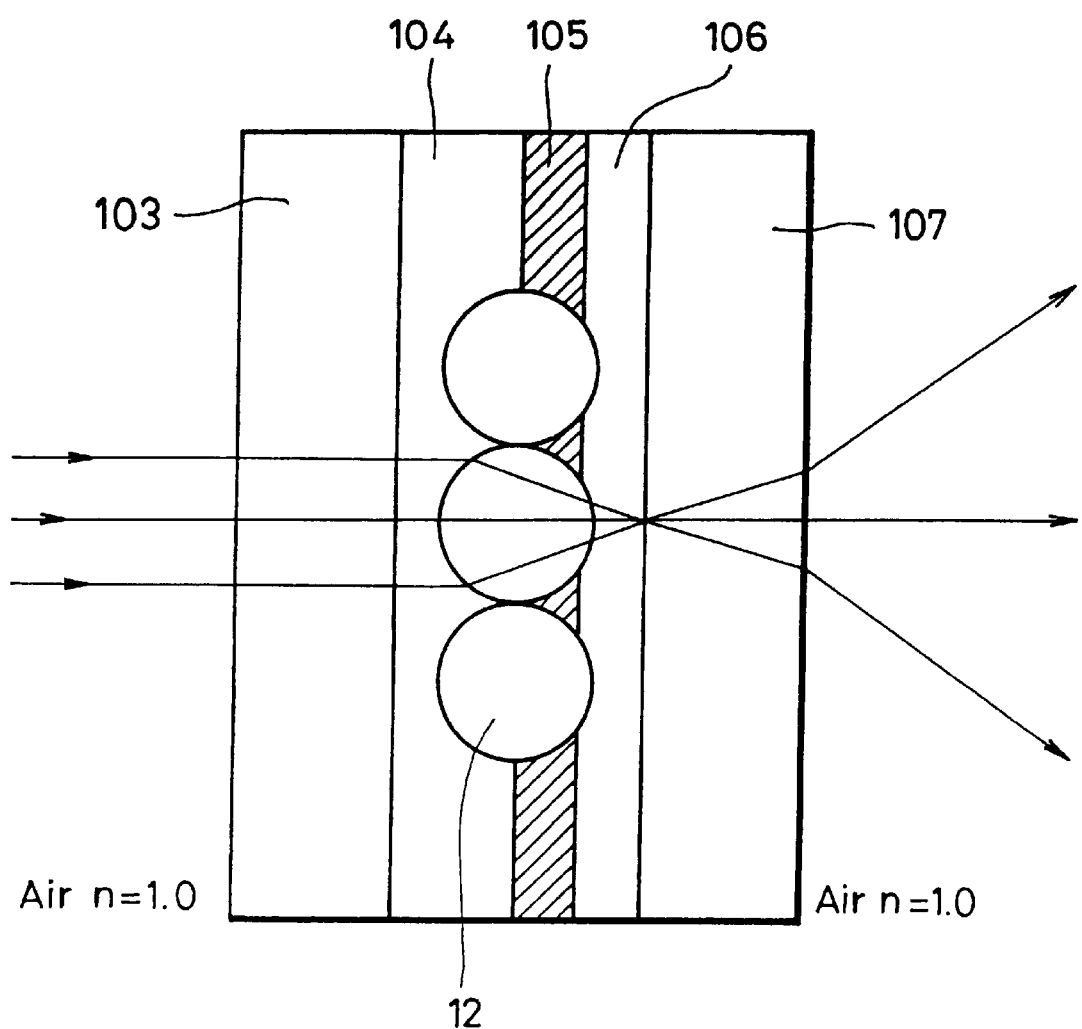
FIG. 40 is a diagram showing an arrangement of the screen according to the present invention.

As shown in FIG. 40, the screen shown in FIG. 39 has structure formed of six layers of an incident side transparent substrate 103, an incident side transparent adhesion layer 104, minute transparent balls 12, a light absorbing layer 105, an emission side transparent adhesion layer 106, and an emission side transparent substrate 107.

The incident side transparent substrate 103 can be formed of acrlic resin (polymethyl methacrylate). The incident side transparent adhesion layer 104 can be formed of an adhesive of acrylic system. The minute transparent ball 12 can be formed of glass. The light absorbing layer 105 can be formed of a toner (carbon powder). The emission side transparent adhesion layer 106 can be formed of an acrylic adhesive. The emission aside transparent substrate 107 can be formed of acrylic resin (polymethyl methacrylate).

When the luminance of the screen was measured, a refractive index n of the minute transparent ball 12 of the layers forming the screen was optionally selected from values of 1.5, 1.6, 1.7, 1.8, 1.9 and 2.1, and refractive indexes of other layers are fixed on optional values. The luminance was measured on the assumption that parallel rays of light were made incident on the screen from the light incidence side. An amount of light, which is refracted and absorbed in each of the layers, emitted at the emission side of the screen is measured or calculated by simulation using a ray tracing method with respect to a bend angle.

Figure 41:
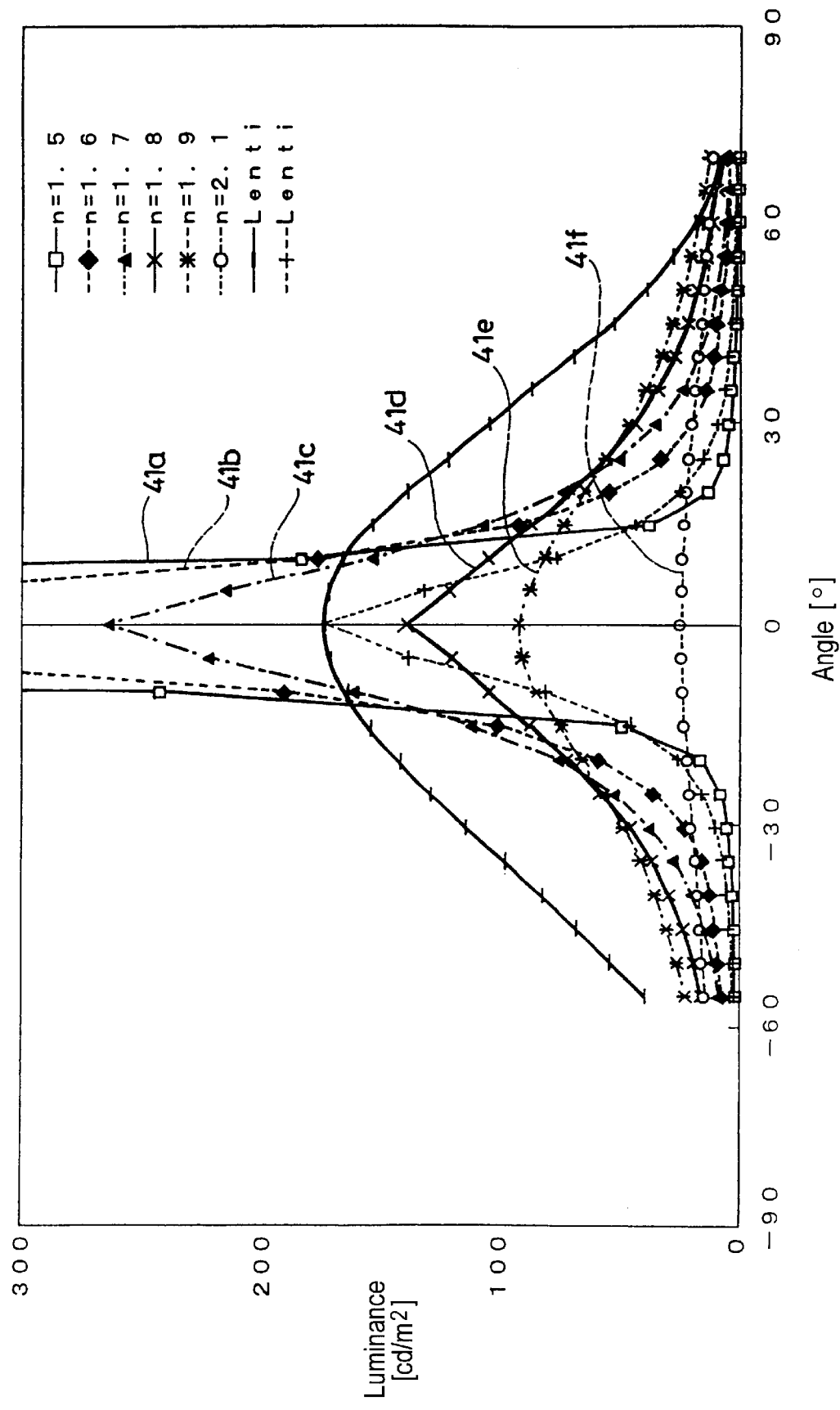
FIG. 41 is a graph showing luminance curves obtained when a minute transparent ball of one kind is used.

FIG. 41 is graph showing measurement of luminance obtained when the minute transparent ball 12 of one kind was employed and the refractive index n of the minute transparent ball was changed. In FIG. 41, curves 41a, 41b, 41c, 41d, 41e and 41f are luminance curves respectively obtained when n=1.5, n=1.6, n=1.7, n=1.8, n=1.9 and n=2.1.

Figure 42:
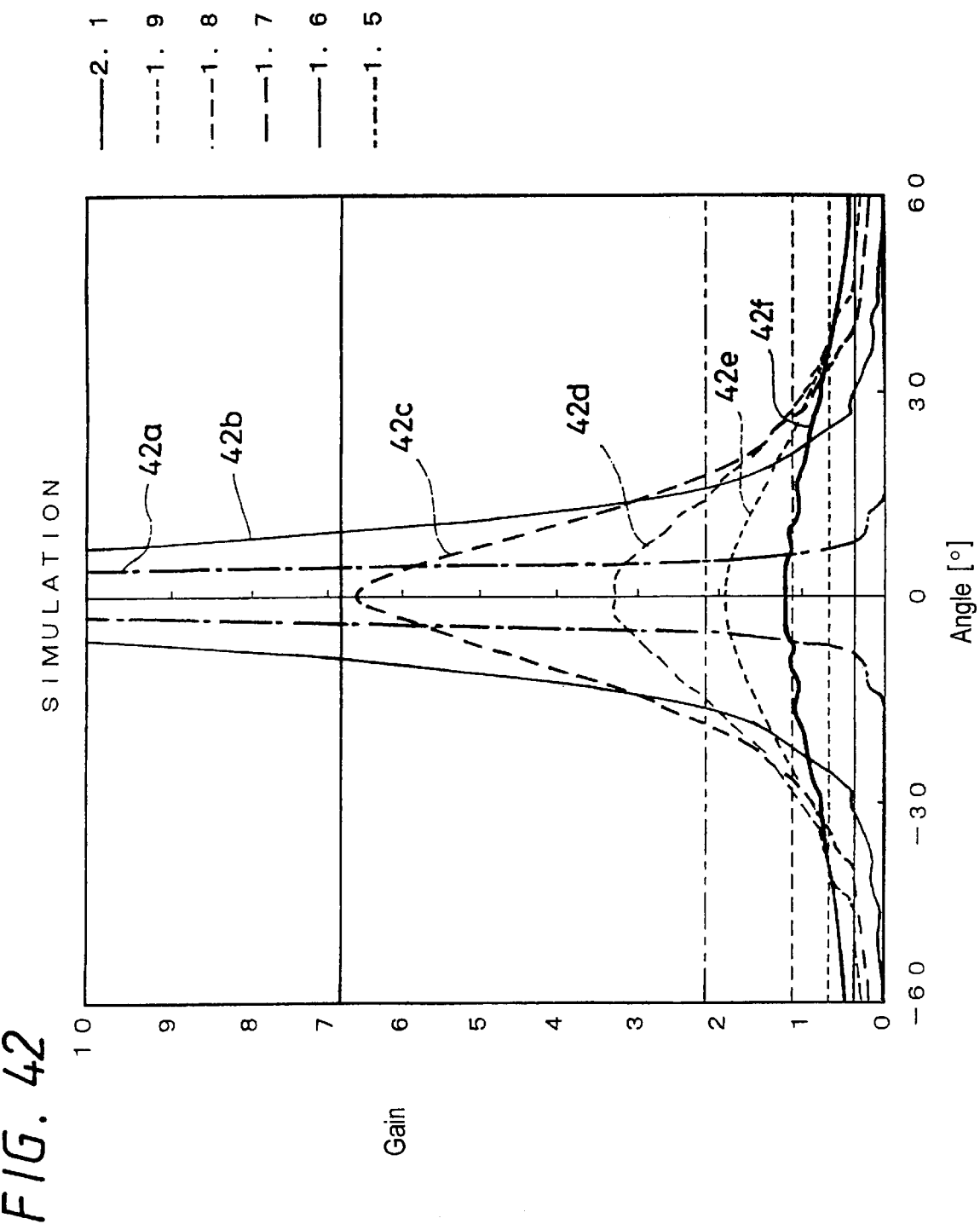
FIG. 42 is a graph showing luminance curves obtained when the minute transparent balls of two kinds having refractive indexes of 1.9 and 1.6 are used.

FIG. 42 is a graph showing a result of the simulation. In FIG. 42, curves 42a, 42b, 42c, 42d, 42e and 42f are luminance curves respectively obtained when n=1.5, n=1.6, n=1.7, n=1.8, n=1.9 and n=2.1.

Study of FIGS. 41 and 42 reveals that the gain curves shown in FIGS. 41 and 42 coincides with each other and hence this simulation result shown in FIG. 42 is equal to the measurement shown in FIG. 41.

Table 1 shows a simulation result of a peak gain of a screen, a gain obtained at a bend angle of 30° and shading obtained at a bend angle of 20° obtained when the minute transparent ball 12 of one kind was employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than 1/3 of larger, i.e., 33% or larger of the peak gain, the result is evaluated with an open circle, and when the value is smaller than 33%, the result is evaluated with a cross.

TABLE 1

| screen arrangement | gain | | shading | gain | 30° |
|---|---|---|---|---|---|
| one kind | peak | 30° | 20° | 2.4 or more | 33% or more |
| n = 2.1 | 1.192 | 64% | 18% | X | ○ |
| n = 1.9 | 1.952 | 49% | 30% | X | ○ |
| n = 1.8 | 3.363 | 31% | 48% | ○ | X |

TABLE 1-continued

| screen arrangement | gain | | shading | gain | 30° |
|---|---|---|---|---|---|
| one kind | peak | 30° | 20° | 2.4 or more | 33% or more |
| n = 1.7 | 6.637 | 13% | 70% | ○ | X |
| n = 1.6 | 20.622 | 2% | 93% | ○ | X |
| n = 1.5 | 396.42 | 0% | 100% | ○ | X |

Study of Table 1 reveals that the screen employing the minute transparent ball 12 of one kind could not satisfy the conditions of the peak gain of 2.4 or more and the gain obtained at the bend angle of 30° being equal to or larger than 33%.

Figure 43:
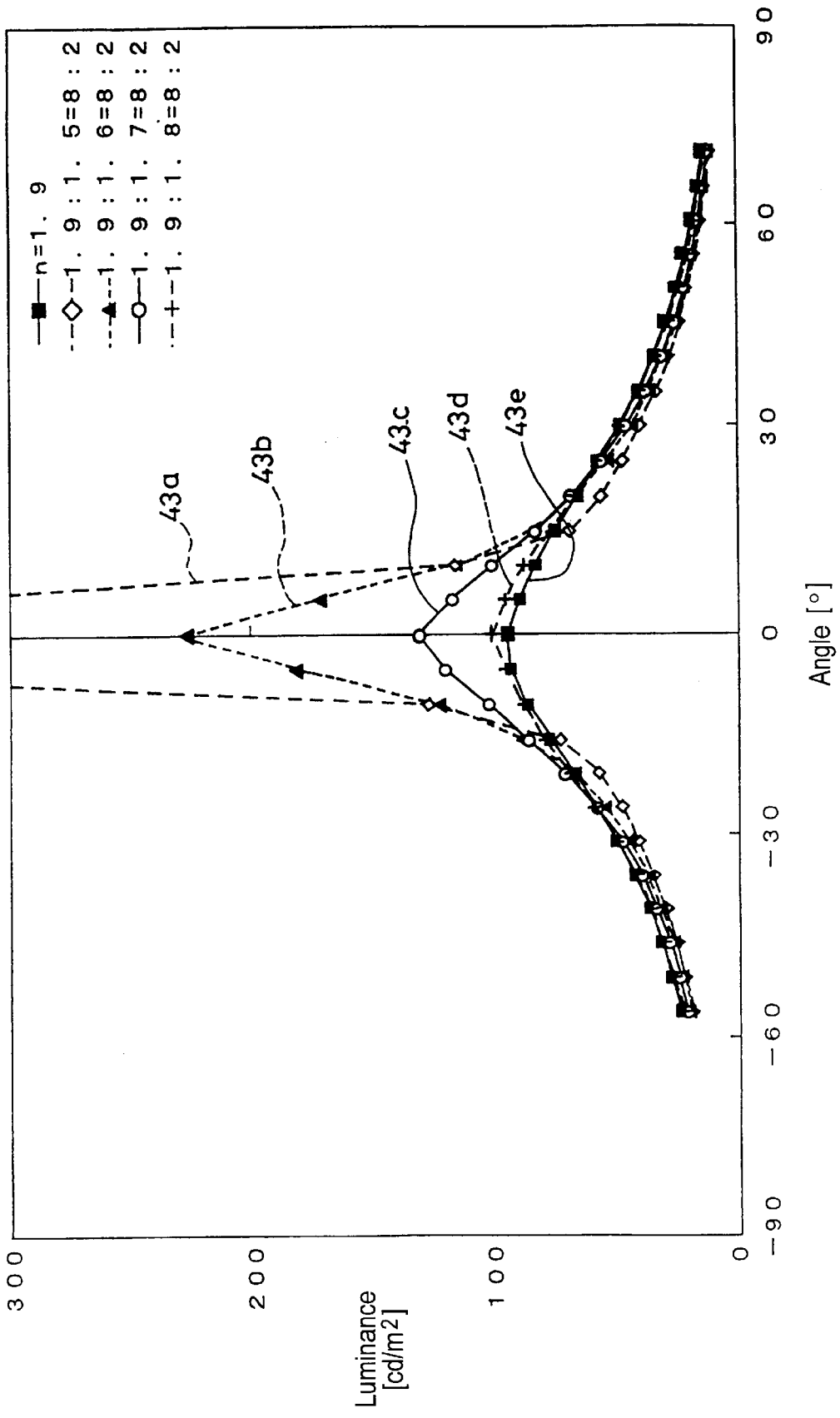
FIG. 43 is a graph showing luminance curves obtained when the minute transparent balls of two kinds having refractive indexes of 1.9 and 1.6 are used.

FIG. 43 is a graph showing measurement of luminance obtained when the minute transparent balls 12 of two kinds having different refractive indexes n were employed with being mixed in a ratio of 8:2. In FIG. 43, curves 43a, 43b, 43c, 43d are luminance curves respectively obtained when the minute transparent balls 12 of two kinds having different refractive indexes n=1.9 and n=1.5 were employed with being mixed in a ratio of 8:2, when the minute transparent balls 12 of two kinds having different refractive indexes n=1.9 and n=1.6 were employed with being mixed in a ratio of 8:2, when the minute transparent balls 12 of two kinds having different refractive indexes n=1.9 and n=1.8 were employed with being mixed in a ratio of 8:2, and when only the minute transparent ball 12 having a refractive index n=1.9 was employed.

Figure 44:
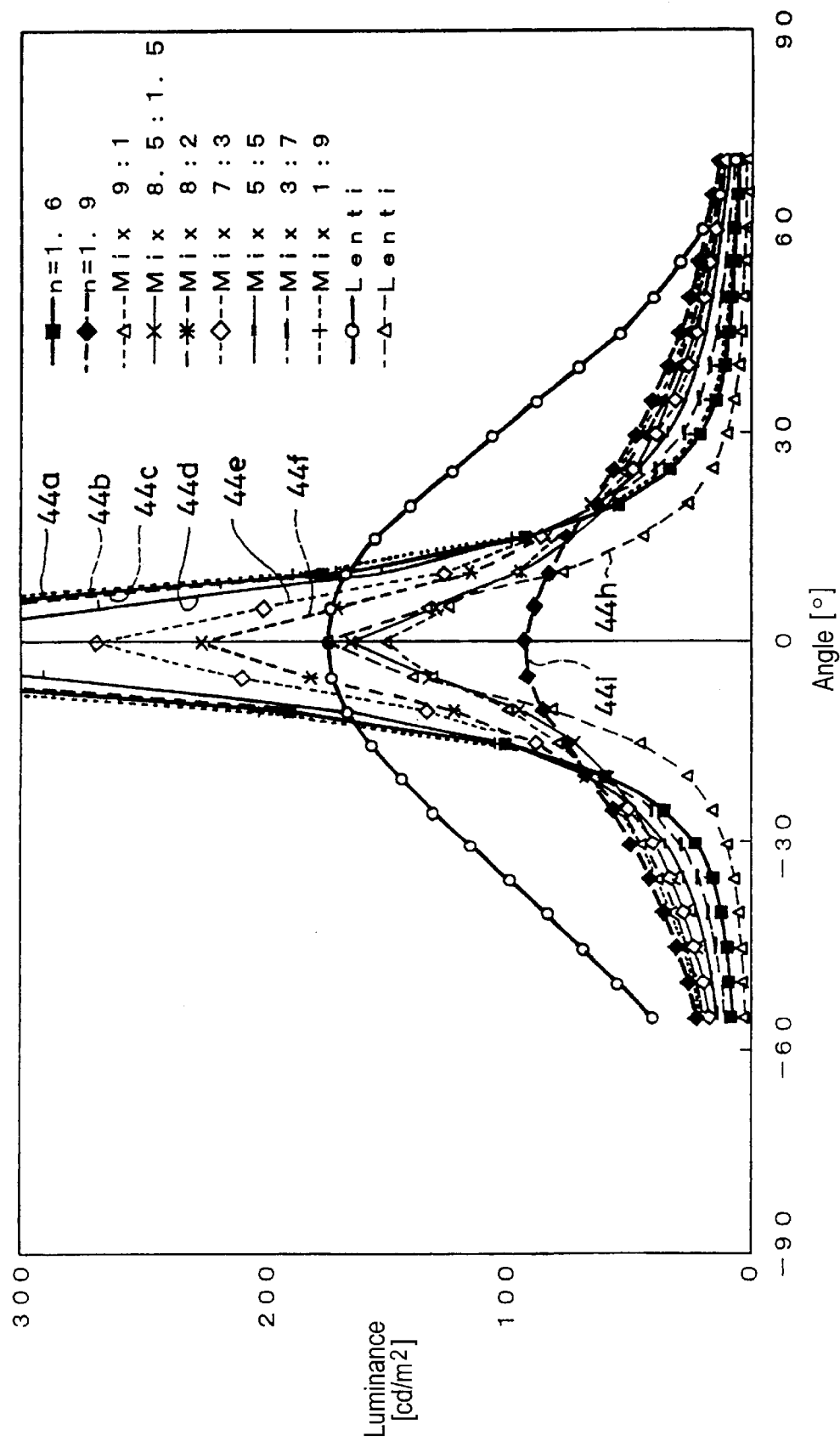
FIG. 44 is a graph showing luminance curves obtained when the minute transparent balls of two kinds having refractive indexes of 1.9 and 1.6 are used.

FIG. 44 is a graph showing measurement of luminance obtained when the minute transparent balls 12 of two kinds having different refractive indexes n=1.9 and n=1.6 were employed. In FIG. 44, curves 44a, 44b, 44c, 44d, 44e, 44f, 44g and 44h are luminance curves respectively obtained when only the minute transparent ball 12 having a refractive index n=1.6 was employed, when the minute transparent balls 12 of two kinds having different refractive indexes n=1.9 and n=1.6 were employed with being mixed in a ratio of 1:9, when the minute transparent balls 12 of two kinds having different refractive indexes n=1.9 and n=1.6 were employed with being mixed in a ratio of 3:7, when the minute transparent balls 12 of two kinds having different refractive indexes n=1.9 and n=1.6 were employed with being mixed in a ratio of 5:5, when the minute transparent balls 12 of two kinds having different refractive indexes n=1.9 and n=1.6 were employed with being mixed in a ratio of 7:3, when the minute transparent balls 12 of two kinds having different refractive indexes n=1.9 and n=1.6 were employed with being mixed in a ratio of 8:2, when the minute transparent balls 12 of two kinds having different refractive indexes n=1.9 and n=1.6 were employed with being mixed in a ratio of 8.5:1.5, and when only the minute transparent ball 12 having a refractive index n=1.9 was employed.

Figure 45:
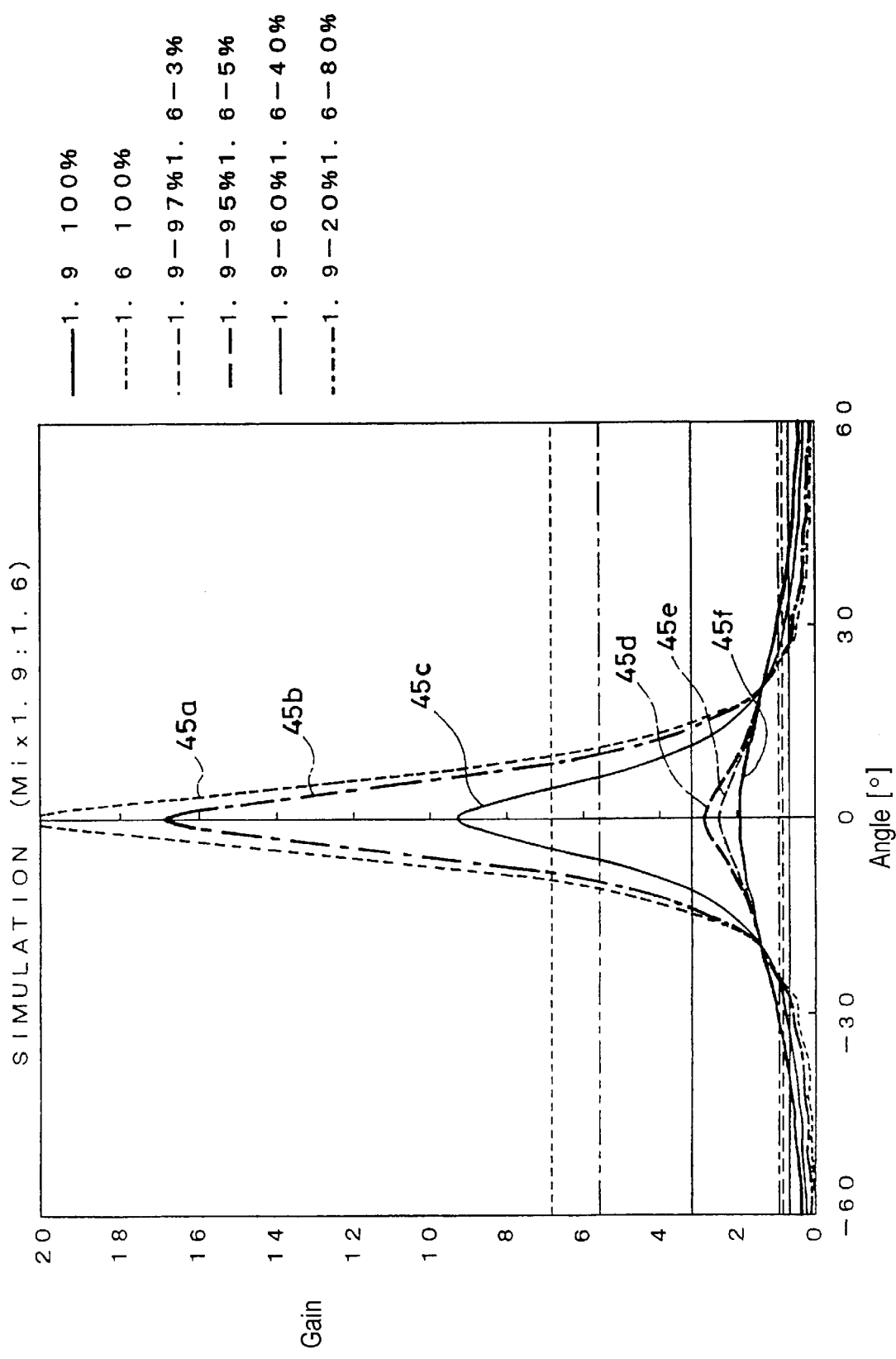
FIG. 45 is a graph showing luminance curves obtained when the minute transparent balls of two kinds having refractive indexes of 1.9 and 1.6 are used.

FIG. 45 is a graph showing measurement of luminance obtained when the minute transparent balls 12 of two kinds having different refractive indexes n=1.9 and n=1.6 were employed. In FIG. 45, curves 45a, 45b, 45c, 45d, 45e and 45f are luminance curves respectively obtained when only the minute transparent ball 12 having a refractive index n=1.6 was employed, when the minute transparent balls 12 of two kinds having different refractive indexes n=1.9 and n=1.6 were employed with being mixed in a ratio of 2:8, when the minute transparent balls 12 of two kinds having different refractive indexes n=1.9 and n=1.6 were employed with being mixed in a ratio of 6:4, when the minute transparent balls 12 of two kinds having different refractive indexes n=1.9 and n=1.6 were employed with being mixed in a ratio of 19:1, when the minute transparent balls 12 of two kinds having different refractive indexes n=1.9 and n=1.6 were employed with being mixed in a ratio of 97:3, and when only the minute transparent ball 12 having a refractive index n=1.9 was employed.

Study of FIGS. 44 and 45 reveals that the gain curves shown in FIGS. 44 and 45 coincides with each other and hence this simulation result shown in FIG. 44 is proper.

Table 2 shows a simulation result of a peak gain of a screen, a gain obtained at a bend angle of 30° and shading obtained at a bend angle of 20° obtained when the minute transparent balls 12 of two kinds having the refractive indexes of n=1.9 and n=1.6 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than 1/3 of larger, i.e., 33% or larger of the peak gain, the result is evaluated with an open circle, and when the value is smaller than 33%, the result is evaluated with a cross

TABLE 2

| screen arrangement | | gain | | shading | gain | 30° |
|---|---|---|---|---|---|---|
| n = 1.9 | n = 1.6 | peak | 30° | 20° | 2.4 or more | 33% or more |
| 100% | 0% | 1.952 | 49% | 30% | X | ○ |
| 98% | 2% | 2.326 | 41% | 41% | X | ○ |
| 97% | 3% | 2.512 | 38% | 45% | ○ | ○ |
| 96% | 4% | 2.699 | 35% | 49% | ○ | ○ |
| 95% | 5% | 2.886 | 32% | 52% | ○ | X |
| 80% | 20% | 5.686 | 15% | 76% | ○ | X |
| 60% | 40% | 9.420 | 8% | 85% | ○ | X |
| 40% | 60% | 13.154 | 5% | 89% | ○ | X |
| 20% | 80% | 16.888 | 3% | 92% | ○ | X |
| 10% | 90% | 18.755 | 3% | 92% | ○ | X |
| 0% | 100% | 20.622 | 2% | 93% | ○ | X |

Study of Table 2 reveals that the screen employing the minute transparent ball 12 of two kinds having the refractive indexes of n=1.9 and n=1.6 and mixed in ratios of 97:3 and 96:4 could satisfy the conditions of the peak gain of 2.4 or more and the gain obtained at the bend angle of 30° being equal to or larger than 33%.

Figure 46:
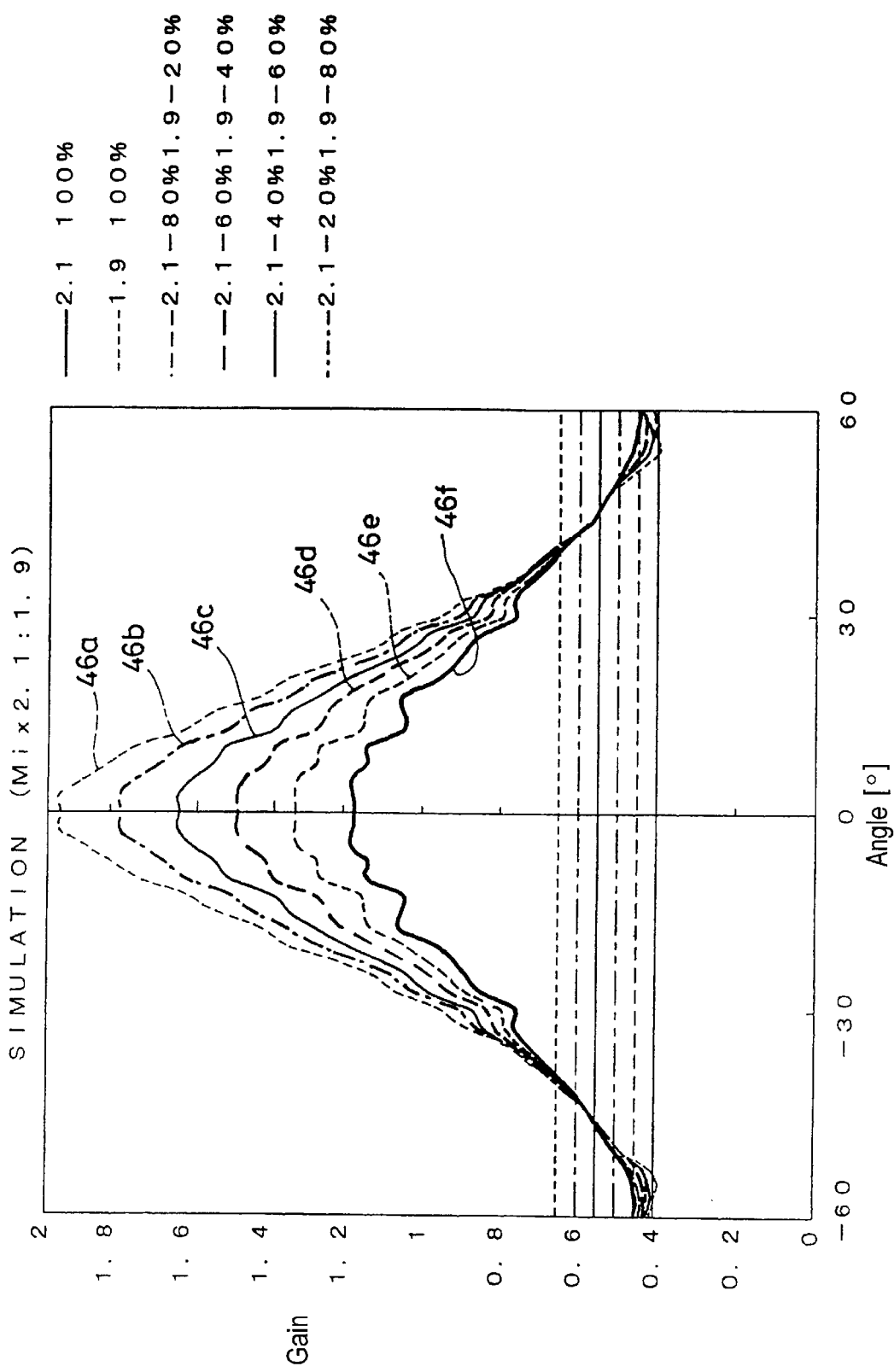
FIG. 46 is a graph . . . index of 2.1 and 1.9 are used.

FIG. 46 is a graph showing measurement of luminance obtained when the minute transparent balls 12 of two kinds having different refractive indexes n=2.1 and n=1.9 were employed. In FIG. 46, curves 46a, 46b, 46c, 46d, 46e and 46f are luminance curves respectively obtained when only the minute transparent ball 12 having a refractive index n=1.9 was employed, when the minute transparent balls 12 of two kinds having different refractive indexes n=2.1 and n=1.9 were employed with being mixed in a ratio of 2:8, when the minute transparent balls 12 of two kinds having different refractive indexes n=2.1 and n=1.9 were employed with being mixed in a ratio of 4:6, when the minute transparent balls 12 of two kinds having different refractive indexes n=2.1 and n=1.9 were employed with being mixed in a ratio of 6:4, when the minute transparent balls 12 of two kinds having different refractive indexes n=2.1 and n=1.9 were employed with being mixed in a ratio of 8:2, and when only the minute transparent ball 12 having a refractive index n=2.1 was employed.

Table 3 shows a simulation result of a peak gain of a screen, a gain obtained at a bend angle of 30° and shading obtained at a bend angle of 20° obtained when the minute transparent balls 12 of two kinds having the refractive indexes of n=2.1 and n=1.9 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than 1/3 of larger, i.e., 33% or larger of the peak gain, the result is evaluated with an open circle, and when the value is smaller than 33%, the result is evaluated with a cross

TABLE 3

| screen arrangement | | gain | shading | gain | 30° |
|---|---|---|---|---|---|
| n = 2.1 | n = 1.9 | peak | 30° | 20° | 2.4 or more | 33% or more |
| 100% | 0% | 1.192 | 64% | 18% | X | ○ |
| 90% | 10% | 1.268 | 62% | 20% | X | ○ |
| 80% | 20% | 1.344 | 60% | 21% | X | ○ |
| 70% | 30% | 1.420 | 58% | 23% | X | ○ |
| 60% | 40% | 1.496 | 56% | 24% | X | ○ |
| 50% | 50% | 1.572 | 55% | 25% | X | ○ |
| 40% | 60% | 1.648 | 53% | 26% | X | ○ |
| 30% | 70% | 1.724 | 52% | 27% | X | ○ |
| 20% | 80% | 1.800 | 51% | 28% | X | ○ |
| 10% | 90% | 1.876 | 50% | 29% | X | ○ |
| 0% | 100% | 1.952 | 49% | 30% | X | ○ |

Study of Table 3 reveals that the screen employing the minute transparent ball 12 of two kinds having the refractive indexes of n=2.1 and n=1.9 couldn't satisfy the conditions of the peak gain of 2.4 or more and the gain obtained at the bend angle of 30° being equal to or larger than 33%.

Figure 47:
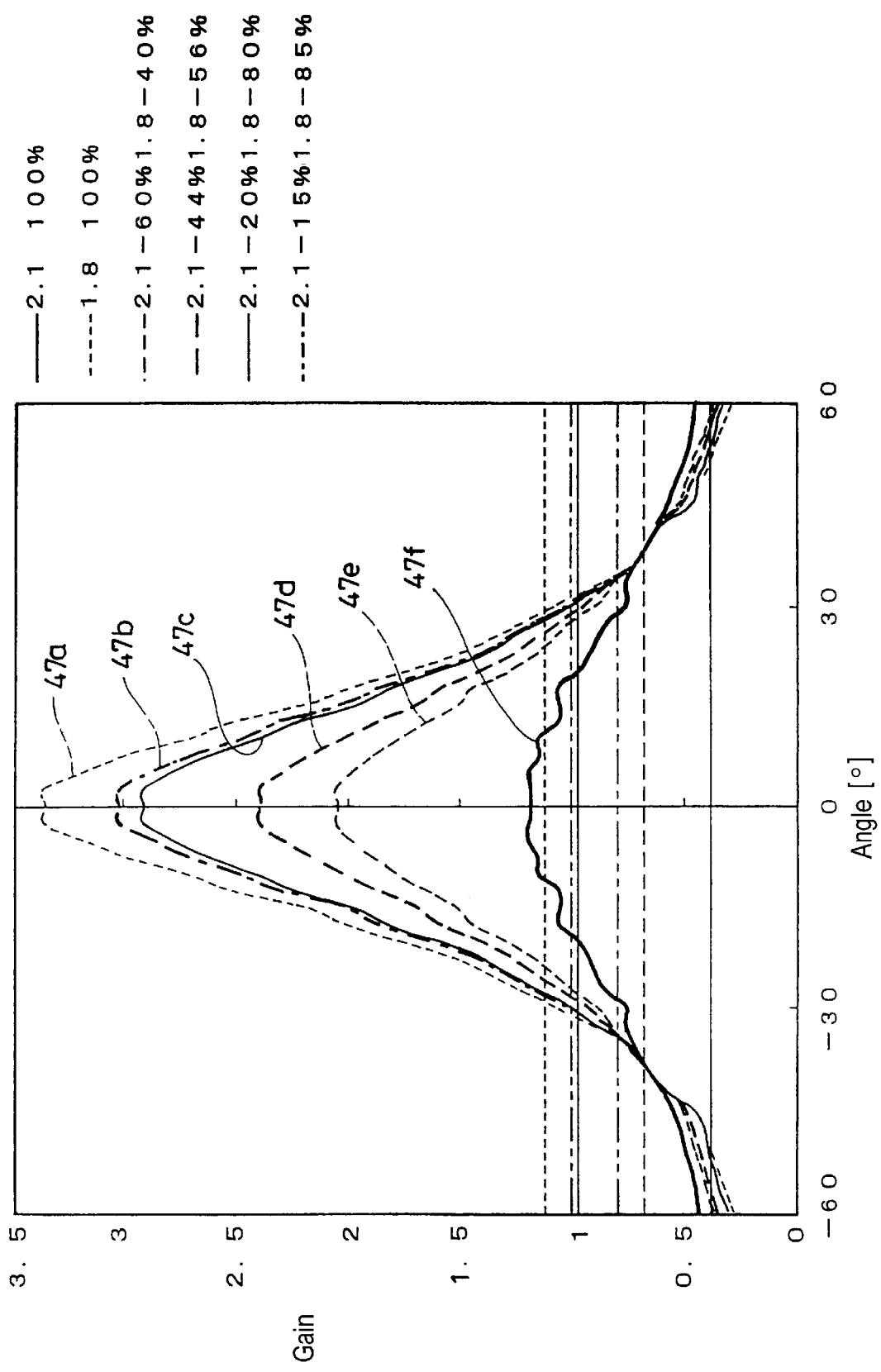
FIG. 47 is a graph . . . index of 2.1 and 1.8 are used.

FIG. 47 is a graph showing measurement of luminance obtained when the minute transparent balls 12 of two kinds having different refractive indexes n=2.1 and n=1.8 were employed. In FIG. 47, curves 47a, 47b, 47c, 47d, 47e and 47f are luminance curves respectively obtained when only the minute transparent ball 12 having a refractive index n=1.8 was employed, when the minute transparent balls 12 of two kinds having different refractive indexes n=2.1 and n=1.8 were employed with being mixed in a ratio of 15:85, when the minute transparent balls 12 of two kinds having different refractive indexes n=2.1 and n=1.8 were employed with being mixed in a ratio of 2:8, when the minute transparent balls 12 of two kinds having different refractive indexes n=2.1 and n=1.8 were employed with being mixed in a ratio of 44:56, when the minute transparent balls 12 of two kinds having different refractive indexes n=2.1 and n=1.8 were employed with being mixed in a ratio of 6:4, and when only the minute transparent ball 12 having a refractive index n=2.1 was employed.

Table 4 shows a simulation result of a peak gain of a screen, a gain obtained at a bend angle of 30° and shading obtained at a bend angle of 20° obtained when the minute transparent balls 12 of two kinds having the refractive indexes of n=2.1 and n=1.8 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than 1/3 of larger, i.e., 33% or larger of the peak gain, the result is evaluated with an open circle, and when the value is smaller than 33%, the result is evaluated with a cross

TABLE 4

| screen arrangement | | gain | shading | gain | 30° |
|---|---|---|---|---|---|
| n = 2.1 | n = 1.8 | peak | 30° | 20° | 2.4 or more | 33% or more |
| 100% | 0% | 1.192 | 64% | 18% | X | ○ |
| 80% | 20% | 1.626 | 50% | 30% | X | ○ |
| 60% | 40% | 2.060 | 43% | 37% | X | ○ |
| 45% | 55% | 2.386 | 39% | 41% | X | ○ |
| 44% | 56% | 2.408 | 38% | 41% | ○ | ○ |
| 30% | 70% | 2.712 | 36% | 44% | ○ | ○ |
| 20% | 80% | 2.929 | 34% | 45% | ○ | ○ |
| 16% | 84% | 3.016 | 33% | 46% | ○ | ○ |
| 15% | 85% | 3.038 | 33% | 46% | ○ | X |
| 10% | 90% | 3.146 | 33% | 47% | ○ | X |
| 0% | 100% | 3.363 | 31% | 48% | ○ | X |

Study of Table 4 reveals that the screen employing the minute transparent balls 12 of two kinds having the refractive indexes of n=2.1 and n=1.8 and mixed in a ratio of the former ranging from 16% to 44% and in a corresponding ratio of the latter ranging from 84% to 56% could satisfy the conditions of the peak gain of 2.4 or more and the gain obtained at the bend angle of 30° being equal to or larger than 33%.

Figure 48:
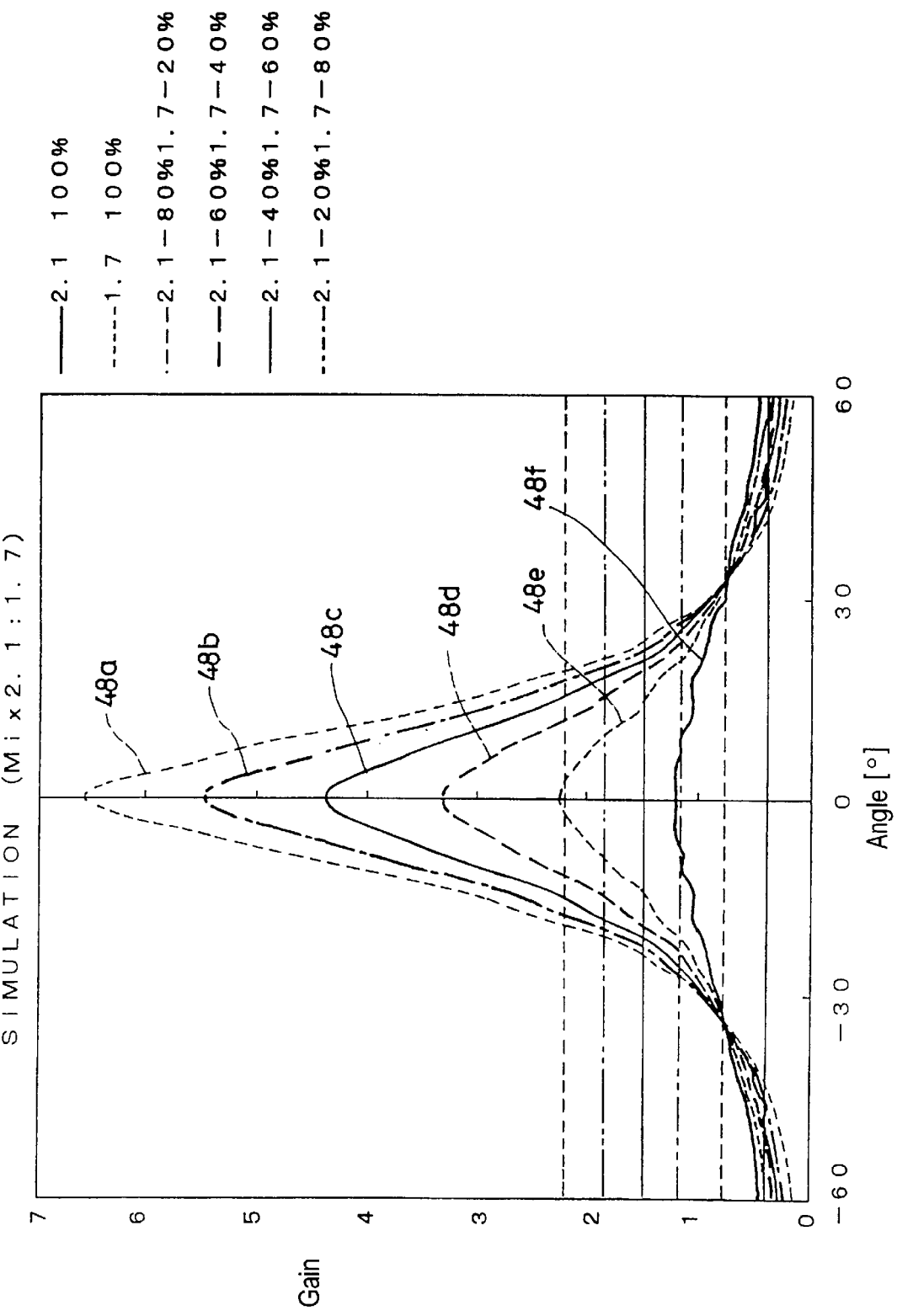
FIG. 48 is a graph . . . index of 2.1 and 1.7 are used.

FIG. 48 is a graph showing measurement of luminance obtained when the minute transparent balls 12 of two kinds having different refractive indexes n=2.1 and n=1.7 were employed. In FIG. 48, curves 48a, 48b, 48c, 48d, 48e and 48f are luminance curves respectively obtained when only the minute transparent ball 12 having a refractive index n=1.7 was employed, when the minute transparent balls 12 of two kinds having different refractive indexes n=2.1 and n=1.7 were employed with being mixed in a ratio of 2:8, when the minute transparent balls 12 of two kinds having different refractive indexes n=2.1 and n=1.7 were employed with being mixed in a ratio of 4:6, when the minute transparent balls 12 of two kinds having different refractive indexes n=2.1 and n=1.7 were employed with being mixed in a ratio of 6:4, when the minute transparent balls 12 of two kinds having different refractive indexes n=2.1 and n=1.7 were employed with being mixed in a ratio of 8:2, and when only the minute transparent ball 12 having a refractive index n=2.1 was employed.

Table 5 shows a simulation result of a peak gain of a screen, a gain obtained at a bend angle of 30° and shading obtained at a bend angle of 20° obtained when the minute transparent balls 12 of two kinds having the refractive indexes of n=2.1 and n=1.7 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than 1/3 of larger, i.e., 33% or larger of the peak gain, the result is evaluated with an open circle, and when the value is smaller than 33%, the result is evaluated with a cross

TABLE 5

| screen arrangement | | gain | shading | gain | 30° |
|---|---|---|---|---|---|
| n = 2.1 | n = 1.7 | peak | 30° | 20° | 2.4 or more | 33% or more |
| 100% | 0% | 1.192 | 64% | 18% | X | ○ |
| 90% | 10% | 1.736 | 45% | 38% | X | ○ |

TABLE 5-continued

| screen arrangement | | gain | shading | gain | 30° |
|---|---|---|---|---|---|
| n = 2.1 | n = 1.7 | peak | 30° | 20° | 2.4 or more | 33% or more |
| 80% | 20% | 2.281 | 34% | 48% | X | ○ |
| 70% | 30% | 2.825 | 28% | 55% | ○ | X |
| 60% | 40% | 3.370 | 24% | 59% | ○ | X |
| 50% | 50% | 3.914 | 21% | 62% | ○ | X |
| 40% | 60% | 4.459 | 19% | 65% | ○ | X |
| 30% | 70% | 5.003 | 17% | 67% | ○ | X |
| 20% | 80% | 5.548 | 15% | 68% | ○ | X |
| 10% | 90% | 6.092 | 14% | 69% | ○ | X |
| 0% | 100% | 6.637 | 13% | 70% | ○ | X |

Study of Table 5 reveals that the screen employing the minute transparent balls 12 of two kinds having the refractive indexes of n=2.1 and n=1.7 couldn't satisfy the conditions of the peak gain of 2.4 or more and the gain obtained at the bend angle of 30° being equal to or larger than 33%.

Figure 49:
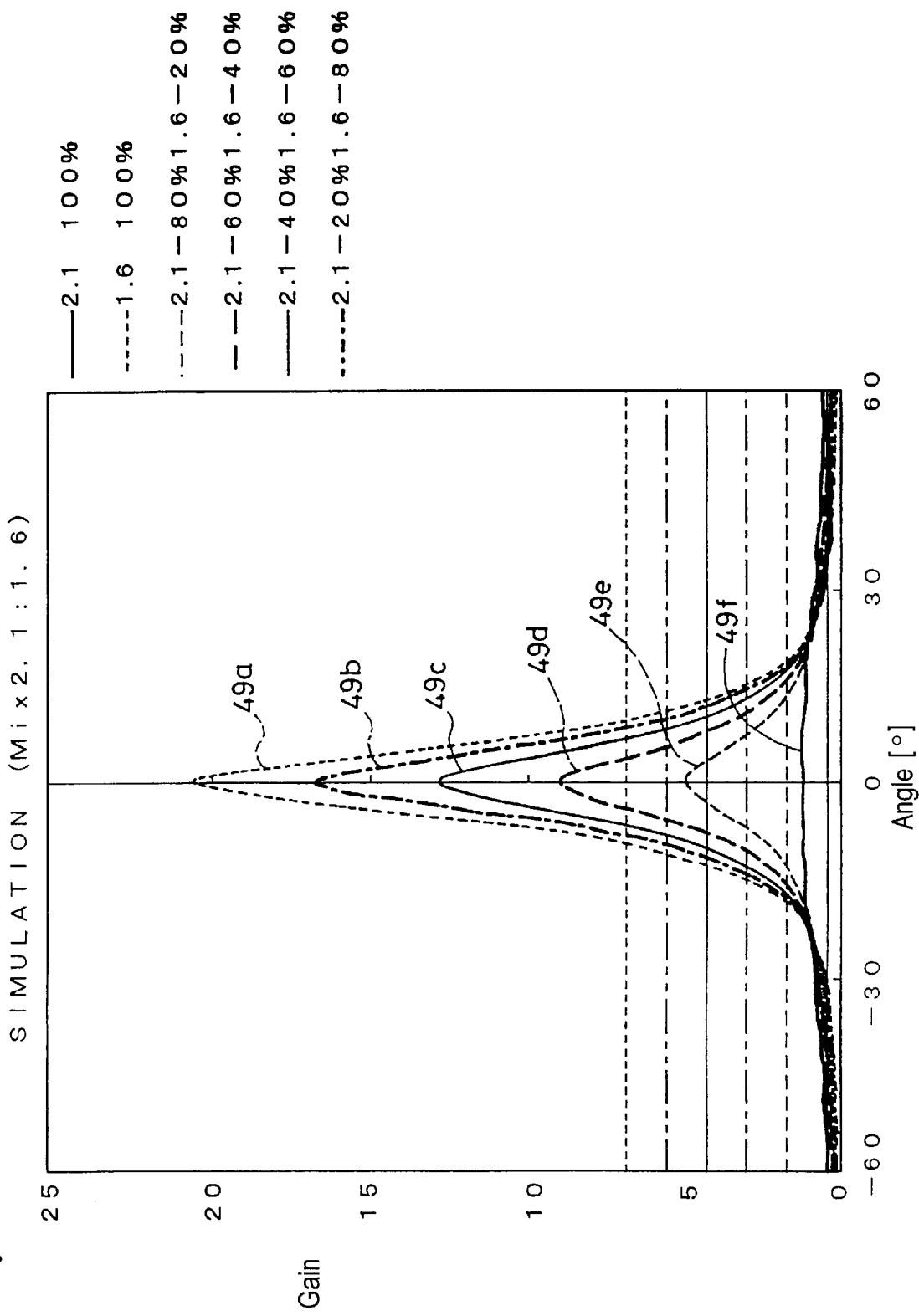
FIG. 49 is a graph . . . index of 2.1 and 1.6 are used.

FIG. 49 is a graph showing measurement of luminance obtained when the minute transparent balls 12 of two kinds having different refractive indexes n=2.1 and n=1.6 were employed. In FIG. 49, curves 49a, 49b, 49c, 49d, 49e and 49f are luminance curves respectively obtained when only the minute transparent ball 12 having a refractive index n=1.6 was employed, when the minute transparent balls 12 of two kinds having different refractive indexes n=2.1 and n=1.6 were employed with being mixed in a ratio of 2:8, when the minute transparent balls 12 of two kinds having different refractive indexes n=2.1 and n=1.6 were employed with being mixed in a ratio of 4:6, when the minute transparent balls 12 of two kinds having different refractive indexes n=2.1 and n=1.6 were employed with being mixed in a ratio of 6:4, when the minute transparent balls 12 of two kinds having different refractive indexes n=2.1 and n=1.6 were employed with being mixed in a ratio of 8:2, and when only the minute transparent ball 12 having a refractive index n=2.1 was employed.

Table 6 shows a simulation result of a peak gain of a screen, a gain obtained at a bend angle of 30° and shading obtained at a bend angle of 20° obtained when the minute transparent balls 12 of two kinds having the refractive indexes of n=2.1 and n=1.6 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 6

| screen arrangement | | gain | shading | gain | 30° |
|---|---|---|---|---|---|
| n = 2.1 | n = 1.6 | peak | 30° | 20° | 2.4 or more | 33% or more |
| 100% | 0% | 1.192 | 64% | 18% | X | ○ |
| 90% | 10% | 3.315 | 23% | 67% | ○ | X |
| 80% | 20% | 5.078 | 14% | 79% | ○ | X |
| 70% | 30% | 7.021 | 10% | 84% | ○ | X |
| 60% | 40% | 8.964 | 7% | 87% | ○ | X |
| 50% | 50% | 10.907 | 6% | 89% | ○ | X |
| 40% | 60% | 12.850 | 4% | 90% | ○ | X |

TABLE 6-continued

| screen arrangement | | gain | shading | gain | 30° |
|---|---|---|---|---|---|
| n = 2.1 | n = 1.6 | peak | 30° | 20° | 2.4 or more | 33% or more |
| 30% | 70% | 14.793 | 4% | 91% | ○ | X |
| 20% | 80% | 16.736 | 3% | 92% | ○ | X |
| 10% | 90% | 18.679 | 3% | 93% | ○ | X |
| 0% | 100% | 20.622 | 2% | 93% | ○ | X |

Study of Table 6 reveals that the screen employing the minute transparent balls 12 of two kinds having the refractive indexes of n=2.1 and n=1.6 could not satisfy the conditions of the peak gain of 2.4 or more and the gain obtained at the bend angle of 30° being equal to or larger than 33%.

Figure 50:
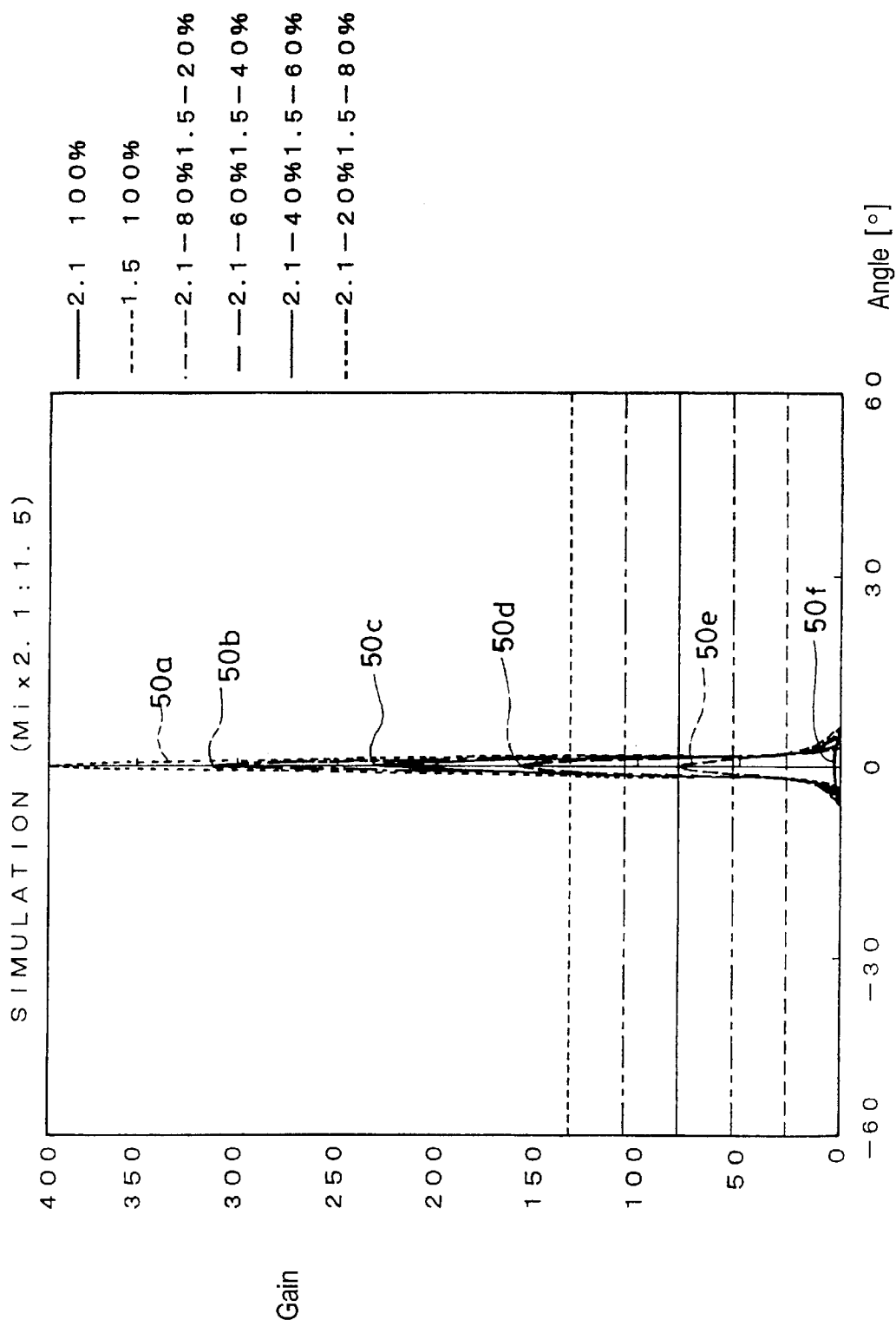
FIG. 50 is a graph . . . index of 2.1 and 1.5 are used.

FIG. 50 is a graph showing measurement of luminance obtained when the minute transparent balls 12 of two kinds having different refractive indexes n=2.1 and n=1.5 were employed. In FIG. 50, curves 50a, 50b, 50c, 50d, 50e and 50f are luminance curves respectively obtained when only the minute transparent ball 12 having a refractive index n=1.5 was employed, when the minute transparent balls 12 of two kinds having different refractive indexes n=2.1 and n=1.5 were employed with being mixed in a ratio of 2:8, when the minute transparent balls 12 of two kinds having different refractive indexes n=2.1 and n=1.5 were employed with being mixed in a ratio of 4:6, when the minute transparent balls 12 of two kinds having different refractive indexes n=2.1 and n=1.5 were employed with being mixed in a ratio of 6:4, when the minute transparent balls 12 of two kinds having different refractive indexes n=2.1 and n=1.5 were employed with being mixed in a ratio of 8:2, and when only the minute transparent ball 12 having a refractive index n=2.1 was employed.

Table 7 shows a simulation result of a peak gain of a screen, a gain obtained at a bend angle of 30° and shading obtained at a bend angle of 20° obtained when the minute transparent balls 12 of two kinds having the refractive indexes of n=2.1 and n=1.5 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 7

| screen arrangement | | gain | shading | gain | 30° |
|---|---|---|---|---|---|
| n = 2.1 | n = 1.5 | peak | 30° | 20° | 2.4 or more | 33% or more |
| 100% | 0% | 1.192 | 64% | 20% | X | ○ |
| 90% | 10% | 40.715 | 2% | 18% | ○ | X |
| 80% | 20% | 80.238 | 1% | 98% | ○ | X |
| 70% | 30% | 119.76 | 0% | 99% | ○ | X |
| 60% | 40% | 159.28 | 0% | 99% | ○ | X |
| 50% | 50% | 198.81 | 0% | 100% | ○ | X |
| 40% | 60% | 238.33 | 0% | 100% | ○ | X |
| 30% | 70% | 277.85 | 0% | 100% | ○ | X |
| 20% | 80% | 317.38 | 0% | 100% | ○ | X |
| 10% | 90% | 356.90 | 0% | 100% | ○ | X |
| 0% | 100% | 396.42 | 0% | 100% | ○ | X |

Study of Table 7 reveals that the screen employing the minute transparent balls 12 of two kinds having the refractive indexes of n=2.1 and n=1.5 and mixed in a ratio of the former ranging from 16% to 44% and in a corresponding ratio of the latter ranging from 84% to 56% could satisfy the conditions of the peak gain of 2.4 or more and the gain obtained at the bend angle of 30° being equal to or larger than 33%.

Figure 51:
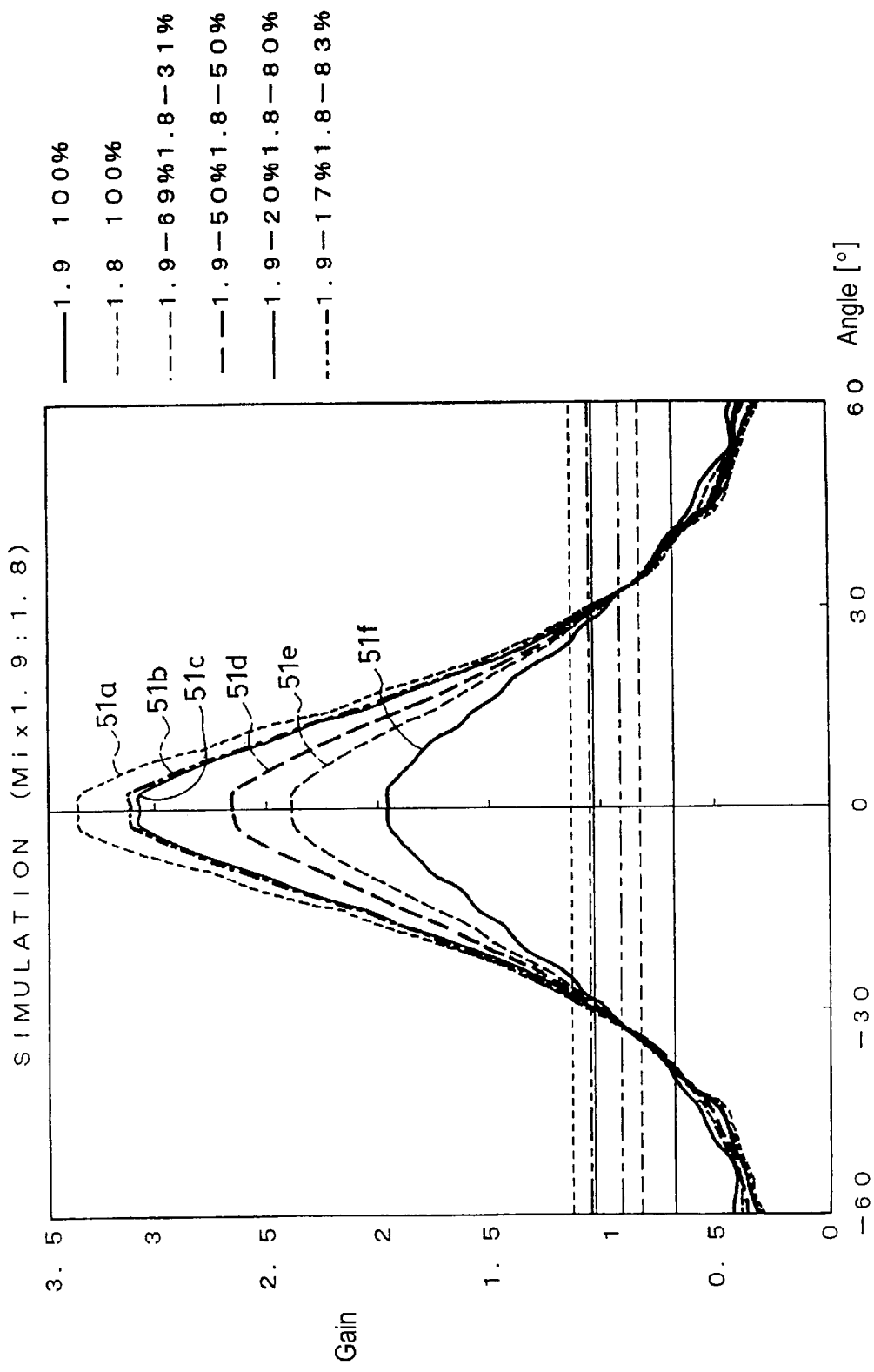
FIG. 51 is a graph . . . index of 2.1 and 1.8 are used.

FIG. 51 is a graph showing measurement of luminance obtained when the minute transparent balls 12 of two kinds having different refractive indexes n=1.9 and n=1.8 were employed. In FIG. 51, curves 51a, 51b, 51c, 51d, 51e and 51f are luminance curves respectively obtained when only the minute transparent ball 12 having a refractive index n=1.8 was employed, when the minute transparent balls 12 of two kinds having different refractive indexes n=1.9 and n=1.8 were employed with being mixed in a ratio of 17:83, when the minute transparent balls 12 of two kinds having different refractive indexes n=1.9 and n=1.8 were employed with being mixed in a ratio of 2:8, when the minute transparent balls 12 of two kinds having different refractive indexes n=1.9 and n=1.8 were employed with being mixed in a ratio of 5:5, when the minute transparent balls 12 of two kinds having different refractive indexes n=1.9 and n=1.8 were employed with being mixed in a ratio of 69:31, and when only the minute transparent ball 12 having a refractive index n=1.9 was employed.

Table 8 shows a simulation result of a peak gain of a screen, a gain obtained at a bend angle of 30° and shading obtained at a bend angle of 20° obtained when the minute transparent balls 12 of two kinds having the refractive indexes of n=1.9 and n=1.8 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 8

| screen arrangement | | gain | | shading | gain | 30° |
|---|---|---|---|---|---|---|
| n = 1.9 | n = 1.8 | peak | 30° | 20° | 2.4 or more | 33% or more |
| 100% | 0% | 1.952 | 49% | 30% | X | ○ |
| 80% | 20% | 2.235 | 44% | 35% | X | ○ |
| 69% | 31% | 2.390 | 41% | 38% | X | ○ |
| 68% | 32% | 2.404 | 41% | 38% | ○ | ○ |
| 50% | 50% | 2.658 | 38% | 41% | ○ | ○ |
| 30% | 70% | 2.940 | 35% | 44% | ○ | ○ |
| 20% | 80% | 3.081 | 34% | 45% | ○ | ○ |
| 18% | 82% | 3.109 | 33% | 46% | ○ | ○ |
| 17% | 83% | 3.123 | 33% | 46% | ○ | X |
| 10% | 90% | 3.222 | 32% | 47% | ○ | X |
| 0% | 100% | 3.363 | 31% | 48% | ○ | X |

Study of Table 8 reveals that the screen employing the minute transparent balls 12 of two kinds having the refractive indexes of n=1.9 and n=1.8 and mixed in a ratio of the former ranging from 18% to 68% and in a corresponding ratio of the latter ranging from 82% to 32% could satisfy the conditions of the peak gain of 2.4 or more and the gain obtained at the bend angle of 30° being equal to or larger than 33%.

Figure 52:
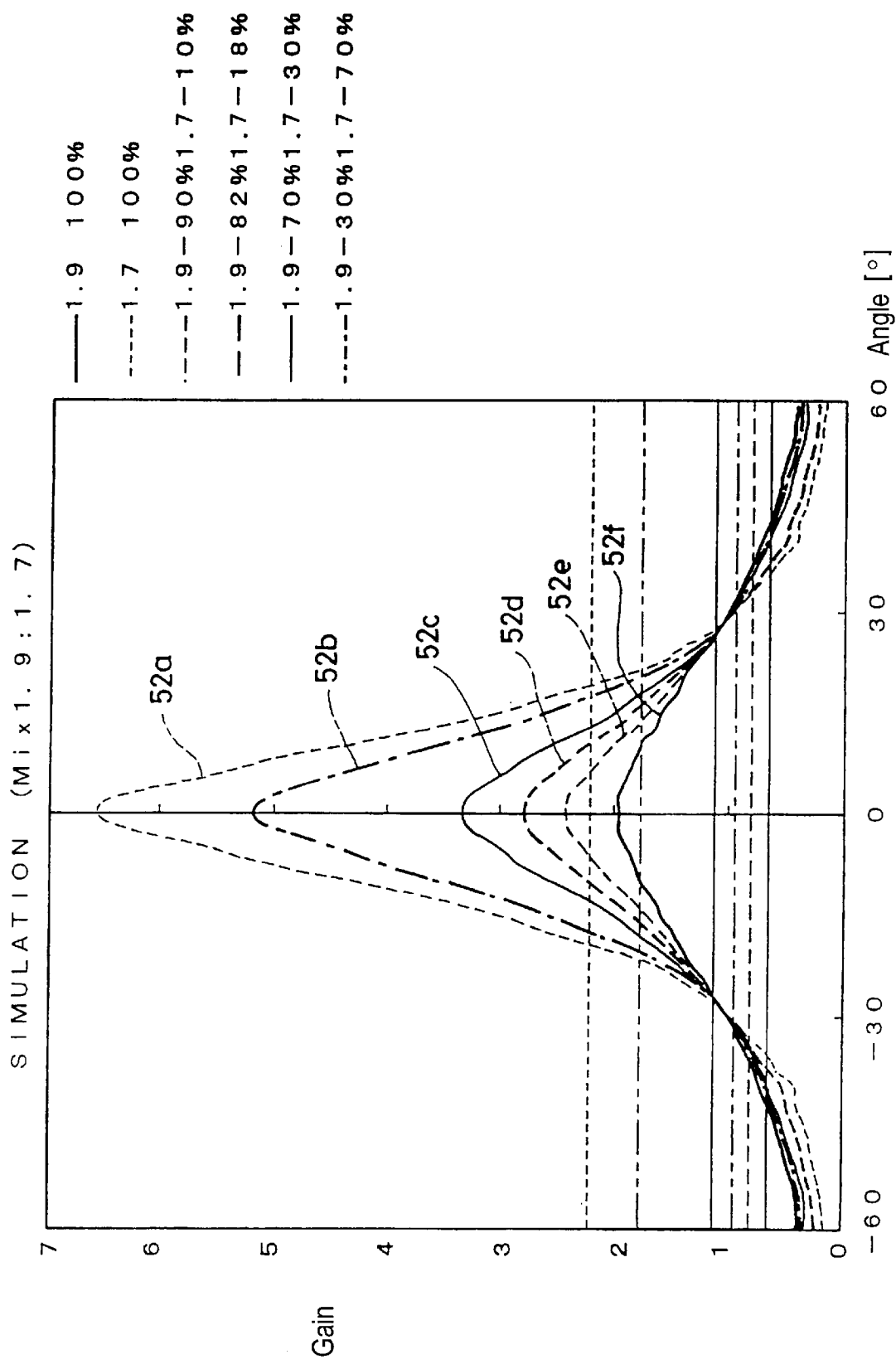
FIG. 52 is a graph . . . index of 1.9 and 1.7 are used.

FIG. 52 is a graph showing measurement of luminance obtained when the minute transparent balls 12 of two kinds having different refractive indexes n=1.9 and n=1.7 were employed. In FIG. 52, curves 52a, 52b, 52c, 52d, 52e and 52f are luminance curves respectively obtained when only the minute transparent ball 12 having a refractive index n=1.7 was employed, when the minute transparent balls 12 of two kinds having different refractive indexes n=1.9 and n=1.7 were employed with being mixed in a ratio of 3:7, when the minute transparent balls 12 of two kinds having different refractive indexes n=1.9 and n=1.7 were employed with being mixed in a ratio of 7:3, when the minute transparent balls 12 of two kinds having different refractive indexes n=1.9 and n=1.7 were employed with being mixed in a ratio of 82:18, when the minute transparent balls 12 of two kinds having different refractive indexes n=1.9 and n=1.7 were employed with being mixed in a ratio of 9:1, and when only the minute transparent ball 12 having a refractive index n=1.9 was employed.

Table 9 shows a simulation result of a peak gain of a screen, a gain obtained at a bend angle of 30° and shading obtained at a bend angle of 20° obtained when the minute transparent balls 12 of two kinds having the refractive indexes of n=1.9 and n=1.7 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 9

| screen arrangement | | gain | | shading | gain | 30° |
|---|---|---|---|---|---|---|
| n = 1.9 | n = 1.7 | peak | 30° | 20° | 2.4 or more | 33% or more |
| 100% | 0% | 1.952 | 49% | 30% | X | ○ |
| 91% | 9% | 2.374 | 40% | 40% | X | ○ |
| 90% | 10% | 2.421 | 39% | 41% | ○ | ○ |
| 85% | 15% | 2.655 | 36% | 45% | ○ | ○ |
| 82% | 18% | 2.796 | 34% | 47% | ○ | ○ |
| 81% | 19% | 2.842 | 33% | 48% | ○ | X |
| 70% | 30% | 3.358 | 28% | 54% | ○ | X |
| 50% | 50% | 4.295 | 21% | 61% | ○ | X |
| 30% | 70% | 5.232 | 17% | 66% | ○ | X |
| 10% | 90% | 6.168 | 14% | 69% | ○ | X |
| 0% | 100% | 6.637 | 13% | 70% | ○ | X |

Study of Table 9 reveals that the screen employing the minute transparent balls 12 of two kinds having the refractive indexes of n=1.9 and n=1.7 and mixed in a ratio of the former ranging from 82% to 90% and in a corresponding ratio of the latter ranging from 18% to 10% could satisfy the conditions of the peak gain of 2.4 or more and the gain obtained at the bend angle of 30° being equal to or larger than 33%.

Figure 53:
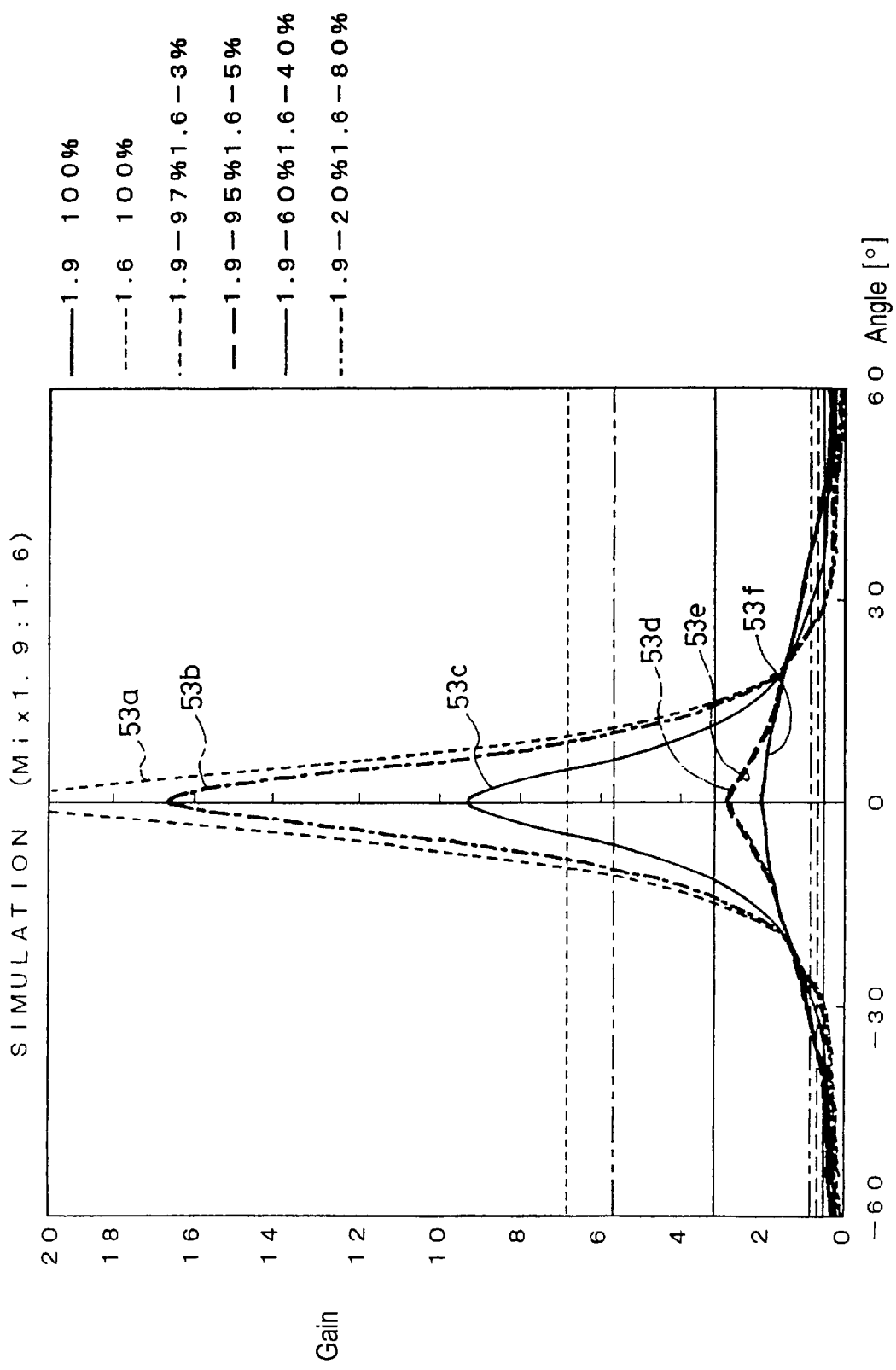
FIG. 53 is a graph . . . index of 1.9 and 1.6 are used.

FIG. 53 is a graph showing measurement of luminance obtained when the minute transparent balls 12 of two kinds having different refractive indexes n=1.9 and n=1.6 were employed. In FIG. 53, curves 53a, 53b, 53c, 53d, 53e and 53f are luminance curves respectively obtained when only the minute transparent ball 12 having a refractive index n=1.6 was employed, when the minute transparent balls 12 of two kinds having different refractive indexes n=1.9 and n=1.6 were employed with being mixed in a ratio of 2:8, when the minute transparent balls 12 of two kinds having different refractive indexes n=1.9 and n=1.6 were employed with being mixed in a ratio of 6:4, when the minute transparent balls 12 of two kinds having different refractive indexes n=1.9 and n=1.6 were employed with being mixed in a ratio of 95:5, when the minute transparent balls 12 of two kinds having different refractive indexes n=1.9 and n=1.6 were employed with being mixed in a ratio of 97:3, and when only the minute transparent ball 12 having a refractive index n=1.9 was employed.

Table 10 shows a simulation result of a peak gain of a screen, a gain obtained at a bend angle of 30° and shading obtained at a bend angle of 20° obtained when the minute transparent balls 12 of two kinds having the refractive indexes of n=1.9 and n=1.6 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 10

| screen arrangement | | gain | | shading | gain | 30° |
|---|---|---|---|---|---|---|
| n = 1.9 | n = 1.6 | peak | 30° | 20° | 2.4 or more | 33% or more |
| 100% | 0% | 1.952 | 49% | 30% | X | ○ |
| 98% | 2% | 2.326 | 41% | 41% | X | ○ |
| 97% | 3% | 2.512 | 38% | 45% | ○ | ○ |
| 96% | 4% | 2.699 | 35% | 49% | ○ | ○ |
| 95% | 5% | 2.886 | 32% | 52% | ○ | X |
| 80% | 20% | 5.686 | 15% | 76% | ○ | X |
| 60% | 40% | 9.420 | 8% | 85% | ○ | X |
| 40% | 60% | 13.154 | 5% | 89% | ○ | X |
| 20% | 80% | 16.888 | 3% | 92% | ○ | X |
| 10% | 90% | 18.755 | 3% | 92% | ○ | X |
| 0% | 100% | 20.622 | 2% | 93% | ○ | X |

Study of Table 10 reveals that the screen employing the minute transparent balls 12 of two kinds having the refractive indexes of n=1.9 and n=1.6 and mixed in a ratio of the former ranging from 96% to 97% and in a corresponding ratio of the latter ranging from 4% to 3% could satisfy the conditions of the peak gain of 2.4 or more and the gain obtained at the bend angle of 30° being equal to or larger than 33%.

Figure 54:
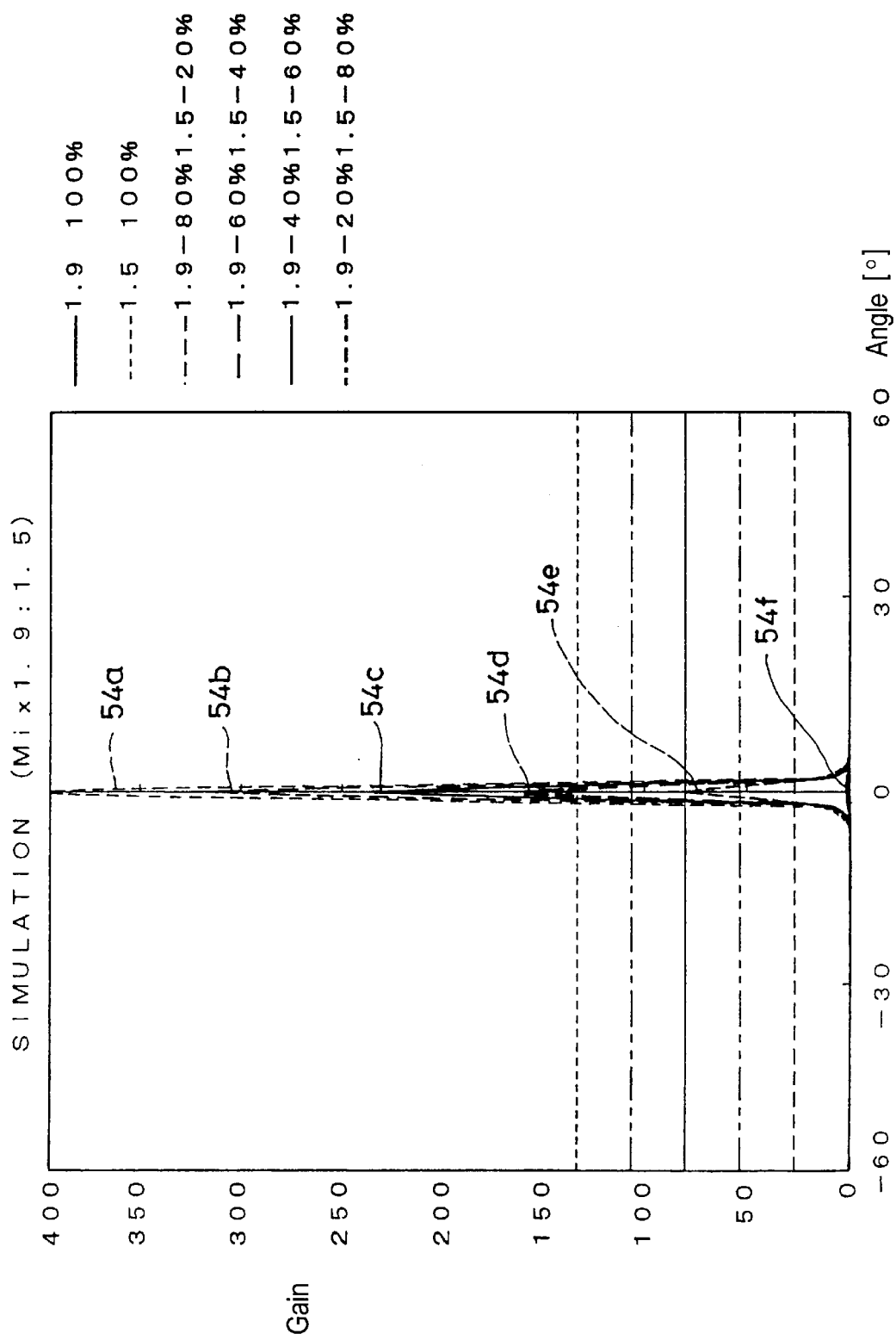
FIG. 54 is a graph . . . index of 1.9 and 1.5 are used.

FIG. 54 is a graph showing measurement of luminance obtained when the minute transparent balls 12 of two kinds having different refractive indexes n=1.9 and n=1.5 were employed. In FIG. 54, curves 54a, 54b, 54c, 54d, 54e and 54f are luminance curves respectively obtained when only the minute transparent ball 12 having a refractive index n=1.5 was employed, when the minute transparent balls 12 of two kinds having different refractive indexes n=1.9 and n=1.5 were employed with being mixed in a ratio of 2:8, when the minute transparent balls 12 of two kinds having different refractive indexes n=1.9 and n=1.5 were employed with being mixed in a ratio of 6:4, when the minute transparent balls 12 of two kinds having different refractive indexes n=1.9 and n=1.5 were employed with being mixed in a ratio of 4:6, when the minute transparent balls 12 of two kinds having different refractive indexes n=1.9 and n=1.5 were employed with being mixed in a ratio of 8:2, and when only the minute transparent ball 12 having a refractive index n=1.9 was employed.

Table 11 shows a simulation result of a peak gain of a screen, a gain obtained at a bend angle of 30° and shading obtained at a bend angle of 20° obtained when the minute transparent balls 12 of two kinds having the refractive indexes of n=1.9 and n=1.5 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 11

| screen arrangement | | gain | | shading | gain | 30° |
|---|---|---|---|---|---|---|
| n = 1.9 | n = 1.5 | peak | 30° | 20° | 2.4 or more | 33% or more |
| 100% | 0% | 1.952 | 49% | 30% | X | ○ |
| 90% | 10% | 41.399 | 2.1% | 97% | ○ | X |
| 80% | 20% | 80.846 | 1.0% | 99% | ○ | X |
| 70% | 30% | 120.29 | 0.6% | 99% | ○ | X |
| 60% | 40% | 159.74 | 0.4% | 99% | ○ | X |
| 50% | 50% | 199.19 | 0.2% | 100% | ○ | X |
| 40% | 60% | 238.63 | 0.2% | 100% | ○ | X |
| 30% | 70% | 278.08 | 0.1% | 100% | ○ | X |
| 20% | 80% | 317.53 | 0.1% | 100% | ○ | X |
| 10% | 90% | 356.98 | 0% | 100% | ○ | X |
| 0% | 100% | 396.42 | 0% | 100% | ○ | X |

Study of Table 11 reveals that the screen employing the minute transparent balls 12 of two kinds having the refractive indexes of n=1.9 and n=1.5 could not satisfy the conditions of the peak gain of 2.4 or more and the gain obtained at the bend angle of 30° being equal to or larger than 33%.

Figure 55:
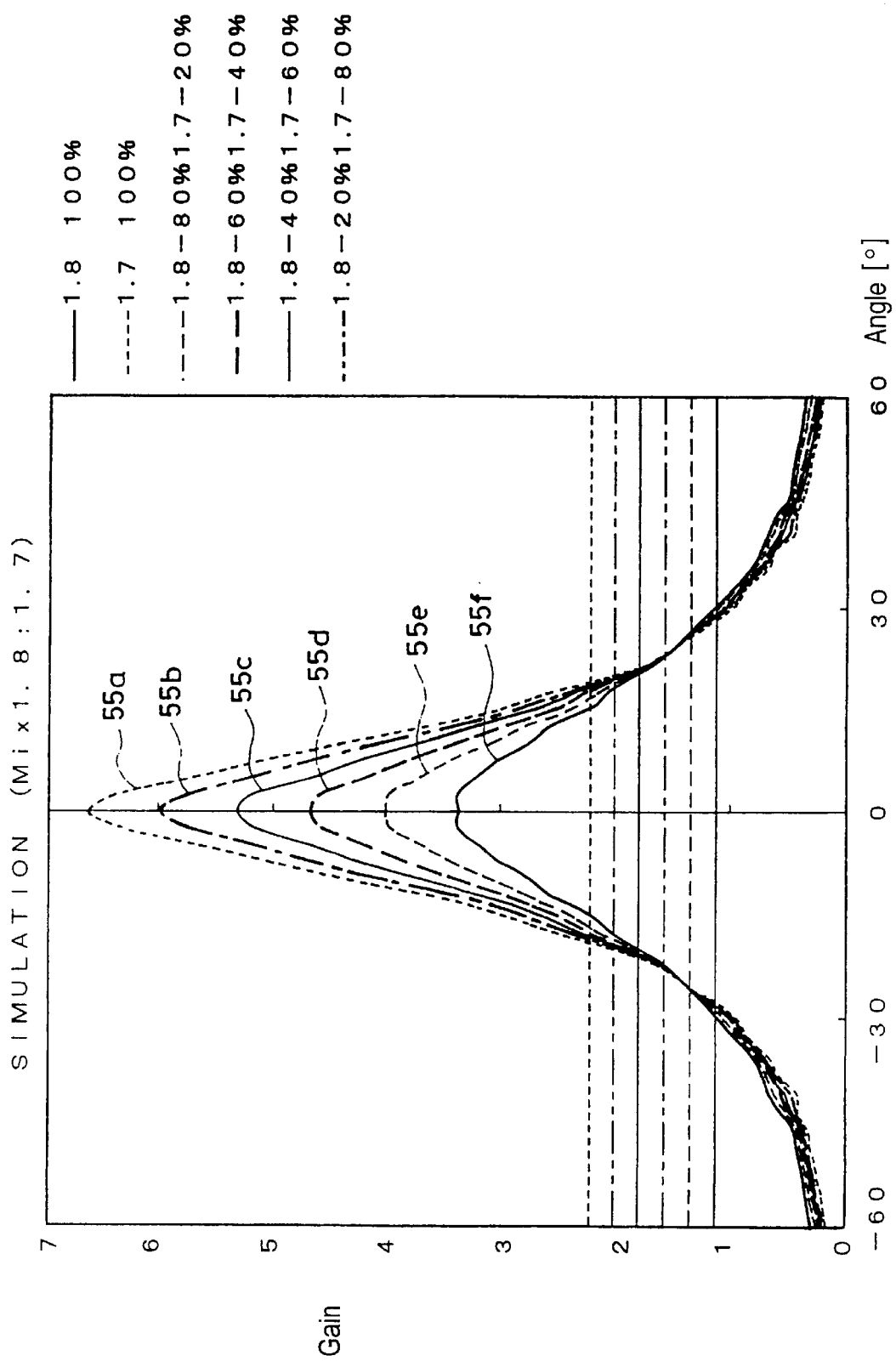
FIG. 55 is a graph . . . index of 1.8 and 1.7 are used.

FIG. 55 is a graph showing measurement of luminance obtained when the minute transparent balls 12 of two kinds having different refractive indexes n=1.8 and n=1.7 were employed. In FIG. 55, curves 55a, 55b, 55c, 55d, 55e and 55f are luminance curves respectively obtained when only the minute transparent ball 12 having a refractive index n=1.7 was employed, when the minute transparent balls 12 of two kinds having different refractive indexes n=1.8 and n=1.7 were employed with being mixed in a ratio of 2:8, when the minute transparent balls 12 of two kinds having different refractive indexes n=1.8 and n=1.7 were employed with being mixed in a ratio of 6:4, when the minute transparent balls 12 of two kinds having different refractive indexes n=1.8 and n=1.7 were employed with being mixed in a ratio of 4:6, when the minute transparent balls 12 of two kinds having different refractive indexes n=1.8 and n=1.7 were employed with being mixed in a ratio of 8:2, and when only the minute transparent ball 12 having a refractive index n=1.8 was employed.

Table 12 shows a simulation result of a peak gain of a screen, a gain obtained at a bend angle of 30° and shading obtained at a bend angle of 20° obtained when the minute transparent balls 12 of two kinds having the refractive indexes of n=1.8 and n=1.7 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 12

| screen arrangement | | gain | shading | gain | 30° |
|---|---|---|---|---|---|
| n = 1.8 | n = 1.7 | peak | 30° | 20° | 2.4 or more | 33% or more |
| 100% | 0% | 3.363 | 31% | 48% | ○ | X |
| 90% | 10% | 3.691 | 28% | 52% | ○ | X |
| 80% | 20% | 4.018 | 25% | 55% | ○ | X |
| 70% | 30% | 4.354 | 23% | 58% | ○ | X |
| 60% | 40% | 4.673 | 21% | 61% | ○ | X |
| 50% | 50% | 5.000 | 19% | 63% | ○ | X |
| 40% | 60% | 5.327 | 18% | 65% | ○ | X |
| 30% | 70% | 5.655 | 16% | 66% | ○ | X |
| 20% | 80% | 5.982 | 15% | 68% | ○ | X |
| 10% | 90% | 6.310 | 14% | 69% | ○ | X |
| 0% | 100% | 6.637 | 13% | 70% | ○ | X |

Study of Table 12 reveals that the screen employing the minute transparent balls 12 of two kinds having the refractive indexes of n=1.8 and n=1.7 could not satisfy the conditions of the peak gain of 2.4 or more and the gain obtained at the bend angle of 30° being equal to or larger than 33%.

Figure 56:
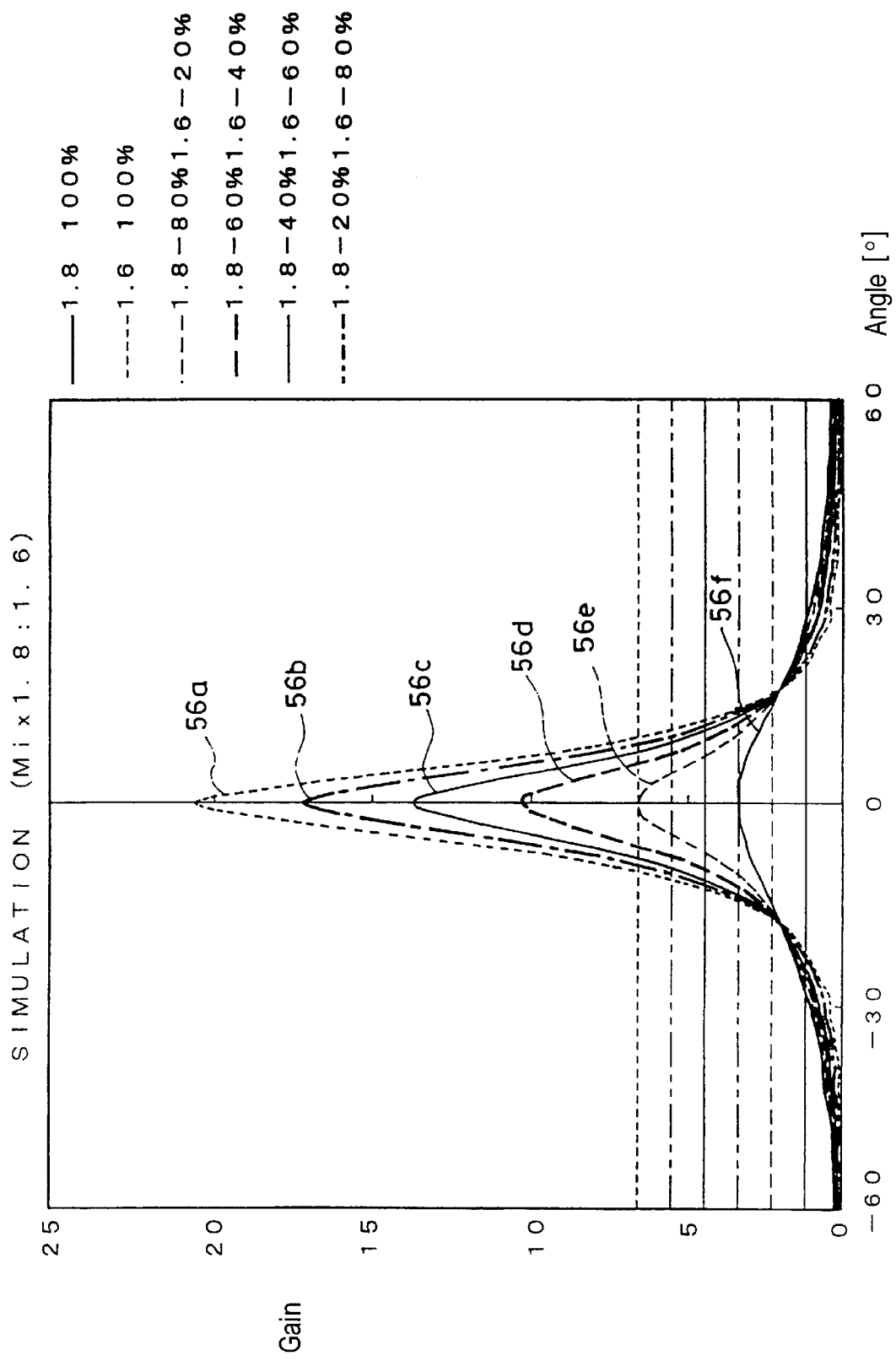
FIG. 56 is a graph . . . index of 1.8 and 1.6 are used.

FIG. 56 is a graph showing measurement of luminance obtained when the minute transparent balls 12 of two kinds having different refractive indexes n=1.8 and n=1.6 were employed. In FIG. 56, curves 56a, 56b, 56c, 56d, 56e and 56f are luminance curves respectively obtained when only the minute transparent ball 12 having a refractive index n=1.6 was employed, when the minute transparent balls 12 of two kinds having different refractive indexes n=1.8 and n=1.6 were employed with being mixed in a ratio of 2:8, when the minute transparent balls 12 of two kinds having different refractive indexes n=1.8 and n=1.6 were employed with being mixed in a ratio of 6:4, when the minute transparent balls 12 of two kinds having different refractive indexes n=1.8 and n=1.6 were employed with being mixed in a ratio of 4:6, when the minute transparent balls 12 of two kinds having different refractive indexes n=1.8 and n=1.6 were employed with being mixed in a ratio of 8:2, and when only the minute transparent ball 12 having a refractive index n=1.8 was employed.

Table 13 shows a simulation result of a peak gain of a screen, a gain obtained at a bend angle of 30° and shading obtained at a bend angle of 20° obtained when the minute transparent balls 12 of two kinds having the refractive indexes of n=1.8 and n=1.6 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 13

| screen arrangement | | gain | shading | gain | 30° |
|---|---|---|---|---|---|
| n = 1.8 | n = 1.6 | peak | 30° | 20° | 2.4 or more | 33% or more |
| 100% | 0% | 3.363 | 31% | 48% | ○ | X |
| 90% | 10% | 5.089 | 20% | 66% | ○ | X |
| 80% | 20% | 6.815 | 14% | 75% | ○ | X |
| 70% | 30% | 8.541 | 10% | 81% | ○ | X |
| 60% | 40% | 10.267 | 8% | 84% | ○ | X |
| 50% | 50% | 11.993 | 6% | 87% | ○ | X |
| 40% | 60% | 13.718 | 5% | 89% | ○ | X |
| 30% | 70% | 15.444 | 4% | 90% | ○ | X |
| 20% | 80% | 17.170 | 3% | 91% | ○ | X |
| 10% | 90% | 18.896 | 3% | 92% | ○ | X |
| 0% | 100% | 20.622 | 2% | 93% | ○ | X |

Study of Table 13 reveals that the screen employing the minute transparent balls 12 of two kinds having the refractive indexes of n=1.8 and n=1.6 could not satisfy the conditions of the peak gain of 2.4 or more and the gain obtained at the bend angle of 30° being equal to or larger than 33%.

Figure 57:
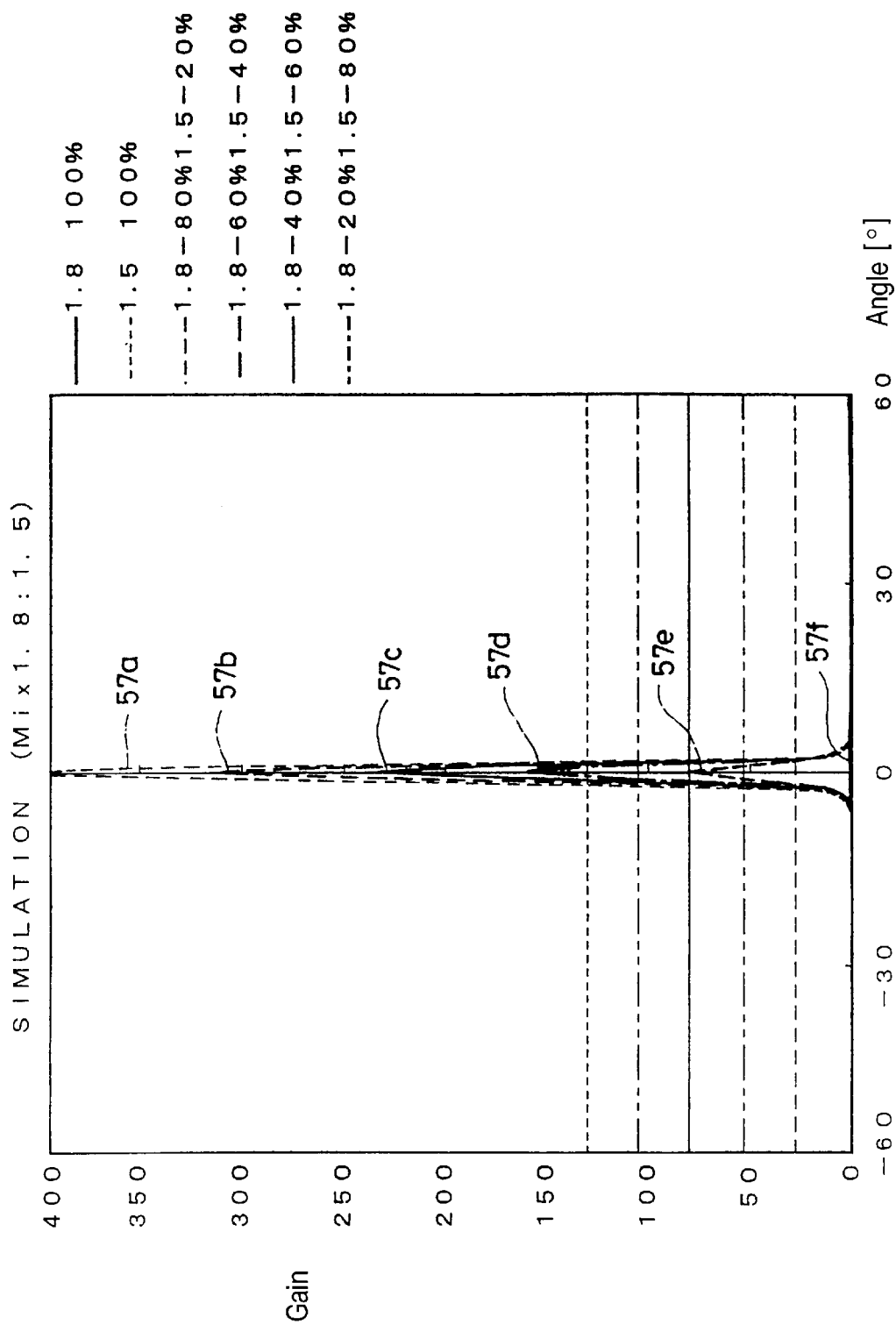
FIG. 57 is a graph . . . index of 1.8 and 1.5 are used.

FIG. 57 is a graph showing measurement of luminance obtained when the minute transparent balls 12 of two kinds having different refractive indexes n=1.8 and n=1.5 were employed. In FIG. 57, curves 57a, 57b, 57c, 57d, 57e and 57f are luminance curves respectively obtained when only the minute transparent ball 12 having a refractive index n=1.5 was employed, when the minute transparent balls 12 of two kinds having different refractive indexes n=1.8 and n=1.5 were employed with being mixed in a ratio of 2:8, when the minute transparent balls 12 of two kinds having different refractive indexes n=1.8 and n=1.5 were employed with being mixed in a ratio of 6:4, when the minute transparent balls 12 of two kinds having different refractive indexes n=1.8 and n=1.5 were employed with being mixed in a ratio of 4:6, when the minute transparent balls 12 of two kinds having different refractive indexes n=1.8 and n=1.5 were employed with being mixed in a ratio of 8:2, and when only the minute transparent ball 12 having a refractive index n=1.8 was employed.

Table 14 shows a simulation result of a peak gain of a screen, a gain obtained at a bend angle of 30° and shading obtained at a bend angle of 20° obtained when the minute transparent balls 12 of two kinds having the refractive indexes of n=1.8 and n=1.5 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 14

| screen arrangement | | gain | shading | gain | 30° |
|---|---|---|---|---|---|
| n = 1.8 | n = 1.5 | peak | 30° | 20° | 2.4 or more | 33% or more |
| 100% | 0% | 3.363 | 31% | 48% | ○ | X |
| 90% | 10% | 42.669 | 2% | 96% | ○ | X |
| 80% | 20% | 81.975 | 1% | 98% | ○ | X |
| 70% | 30% | 121.28 | 1% | 99% | ○ | X |
| 60% | 40% | 160.59 | 0% | 99% | ○ | X |
| 50% | 50% | 199.89 | 0% | 100% | ○ | X |
| 40% | 60% | 239.20 | 0% | 100% | ○ | X |
| 30% | 70% | 278.50 | 0% | 100% | ○ | X |

TABLE 14-continued

| screen arrangement | | gain | | shading | gain | 30° |
|---|---|---|---|---|---|---|
| n = 1.8 | n = 1.5 | peak | 30° | 20° | 2.4 or more | 33% or more |
| 20% | 80% | 317.81 | 0% | 100% | ○ | X |
| 10% | 90% | 357.12 | 0% | 100% | ○ | X |
| 0% | 100% | 396.42 | 0% | 100% | ○ | X |

Study of Table 14 reveals that the screen employing the minute transparent balls 12 of two kinds having the refractive indexes of n=1.8 and n=1.5 could not satisfy the conditions of the peak gain of 2.4 or more and the gain obtained at the bend angle of 30° being equal to or larger than 33%.

Figure 58:
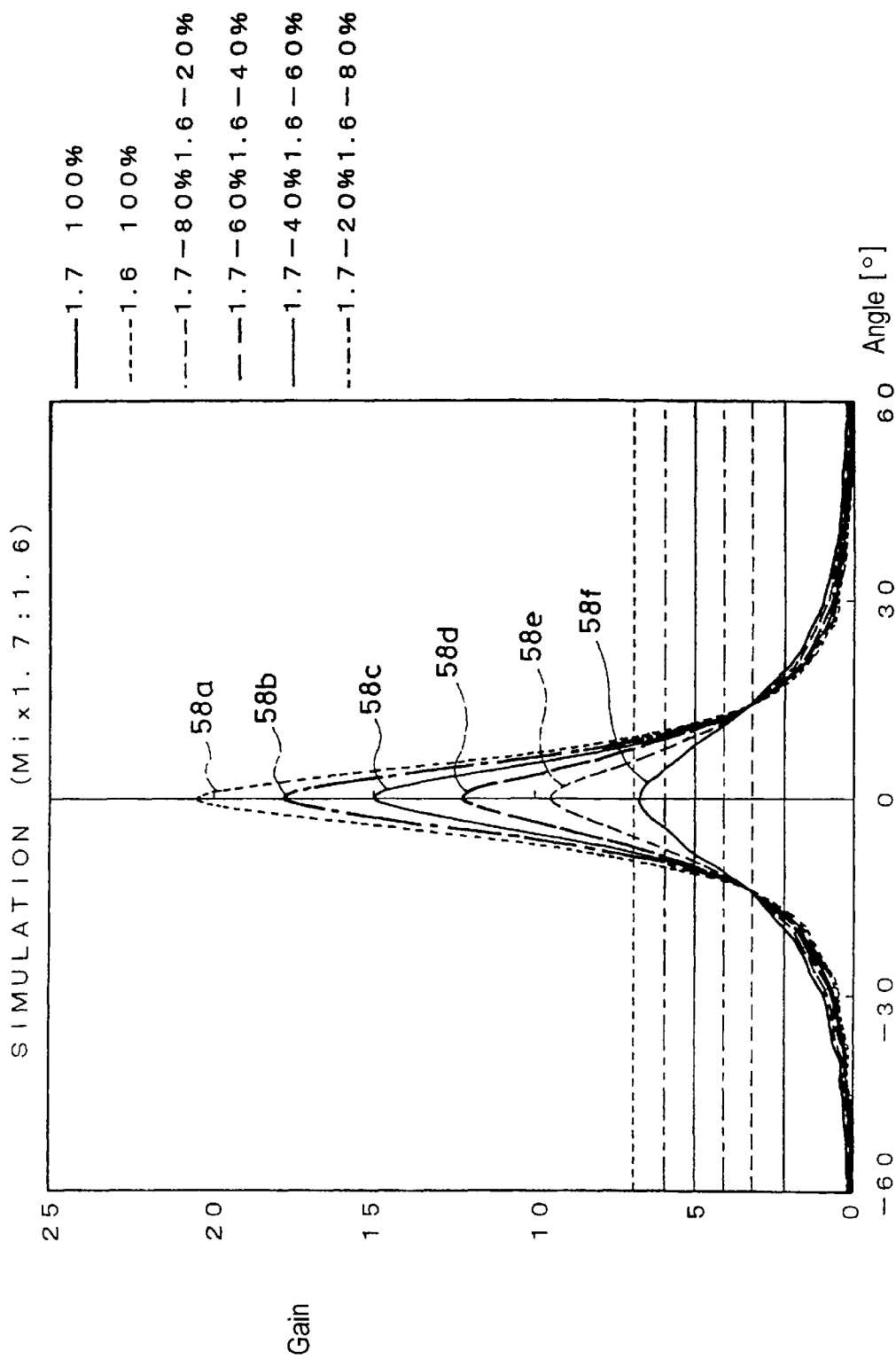
FIG. 58 is a graph . . . index of 1.7 and 1.6 are used.

FIG. 58 is a graph showing measurement of luminance obtained when the minute transparent balls 12 of two kinds having different refractive indexes n=1.7 and n=1.6 were employed. In FIG. 58, curves 58a, 58b, 58c, 58d, 58e and 58f are luminance curves respectively obtained when only the minute transparent ball 12 having a refractive index n=1.6 was employed, when the minute transparent balls 12 of two kinds having different refractive indexes n=1.7 and n=1.6 were employed with being mixed in a ratio of 2:8, when the minute transparent balls 12 of two kinds having different refractive indexes n=1.7 and n=1.6 were employed with being mixed in a ratio of 6:4, when the minute transparent balls 12 of two kinds having different refractive indexes n=1.7 and n=1.6 were employed with being mixed in a ratio of 4:6, when the minute transparent balls 12 of two kinds having different refractive indexes n=1.7 and n=1.6 were employed with being mixed in a ratio of 8:2, and when only the minute transparent ball 12 having a refractive index n=1.7 was employed.

Table 15 shows a simulation result of a peak gain of a screen, a gain obtained at a bend angle of 30° and shading obtained at a bend angle of 20° obtained when the minute transparent balls 12 of two kinds having the refractive indexes of n=1.7 and n=1.6 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 15

| screen arrangement | | gain | | shading | gain | 30° |
|---|---|---|---|---|---|---|
| n = 1.7 | n = 1.6 | peak | 30° | 20° | 2.4 or more | 33% or more |
| 100% | 0% | 6.637 | 13% | 70% | ○ | X |
| 90% | 10% | 8.035 | 10% | 76% | ○ | X |
| 80% | 20% | 9.434 | 8% | 80% | ○ | X |
| 70% | 30% | 10.832 | 7% | 83% | ○ | X |
| 60% | 40% | 12.231 | 6% | 86% | ○ | X |
| 50% | 50% | 13.629 | 5% | 88% | ○ | X |
| 40% | 60% | 15.028 | 4% | 89% | ○ | X |
| 30% | 70% | 16.426 | 4% | 90% | ○ | X |
| 20% | 80% | 17.825 | 3% | 91% | ○ | X |
| 10% | 90% | 19.223 | 3% | 92% | ○ | X |
| 0% | 100% | 20.622 | 2% | 93% | ○ | X |

Study of Table 15 reveals that the screen employing the minute transparent balls 12 of two kinds having the refractive indexes of n=1.7 and n=1.6 could not satisfy the conditions of the peak gain of 2.4 or more and the gain obtained at the bend angle of 30° being equal to or larger than 33%.

Figure 59:
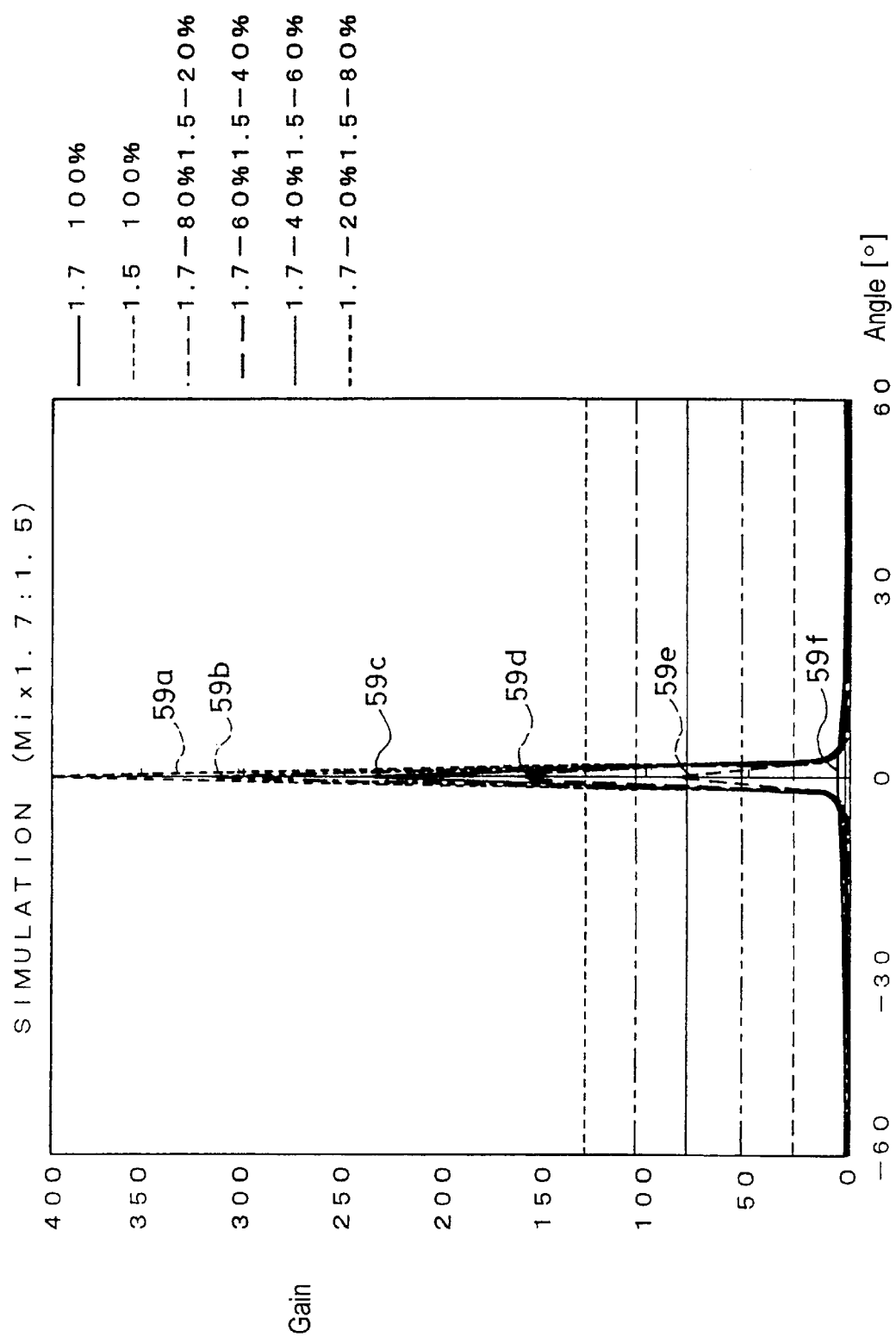
FIG. 59 is a graph showing luminance curves obtained when the minute transparent balls of two kinds having refractive indexes of 1.7 and 1.5 are used.

FIG. 59 is a graph showing measurement of luminance obtained when the minute transparent balls 12 of two kinds having different refractive indexes n=1.7 and n=1.5 were employed. In FIG. 59, curves 59a, 59b, 59c, 59d, 59e and 59f are luminance curves respectively obtained when only the minute transparent ball 12 having a refractive index n=1.5 was employed, when the minute transparent balls 12 of two kinds having different refractive indexes n=1.7 and n=1.5 were employed with being mixed in a ratio of 2:8, when the minute transparent balls 12 of two kinds having different refractive indexes n=1.7 and n=1.5 were employed with being mixed in a ratio of 6:4, when the minute transparent balls 12 of two kinds having different refractive indexes n=1.7 and n=1.5 were employed with being mixed in a ratio of 4:6, when the minute transparent balls 12 of two kinds having different refractive indexes n=1.7 and n=1.5 were employed with being mixed in a ratio of 8:2, and when only the minute transparent ball 12 having a refractive index n=1.7 was employed.

Table 16 shows a simulation result of a peak gain of a screen, a gain obtained at a bend angle of 30° and shading obtained at a bend angle of 20° obtained when the minute transparent balls 12 of two kinds having the refractive indexes of n=1.7 and n=1.5 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 16

| screen arrangement | | gain | | shading | gain | 30° |
|---|---|---|---|---|---|---|
| n = 1.7 | n = 1.5 | peak | 30° | 20° | 2.4 or more | 33% or more |
| 100% | 0% | 6.637 | 13% | 70% | ○ | X |
| 90% | 10% | 45.615 | 2% | 96% | ○ | X |
| 80% | 20% | 84.594 | 1% | 98% | ○ | X |
| 70% | 30% | 123.57 | 0% | 99% | ○ | X |
| 60% | 40% | 162.55 | 0% | 99% | ○ | X |
| 50% | 50% | 201.53 | 0% | 100% | ○ | X |
| 40% | 60% | 240.51 | 0% | 100% | ○ | X |
| 30% | 70% | 279.49 | 0% | 100% | ○ | X |
| 20% | 80% | 318.47 | 0% | 100% | ○ | X |
| 10% | 90% | 357.44 | 0% | 100% | ○ | X |
| 0% | 100% | 396.42 | 0% | 100% | ○ | X |

Study of Table 16 reveals that the screen employing the minute transparent balls 12 of two kinds having the refractive indexes of n=1.7 and n=1.5 could not satisfy the conditions of the peak gain of 2.4 or more and the gain obtained at the bend angle of 30° being equal to or larger than 33%.

Figure 60:
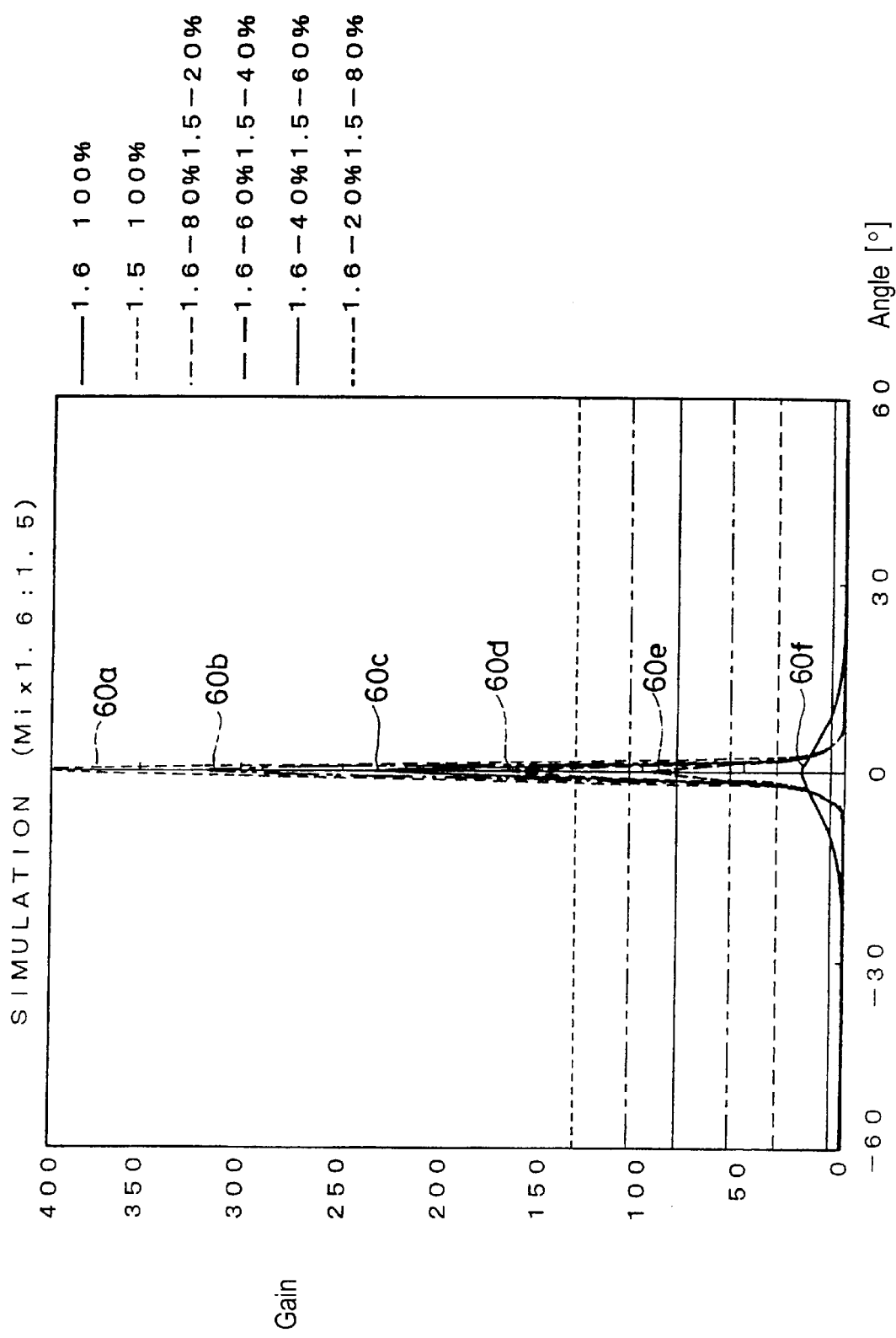
FIG. 60 is a graph showing luminance curves obtained when the minute transparent balls of two kinds having refractive indexes of 1.6 and 1.5 are used.

FIG. 60 is a graph showing measurement of luminance obtained when the minute transparent balls 12 of two kinds having different refractive indexes n=1.6 and n=1.5 were employed. In FIG. 60, curves 60a, 60b, 60c, 60d, 60e and 60f are luminance curves respectively obtained when only the minute transparent ball 12 having a refractive index n=1.5 was employed, when the minute transparent balls 12 of two kinds having different refractive indexes n=1.6 and n=1.5 were employed with being mixed in a ratio of 2:8, when the minute transparent balls 12 of two kinds having different refractive indexes n=1.6 and n=1.5 were employed with being mixed in a ratio of 6:4, when the minute transparent balls 12 of two kinds having different refractive indexes n=1.6 and n=1.5 were employed with being mixed in a ratio of 4:6, when the minute transparent balls 12 of two kinds having different refractive indexes n=1.6 and n=1.5 were employed with being mixed in a ratio of 8:2, and when only the minute transparent ball 12 having a refractive index n=1.6 was employed.

Table 17 shows a simulation result of a peak gain of a screen, a gain obtained at a bend angle of 30° and shading obtained at a bend angle of 20° obtained when the minute transparent balls 12 of two kinds having the refractive indexes of n=1.6 and n=1.5 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 17

| screen arrangement | | gain | | shading | gain | 30° |
|---|---|---|---|---|---|---|
| n = 1.6 | n = 1.5 | peak | 30° | 20° | 2.4 or more | 33% or more |
| 100% | 0% | 20.622 | 2% | 93% | ○ | X |
| 90% | 10% | 58.202 | 1% | 98% | ○ | X |
| 80% | 20% | 95.782 | 0% | 99% | ○ | X |
| 70% | 30% | 133.36 | 0% | 99% | ○ | X |
| 60% | 40% | 170.94 | 0% | 99% | ○ | X |
| 50% | 50% | 208.52 | 0% | 100% | ○ | X |
| 40% | 60% | 246.10 | 0% | 100% | ○ | X |
| 30% | 70% | 283.68 | 0% | 100% | ○ | X |
| 20% | 80% | 321.26 | 0% | 100% | ○ | X |
| 10% | 90% | 358.84 | 0% | 100% | ○ | X |
| 0% | 100% | 396.42 | 0% | 100% | ○ | X |

Study of Table 17 reveals that the screen employing the minute transparent balls 12 of two kinds having the refractive indexes of n=1.6 and n=1.5 could not satisfy the conditions of the peak gain of 2.4 or more and the gain obtained at the bend angle of 30° being equal to or larger than 33%.

The results shown in FIGS. 41 to 60 and Tables 1 to 17 are summarized in Table 18.

TABLE 18

| refractive index | ratio of ball having refractive index to the whole | | | | |
|---|---|---|---|---|---|
| | 2.1 | 1.9 | 1.8 | 1.7 | 1.6 | 1.5 |
| 2.1 | X | X | 56 to 84 | X | X | X |
| 1.9 | X | X | 32 to 82 | 10 to 18 | 3 to 4 | X |
| 1.8 | 16 to 44 | 18 to 68 | X | X | X | X |
| 1.7 | X | 82 to 90 | X | X | X | X |
| 1.6 | X | 96 to 97 | X | X | X | X |
| 1.5 | X | X | X | X | X | X |

Table 18 shows the results obtained when two kinds of the minute transparent balls having the refractive indexes of 1.5, 1.6, 1.7, 1.8, 1.9 and 2.1 were optionally mixed to form the screen and luminance of the screen was measured. Table 18 shows ratios (%) of the minute transparent balls to be mixed to the whole minute transparent balls in the combinations of the minute transparent balls of two kinds which satisfy the conditions of the peak gain of 2.4 or more and the gain obtained at the bend angle of 30° being equal to or larger than 33%.

Study of Table 18 reveals that when two kinds of the minute transparent balls having the refractive indexes of 1.5, 1.6, 1.7, 1.8, 1.9 and 2.1 were optionally mixed in a predetermined ratio to form the screen, the screen having an excellent gain obtained at the bend angle of 30° can be achieved.

The present invention is not limited to the combinations of two kinds of the minute transparent balls having different refractive indexes. According to the present invention, even if three kinds of the minute transparent balls having different refractive indexes are mixed, it is possible to realize the excellent plano lens and the excellent rear-projection type projector screen.

Figure 61:
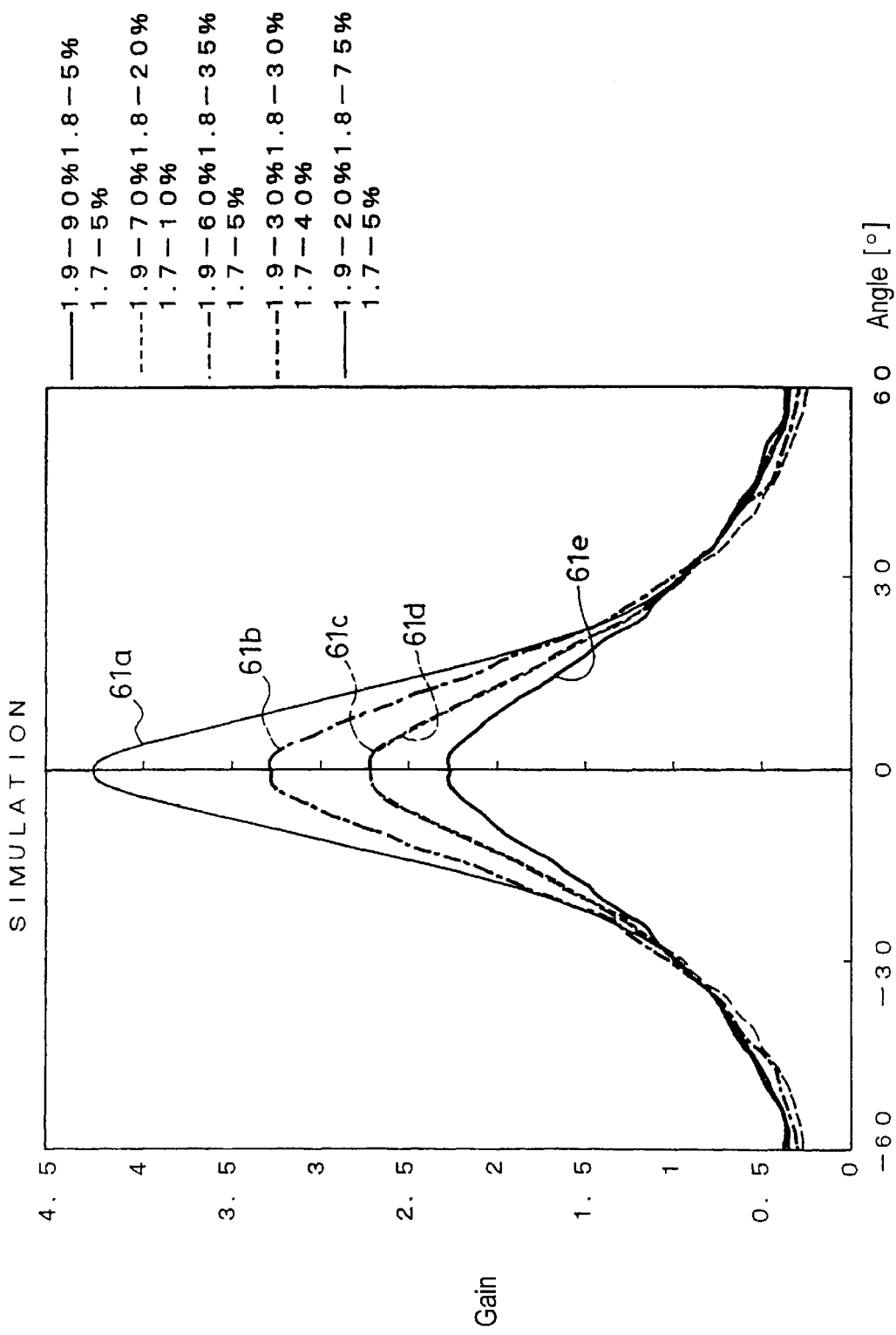
FIG. 61 is a graph showing luminance curves obtained when the minute transparent balls of three kinds having refractive indexes of 1.7, 1.8 and 1.9 are used.

FIG. 61 is a graph showing measurement of luminance obtained when the minute transparent balls 12 of three kinds having different refractive indexes n=1.7, n=1.8 and n=1.9 were employed.

In FIG. 61, curves 61a, 61b, 61c, 61d, and 61e are luminance curves respectively obtained when the minute transparent balls 12 of two kinds having different refractive indexes n=1.9, n=1.8 and n=1.7 were employed with being mixed in a ratio of 20:75:5, when the minute transparent balls 12 of three kinds having different refractive indexes n=1.9, n=1.8 and n=1.7 were employed with being mixed in a ratio of 30:30:40, when the minute transparent balls 12 of two kinds having different refractive indexes n=1.9, n=1.8 and n=1.7 were employed with being mixed in a ratio of 60:35:5, when the minute transparent balls 12 of two kinds having different refractive indexes n=1.9, n=1.8 and n=1.7 were employed with being mixed in a ratio of 70:20:10, and when the minute transparent balls 12 of three kinds having different refractive indexes n=1.9, n=1.8 and n=1.7 were employed with being mixed in a ratio of 90:5:5.

Table 19 shows a simulation result of a peak gain of a screen, a gain obtained at a bend angle of 30° and shading obtained at a bend angle of 20° obtained when the minute transparent balls 12 of three kinds having the refractive indexes of n=1.9, n=1.8 and n=1.7 were employed. In this case, when a value of the peak gain is equal to or larger than 2.4, the result is evaluated with an open circle, and when the value is smaller than 2.4, the result is evaluated with a cross. When a value of the gain obtained at a bend angle of 30° is equal to or larger than ⅓ of larger, i.e., 33% or larger of the peak gain, the result is evaluated with an open circle, and when the value is smaller than 33%, the result is evaluated with a cross

TABLE 19

| screen arrangement | | | gain | | shading | gain 2.4 or more | 30° 33% or more |
|---|---|---|---|---|---|---|---|
| n = 1.9 | n = 1.8 | n = 1.7 | peak | 30° | 20° | | |
| 90% | 5% | 5% | 2.2571 | 43% | 37% | X | ○ |
| 70% | 20% | 10% | 2.703 | 36% | 44% | ○ | ○ |
| 60% | 35% | 5% | 2.6804 | 37% | 44% | ○ | ○ |
| 30% | 30% | 40% | 4.2494 | 22% | 59% | ○ | X |
| 20% | 75% | 5% | 3.2448 | 32% | 48% | ○ | X |

Study of Table 19 reveals that the screen employing the minute transparent balls 12 of three kinds having the refractive indexes of n=1.9, n=1.8 and n=1.7 in a ratio of 2:35:60 to 10:20:70 could satisfy the conditions of the peak gain of 2.4 or more and the gain obtained at the bend angle of 30° being equal to or larger than 33%.

While in the above embodiments the refractive index of the minute transparent balls 12 is changed to amend the amount of the light transmitted through the lens 10 or the screen 10S, absorbance or spectral absorbance of at least one or more of the transparent base member 11 or 41 and the base member 31 is gradually or stepwise changed. Simultaneously with the above arrangement, or instead of the above arrangement, absorbance or spectral absorbance of at least one layer of the transparent layers 15, 25, 26 or the like is gradually or stepwise changed, thereby the emission light being made substantially even or being positively distributed in a desired distribution pattern.

In the rear-projection type video display apparatus employing the screen according to the present invention, the projected picture can be continuously or intermittently enlarged or reduced by providing a zooming mechanism in the optical system of the video projector unit 1 or by changing a distance between the screen and the video projector unit 1. While in the conventional screen employing the lenticular lens the optical system and the distance between the screen and the video projector unit are set in a constant state defined by a design because of moire, when the arrangement according to the present invention is employed, the present invention is based on the dense arrangement of the minute transparent balls and hence the resolution is improved, thereby such arrangement being realized.

In the rear-projection type video display apparatus employing the screen according to the present invention, when the center illuminance on the video projection side of light for the screen is set to 500 [lux] or higher. In this case, the center illuminance becomes 200 [cd/m] or larger which is sufficient in practical use. As a result, a center angle of a conic region where a luminance of 50% of the center illuminance can be obtained at the viewer side is 45 or greater.

A method of manufacturing the screen, i.e., the plano lens according to the present invention will be described. When the arrangement shown in FIG. 9 is employed as a basic arrangement and the plane lens or the screen is formed, i.e., coated by using the basic arrangement,the colored layer 13 having the adhesion or cohesion which allows the minute transparent balls to be fixed thereon is deposited on the similar sheet-like or rigid base member. The minute transparent elements are densely filled on the colored layer, thereby the minute-transparent-layer being formed.

When the arrangement shown in FIG. 10 is employed as a basic arrangement and the plane lens or the screen is formed, i.e., coated by using the basic arrangement, the transparent layer 15 having adhesion or cohesion which allows the minute transparent balls to be fixed thereof is deposited, i.e., coated on the similar base member 11 and the colored layer having adhesion or cohesion which allows the minute transparent balls to be fixed thereon is deposited on the similar base member. The minute transparent elements are densely filled on the colored layer, thereby the minute-transparent-layer being formed.

The colored layer 13 can be formed by using a colored coating material colored with a desired color as the coating material. However, in the coating, the colorless or white coating material having adhesion or cohesion is used and then colored after being coated.

The process of filling the minute transparent balls 12 in the minute-transparent-ball disposing layers 14 can be carried out by burying type minute transparent balls 12 in the colored layer 13 having the adhesion or the cohesion or the colored layer 13 and the transparent layer 15 by a desired depth so that the minute transparent balls 12 should be in contact with or close to each other in a single grain layer.

When the minute transparent ball disposing layer 14 is formed, an apparatus and a method proposed by the same assignee of the application in Japanese patent application No. 7-344488 "minute ball arranging apparatus and minute ball arranging method" can be applied. Specifically, a supply nozzle for supplying the minute transparent balls to be finally used in the minute-transparent-ball disposing layer is prepared and the minute transparent balls 12 of an amount which is more than those finally disposed in the minute-transparent-ball disposing layer 14 are supplied to the colored layer 13 having the cohesion, the transparent layer 15 having the cohesion and the transparent layer 26 having cohesion. Then, the minute transparent balls 12 are squeezed to be densely arranged on the entire minute-transparent-ball disposing layer 14. Moreover, a pressing roller is rotated with a predetermined pressure thereon, thereby the minute transparent balls 12 being buried at the light emission side in the colored layer 13, the transparent layer 15, or the transparent layer 26 or the colored layer 13 and the transparent layer 15 located thereunder. The vacuum absorber apparatus is brought on the surface side, thereby absorbing and removing the remaining minute transparent balls and the minute transparent balls which are not fixed tightly and whose buried amount does not reach a predetermined value. Thus, it is possible to form a desired minute-transparent-ball disposing layer 14 where only a minute transparent balls buried in the colored layer 13 or the transparent layer 15 or the transparent layer 26 by a desired depth are disposed.

In some case, when the plano lens 10 shown in FIG. 10 is manufactured, the colored layer 13 having adhesion or cohesion is formed on the transparent base member 11. The following method can be employed. The transparent layer 15 having the adhesion or cohesion is coated on a transfer sheet (not shown). The minute transparent balls 12 are densely filled and arranged in the transparent layer 15 by the above method. The transfer sheet is pressed to the colored layer 13 on the transparent base member 11 with its side having the minute transparent balls 12 disposed thereon being opposed thereto, and further pressed so that the minute transparent balls 12 should substantially reach the transparent base member under the colored layer. In this state, the minute transparent balls are peeled off from the transfer sheet together with the transparent layer, thereby being transferred to the transfer base member side. Thus, the plano lens or the screen on which the minute-transparent-ball disposing layer 14 is formed on the transparent base member 11 can be manufactured.

When the plano lenses or the screens shown in FIGS. 11 and 12 are manufactured, the transparent protective layer 25 are coated by the above coating method on the minute-transparent-ball disposing layers 14 shown in FIGS. 9 and 11 formed by the above method.

In the plano lenses 10 or the screen 10S shown in FIGS. 9 to 12, the transparent base members 11 are disposed on the light emission sides. As shown in FIGS. 13 and 14, when the transparent base member 11 is disposed on the light incidence side, the following method can be employed. The colored layer having adhesion or cohesion is coated or the transparent layer 26 having adhesion or cohesion formed on the colored layer 13 is coated on a transfer sheet (not shown). The transparent layer 15 having adhesion or cohesion is similarly coated on the colored layer 13. The minute transparent balls 12 are densely buried in the colored layer 13 or both of the colored layer 13 and the transparent layer 15 formed thereunder by the above burying method. The transfer sheet is pressed to the colored layer 13 on the transparent base member 11 with its side having the minute transparent balls 12 disposed thereon being opposed thereto, and further pressed so that the minute transparent balls 12 should substantially reach the transparent base member under the colored layer. In this state, the minute transparent balls are peeled off from the transfer sheet together with the transparent layer, thereby being transferred to the transfer base member side. Thus, the plano lens or the screen on which the minute-transparent-ball disposing layer 14 is formed on the transparent base member 11 can be manufactured.

Moreover, when the plano lenses 10 or the screens 10S shown in FIGS. 15 and 16 are manufactured, the methods of manufacturing the plano lenses or the screens shown in FIGS. 9 to 14 can be applied. Then, the protective transparent base members 41 formed of the sheet-like and rigid substrates are bonded to the plano lenses or the screens through the adhesion layers or by utilizing the adhesion or cohesion of the transparent layers 26, 15 on the opposite sides thereof relative to the transparent base members 11.

Figure 62:
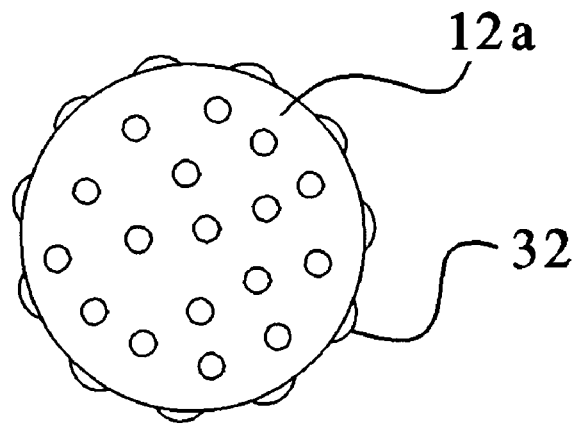
FIG. 62 shows an embodiment of a minute-transparent-ball having convex projection.
Figure 63:
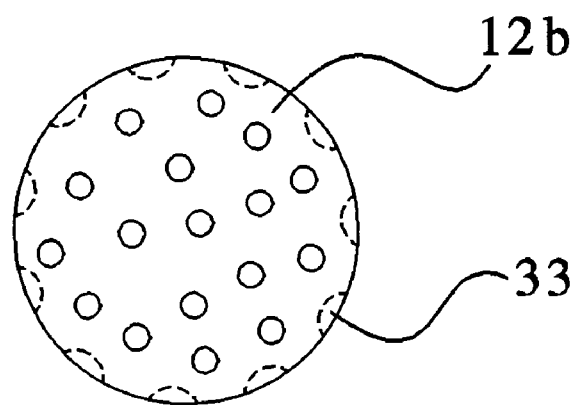
FIG. 63 shows an embodiment of a minute-glass-ball having convex depressions.

FIG. 62 shows an embodiment of a minute-transparent-ball 12a having convex projections 32 distributed over its surface, and FIG. 63 shows an embodiment of a minute-transparent ball 12b having convex depressions 33 distributed over its surface.

Use of the plano lens, the rear-projection type projector screen and the rear-projection type video display apparatus according to the present invention can solve the above problems of the lenticular lens.

Specifically, according to the present invention, since the external light is effectively prevented from travelling in undesired directions, it is possible to improve the contrast of the picture.

Since it is unnecessary to provide the smoke plate or the like, it is possible to prevent the luminance from being lowered. As a result, it is possible to avoid use of the light source consuming a large power, and hence it is possible to reduce a consumed power, to reduce a generated heat, and to prevent the costs from being increased.

According to the present invention, since the light can be widely diffused in both of the vertical and horizontal directions, the range in which the user can observe a sharp picture is extended, and it is possible to avoid a partial unevenness of luminance.

The plano lens according to the present invention can be easily manufactured and handled as compared with the lenticular lens, which prevents the costs from being increased.

According to the plano lens of the present invention, the resolution is improved as compared with that obtained when the lenticular lens is used.

It is possible to easily amend the illumination distribution to thereby achieve a desired luminance distribution.

When both of the Fresnel lens and the lenticular lens are used, it is possible to above multiple reflections therebetween.

Moreover, since the moire hardly occurs in the plano lens according to the present invention, restriction of the design in the rear-projection type projector is relaxed. It is possible to easily equip a zooming mechanism or the like thereon.

According to the present invention, since the minute transparent balls having different refractive indexes are mixed in a preferable ratio, it is possible to form the screen having a high peak gain and having a comparatively high gain even at a bend angle of 30°.

The glass minute transparent balls having the refractive indexes of 1.5, 1.6, 1.7, 1.8, 1.9 and 2.1 can be manufactured. The glass minute transparent balls having the refractive indexes of 1.5, 1.9 and 2.1 are mass-produced, and hence generally available with low costs. On the other hand, the glass minute transparent balls having the refractive indexes of 1.6, 1.7 and 1.8 are comparatively expensive. According to the present invention, since the inexpensive minute transparent balls of two kinds or more are mixed to form the screen or since only a small amount of the expensive minute transparent balls are used for optional mixing thereof to form the screen, it is possible to the screen forming the rear-projection type video display apparatus obtaining an excellent gain curve with an inexpensive cost.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A rear-projection type projector screen, comprising:
a plano lens having a light incident side and a light transmission side;
said plano lens having a transparent base member disposed at one of said light incident side and said light emission side;
said plano lens also having a plurality of minute transparent balls disposed two-dimensionally in a single ball layer on said transparent layer with said minute transparent balls being substantially adjacent to each other;
said plano lens also having a colored layer on said transparent layer with said minute transparent balls respectively partially buried in said colored layer so that each of said minute transparent balls has an exposed surface portion projecting from said colored layer toward said light incident side; and
each of said minute transparent balls having an optical characteristic selected from the group consisting of absorbence, spectral absorbence and refractive index, and the optical characteristic of some of said minute transparent balls differing in value from others of said minute transparent balls, and said minute transparent balls being respectively disposed in a single layer with a non-uniform two-dimensional distribution of said differing values of said optical characteristic wherein adjacent sections of the minute transparent balls are non-uniform in a center to periphery direction of the plano lens.

2. A rear-projection type projector screen as claimed in claim 1, wherein said plano lens further has a transparent layer disposed between said minute transparent balls and said transparent base member.

3. A rear-projection type projector screen as claimed in claim 1 wherein said plano lens further has a protective transparent layer formed on said minute transparent balls at a side of said minute transparent balls opposite to said transparent layer.

4. A rear-projection type projector screen as claimed in claim 1 wherein said plano lens further has a protective transparent base member layer on said transparent base member at a side of said transparent base member opposite said minute transparent balls.

5. A rear-projection type projector screen as claimed in claim 1 further comprising a Fresnel lens bonded to said light incident side of said plano lens.

6. A rear-projection type projector screen as claimed in claim 1 further comprising an anti-reflection layer disposed at said light incident side of said plano lens.

7. A rear-projection type projector screen as claimed in claim 1 further comprising an anti-reflection layer disposed at said light emission side of said plano lens.

8. A rear-projection type projector screen as claimed in claim 1 further comprising a first anti-reflection layer formed on said light incident side of said plano lens and a second anti-reflection layer formed on said light emission side of said plano lens.

9. A rear-projection type projector screen as claimed in claim 1 further comprising an protective layer disposed at said light incident side of said plano lens.

10. A rear-projection type projector screen as claimed in claim 1 further comprising an protective layer disposed at said light emission side of said plano lens.

11. A rear-projection type projector screen as claimed in claim 1 further comprising a first protective layer formed on said light incident side of said plano lens and a second protective layer formed on said light emission side of said plano lens.

12. A rear-projection type projector screen as claimed in claim 1 wherein each of said minute transparent balls has a diameter, and wherein each of said minute transparent balls projects from said colored layer by an amount which is 30% or more of said diameter, and wherein said colored layer has a thickness which is less than 70% of said diameter.

13. A rear-projection type projector screen as claimed in claim 1 wherein said colored layer has an absorbence characteristic selected from the group consisting of absorbence and spectral absorbence and wherein said transparent base member has an absorbence characteristic selected from the group consisting of absorbence and spectral absorbence, and wherein said absorbence characteristic of said colored layer differs in value from said absorbence characteristic of said transparent base member.

14. A rear-projection type projector screen as claimed in claim 1 wherein each of said minute transparent balls has a diameter which is less than 100 $\mu$m.

15. A rear-projection type projector screen as claimed in claim 1 wherein each of said minute transparent balls has a diameter, and wherein said minute transparent balls collectively exhibit an average diameter, and wherein no one of said minute transparent balls has a diameter which differs from said average diameter by more than 10% of said average diameter.

16. A rear-projection type projector screen as claimed in claim 1 wherein said transparent base member is disposed at said light incident side and has a refractive index, and wherein each of said minute transparent balls has a refractive index which is larger than said refractive index of said transparent base member.

17. A rear-projection type projector screen as claimed in claim 16 wherein each of said minute transparent balls has a refractive index which is greater than or equal to 1.4.

18. A rear-projection type projector screen as claimed in claim 1 wherein said optical characteristic is the refractive index and wherein said plano lens has a peak gain which is greater than or equal to 2.4, and a gain at a bend angle of 30° which is greater than or equal to ⅓ of said peak gain.

19. A rear-projection type projector screen as claimed in claim 1 wherein said plano lens has a center and a periphery, and wherein said minute transparent balls are distributed in said single ball layer so that said optical characteristic changes gradually from minute transparent balls disposed at said center of said plano lens to minute transparent balls distributed at said periphery of said plano lens.

20. A rear-projection type projector screen as claimed in claim 1 wherein said plano lens has a center and a periphery, and wherein said minute transparent balls are distributed in said single ball layer so that said optical characteristic changes in steps from minute transparent balls disposed at said center of said plano lens to minute transparent balls distributed at said periphery of said plano lens.

21. A rear-projection type projector screen as claimed in claim 1 wherein at least some of said minute transparent balls have a plurality of convex projections on a surface thereof.

22. A rear-projection type projector screen as claimed in claim 1 wherein at least some of said minute transparent balls have a plurality of concave depressions on a surface thereof.

23. A rear-projection type projector screen as claimed in claim 1 wherein said minute transparent balls have a surface treatment selected from the group of anti-reflection surface treatments and water-repelling surface treatments.

24. A rear-projection type video display apparatus, comprising:
a video projector unit which emits light;
a plano lens having a light incident side disposed to receive said light from said video projector unit and a light emission side for emitting said light from said video projector unit after passing through said plano lens;
said plano lens having a transparent base member disposed at one of said light incident side and said light emission side;
said plano lens also having a plurality of minute transparent balls disposed two-dimensionally in a single ball layer on said transparent layer with said minute transparent balls being substantially adjacent each other;
said plano lens also having a colored layer on said transparent layer with said minute transparent balls respectively partially buried in said colored layer so that each of said minute transparent balls has an exposed surface portion projecting from said colored layer toward said light incident side; and
each of said transparent balls having an optical characteristic selected from the group consisting of absorbence, spectral absorbence and refractive index, and the optical characteristic of some of said minute transparent balls differing in value from others of said minute transparent balls, and said minute transparent balls being respectively disposed in said single ball layer with a non-uniform two-dimensional distribution of said differing values of said optical characteristic, wherein adjacent sections of the minute transparent balls are non-uniform in a center to periphery direction of the plano lens.

25. A rear-projection type video display apparatus as claimed in claim 24, wherein said plano lens further has a transparent layer disposed between said minute transparent balls and said transparent base member.

26. A rear-projection type video display apparatus as claimed in claim 24 wherein said plano lens further has a protective transparent layer formed on said minute transparent balls at a side of said minute transparent balls opposite to said transparent layer.

27. A rear-projection type video display apparatus as claimed in claim 24 wherein said plano lens further has a protective transparent base member layer on said transparent base member at a side of said transparent base member opposite said minute transparent balls.

28. A rear-projection type video display apparatus as claimed in claim 24 further comprising a Fresnel lens bonded to said light incident side of said plano lens.

29. A rear-projection type video display apparatus as claimed in claim 24 further comprising an anti-reflection layer disposed at said light incident side of said plano lens.

30. A rear-projection type video display apparatus as claimed in claim 24 further comprising an anti-reflection layer disposed at said light emission side of said plano lens.

31. A rear-projection type video display apparatus as claimed in claim 24 further comprising a first anti-reflection layer formed on said light incident side of said plano lens and a second anti-reflection layer formed on said light emission side of said plano lens.

32. A rear-projection type video display apparatus as claimed in claim 24 further comprising a protective layer disposed at said light incident side of said plano lens.

33. A rear-projection type video display apparatus as claimed in claim 24 further comprising a protective layer disposed at said light emission side of said plano lens.

34. A rear-projection type video display apparatus as claimed in claim 24 further comprising a first protective layer formed on said light incident side of said plano lens and a second protective layer formed on said light emission side of said plano lens.

35. A rear-projection type video display apparatus as claimed in claim 24 wherein each of said minute transparent balls has a diameter, and wherein each of said minute transparent balls projects from said colored layer by an amount which is 30% or more of said diameter, and wherein said colored layer has a thickness which is less than 70% of said diameter.

36. A rear-projection type video display apparatus as claimed in claim 24 wherein said colored layer has an absorbence characteristic selected from the group consisting of absorbence and spectral absorbence and wherein said transparent base member has an absorbence characteristic selected from the group consisting of absorbence and spectral absorbence, and wherein said absorbence characteristic of said colored layer differs in value from said absorbence characteristic of said transparent base member.

37. A rear-projection type video display apparatus as claimed in claim 24 wherein each of said minute transparent balls has a diameter which is less than 100 μm.

38. A rear-projection type video display apparatus as claimed in claim 24 wherein each of said minute transparent balls has a diameter, and wherein said minute transparent balls collectively exhibit an average diameter, and wherein no one of said minute transparent balls has a diameter which differs from said average diameter by more than 10% of said average diameter.

39. A rear-projection type video display apparatus as claimed in claim 24 wherein said transparent base member is disposed at said light incident side and has a refractive index, and wherein each of said minute transparent balls has a refractive index which is larger than said refractive index of said transparent base member.

40. A rear-projection type video display apparatus as claimed in claim 39 wherein each of said minute transparent balls has a refractive index which is greater than or equal to 1.4.

41. A rear-projection type video display apparatus as claimed in claim 24 wherein said optical characteristic is the refractive index and wherein said plano lens has a peak gain which is greater than or equal to 2.4, and a gain at a bend angle of 30° which is greater than or equal to ⅓ of said peak gain.

42. A rear-projection type video display apparatus as claimed in claim 24 wherein said plano lens has a center and a periphery, and wherein said minute transparent balls are distributed in said single ball layer so that said optical characteristic changes gradually from minute transparent balls disposed at said center of said plano lens to minute transparent balls distributed at said periphery of said plano lens.

43. A rear-projection type video display apparatus as claimed in claim 24 wherein said plano lens has a center and a periphery, and wherein said minute transparent balls are distributed in said single ball layer so that said optical characteristic changes in steps from minute transparent balls disposed at said center of said plano lens to minute transparent balls distributed at said periphery of said plano lens.

44. A rear-projection type video display apparatus as claimed in claim 24 wherein at least some of said minute transparent balls have a plurality of convex projections on a surface thereof.

45. A rear-projection type video display apparatus as claimed in claim 24 wherein at least some of said minute transparent balls have a plurality of concave depressions on a surface thereof.

46. A rear-projection type projector screen, comprising:
a plano lens having a light incident side and a light transmission side;
said plano lens having a transparent base member disposed at one of said light incident side and said light emission side;
said plano lens also having a plurality of minute transparent balls disposed two-dimensionally in a single ball layer on said transparent layer with said minute transparent balls being substantially adjacent to each other;
said plano lens also having a colored layer on said transparent layer with said minute transparent balls respectively partially buried in said colored layer so that each of said minute transparent balls has an exposed surface portion projecting from said colored layer toward said light incident side; and
each of said minute transparent balls having an optical characteristic selected from the group consisting of absorbence, spectral absorbence and refractive index, and the optical characteristic of some of said minute transparent balls differing in value from others of said minute transparent balls, and said minute transparent balls being respectively disposed in a single layer with a non-uniform two-dimensional distribution of said differing values of said optical characteristic wherein at least some of said minute transparent balls have a plurality of convex projections on a surface thereof.

47. A rear-projection type projector screen, comprising:
a plano lens having a light incident side and a light transmission side;
said plano lens having a transparent base member disposed at one of said light incident side and said light emission side;
said plano lens also having a plurality of minute transparent balls disposed two-dimensionally in a single ball layer on said transparent layer with said minute transparent balls being substantially adjacent to each other;
said plano lens also having a colored layer on said transparent layer with said minute transparent balls respectively partially buried in said colored layer so that each of said minute transparent balls has an exposed surface portion projecting from said colored layer toward said light incident side; and each of said minute transparent balls having an optical characteristic selected from the group consisting of absorbence, spectral absorbence and refractive index, and the optical characteristic of some of said minute transparent balls differing in value from others of said minute transparent balls, and said minute transparent balls being respectively disposed in a single layer with a non-uniform two-dimensional distribution of said differing values of said optical characteristic wherein at least some of said minute transparent balls have a plurality of concave depressions on a surface thereof.

48. A rear-projection type video display apparatus, comprising:

a video projector unit which emits light;

a plano lens having a light incident side disposed to receive said light from said video projector unit and a light emission side for emitting said light from said video projector unit after passing through said plano lens;

said plano lens having a transparent base member disposed at one of said light incident side and said light emission side;

said plano lens also having a plurality of minute transparent balls disposed two-dimensionally in a single ball layer on said transparent layer with said minute transparent balls being substantially adjacent each other;

said plano lens also having a colored layer on said transparent layer with said minute transparent balls respectively partially buried in said colored layer so that each of said minute transparent balls has an exposed surface portion projecting from said colored layer toward said light incident side; and each of said transparent balls having an optical characteristic selected from the group consisting of absorbence, spectral absorbence and refractive index, and the optical characteristic of some of said minute transparent balls differing in value from others of said minute transparent balls, and said minute transparent balls being respectively disposed in said single ball layer with a non-uniform two-dimensional distribution of said differing values of said optical characteristic, wherein at least some of the minute transparent balls have a plurality of convex projections on a surface thereof.

49. A rear-projection type video display apparatus, comprising:

a video projector unit which emits light;

a plano lens having a light incident side disposed to receive said light from said video projector unit and a light emission side for emitting said light from said video projector unit after passing through said plano lens;

said plano lens having a transparent base member disposed at one of said light incident side and said light emission side;

said plano lens also having a plurality of minute transparent balls disposed two-dimensionally in a single ball layer on said transparent layer with said minute transparent balls being substantially adjacent each other;

said plano lens also having a colored layer on said transparent layer with said minute transparent balls respectively partially buried in said colored layer so that each of said minute transparent balls has an exposed surface portion projecting from said colored layer toward said light incident side; and each of said transparent balls having an optical characteristic selected from the group consisting of absorbence, spectral absorbence and refractive index, and the optical characteristic of some of said minute transparent balls differing in value from others of said minute transparent balls, and said minute transparent balls being respectively disposed in said single ball layer with a non-uniform two-dimensional distribution of said differing values of said optical characteristic, wherein at least some of the minute transparent balls have a plurality of concave depressions on a surface thereof.

* * * * *